United States Patent
Tidwell et al.

(10) Patent No.: US 7,783,563 B2
(45) Date of Patent: *Aug. 24, 2010

(54) SYSTEMS AND METHODS FOR IDENTIFYING PAYOR LOCATION BASED ON TRANSACTION DATA

(75) Inventors: Lisa C. Tidwell, Houston, TX (US);
Amy L. Swift, Frisco, TX (US);
Cassandra Mollett, Houston, TX (US);
Mark Wallin, Sugar Land, TX (US);
Lance D. Pate, Victoria, TX (US);
Charles R. Williams, Pearland, TX (US)

(73) Assignee: First Data Corporation, Greenwood Village, CO (US)

( * ) Notice: Subject to any disclaimer, the term of this patent is extended or adjusted under 35 U.S.C. 154(b) by 1592 days.

This patent is subject to a terminal disclaimer.

(21) Appl. No.: 10/730,859

(22) Filed: Dec. 9, 2003

(65) Prior Publication Data
US 2005/0125337 A1   Jun. 9, 2005

(51) Int. Cl.
*G06Q 40/00*   (2006.01)
(52) U.S. Cl. ..................................... 705/38
(58) Field of Classification Search ............ 705/35, 705/38–44, 64, 67–69, 74–76; 707/705–708, 707/722–723; 713/175–180
See application file for complete search history.

(56) References Cited

U.S. PATENT DOCUMENTS 4,109,238 A    8/1978   Creekmore
5,491,325 A    2/1996   Huang
5,575,508 A    11/1996  Diamond
5,679,938 A    10/1997  Templeton
5,679,940 A    10/1997  Templeton (Continued)

FOREIGN PATENT DOCUMENTS

WO     WO 01/97134 A1    12/2001

(Continued)

OTHER PUBLICATIONS

"Companies Step Up Against Fraud—New applications predict withheld payments, verify user identify in online credit-card transactions", Internet Week, p. 11, Apr. 23, 2001.*

(Continued)

*Primary Examiner*—Mary Cheung
(74) *Attorney, Agent, or Firm*—Townsend and Townsend and Crew LLP

(57) ABSTRACT

Systems and methods are described for building, maintaining, and using a repository of information about payors of second-party checks presented at a check-cashing entity for cashing. In various embodiments, the repository comprises stored information useful for determining the location of a payor of a second-party check. In one embodiment, information from the check that identifies an account on which the check is drawn, such as magnetic ink character recognition (MICR) line information from a paycheck, is used to access a repository of employer location information. In one embodiment, the payor location information is used to determine a proximity between the payor location and the check cashing entity location. In one embodiment, when a check is presented for which stored payor location information is not available, identifying information about the payor and/or the payor location is requested and is added to the repository.

11 Claims, 23 Drawing Sheets

U.S. PATENT DOCUMENTS

| | | | |
|---|---|---|---|
| 5,768,385 A * | 6/1998 | Simon | 705/69 |
| 5,801,366 A | 9/1998 | Funk | |
| 5,878,141 A * | 3/1999 | Daly et al. | 705/78 |
| 5,930,777 A | 7/1999 | Barber | |
| 6,021,397 A | 2/2000 | Jones | |
| 6,038,553 A * | 3/2000 | Hyde, Jr. | 705/45 |
| 6,097,834 A | 8/2000 | Krouse | |
| 6,181,814 B1 * | 1/2001 | Carney | 382/137 |
| 6,230,148 B1 | 5/2001 | Pare | |
| 6,505,772 B1 | 1/2003 | Mollett | |
| 6,535,728 B1 | 3/2003 | Perfit | |
| 6,547,132 B1 | 4/2003 | Templeton | |
| 6,581,043 B1 | 6/2003 | Wallin | |
| 6,658,393 B1 | 12/2003 | Basch | |
| 6,848,611 B1 * | 2/2005 | Higgins | 235/375 |
| 6,957,770 B1 * | 10/2005 | Robinson | 235/382 |
| 6,999,943 B1 * | 2/2006 | Johnson et al. | 705/39 |
| 7,117,171 B1 * | 10/2006 | Pollin | 705/35 |
| 7,139,731 B1 * | 11/2006 | Alvin | 705/35 |
| 2001/0000535 A1 | 4/2001 | Lapsley | |
| 2001/0039534 A1 * | 11/2001 | Keene | 705/45 |
| 2001/0042785 A1 | 11/2001 | Walker | |
| 2001/0047331 A1 * | 11/2001 | Malanga et al. | 705/40 |
| 2002/0012445 A1 | 1/2002 | Perry | |
| 2002/0052852 A1 | 5/2002 | Bozeman | |
| 2002/0154795 A1 | 10/2002 | Lee | |
| 2002/0178112 A1 | 11/2002 | Goeller | |
| 2003/0023555 A1 * | 1/2003 | Rees | 705/44 |
| 2003/0056104 A1 | 3/2003 | Carr et al. | |
| 2003/0088461 A1 | 5/2003 | Christensen | |
| 2003/0093368 A1 | 5/2003 | Manfre | |
| 2003/0130919 A1 * | 7/2003 | Templeton et al. | 705/35 |
| 2003/0153299 A1 | 8/2003 | Perfit | |
| 2003/0159046 A1 | 8/2003 | Choi | |
| 2003/0172030 A1 | 9/2003 | Volgunin | |
| 2003/0212637 A1 | 11/2003 | Turner | |
| 2003/0213841 A1 * | 11/2003 | Josephson et al. | 235/379 |
| 2003/0216987 A1 | 11/2003 | Mollett | |
| 2003/0216988 A1 | 11/2003 | Mollett | |
| 2003/0217003 A1 * | 11/2003 | Weinflash et al. | 705/42 |
| 2003/0217014 A1 | 11/2003 | Mollett | |
| 2003/0225708 A1 * | 12/2003 | Park et al. | 705/69 |
| 2004/0117302 A1 | 6/2004 | Weichert | |
| 2004/0138975 A1 | 7/2004 | Engel | |
| 2004/0225604 A1 * | 11/2004 | Foss et al. | 705/39 |
| 2004/0245330 A1 | 12/2004 | Swift | |
| 2004/0247168 A1 | 12/2004 | Pintsov | |
| 2005/0080717 A1 | 4/2005 | Belyi | |
| 2005/0080738 A1 * | 4/2005 | Sellen et al. | 705/42 |
| 2005/0125295 A1 | 6/2005 | Tidwell | |
| 2005/0125296 A1 | 6/2005 | Tidwell | |
| 2005/0125338 A1 | 6/2005 | Tidwell | |
| 2005/0125339 A1 | 6/2005 | Tidwell | |
| 2005/0125350 A1 | 6/2005 | Tidwell | |
| 2005/0125351 A1 | 6/2005 | Tidwell | |
| 2005/0125360 A1 | 6/2005 | Tidwell | |
| 2005/0229010 A1 | 10/2005 | Monk | |
| 2006/0202012 A1 | 9/2006 | Grano | |

FOREIGN PATENT DOCUMENTS

| | | |
|---|---|---|
| WO | WO 0197134 A1 | 12/2001 |
| WO | WO 03/042790 A2 | 5/2003 |
| WO | WO 03042790 A2 | 5/2003 |
| WO | WO 03/083751 A1 | 10/2003 |
| WO | WO 03083751 A1 | 10/2003 |

OTHER PUBLICATIONS

U.S. Appl. No. 10/731,038; Office Action; Aug. 17, 2007.
U.S. Appl. No. 10/731,401; Office Action; Jan. 16, 2007.
U.S. Appl. No. 10/731,401; Response to Office Action; May 15, 2007.
U.S. Appl. No. 10/731,401; Office Action; Jul. 27, 2007.
U.S. Appl. No. 10/731,540; Office Action; Jan. 16, 2007.
U.S. Appl. No. 10/731,540; Response to Office Action; May 16, 2007.
U.S. Appl. No. 10/731,540; Notice of Allowance; Jul. 26, 2007.
U.S. Appl. No. 10/730,868; Office Action; Jul. 19, 2007.

* cited by examiner

SCORE CALCULATION A

| Variable | Value | Score |
|---|---|---|
| Check Amount | $1000 | 47 |
| Positive Pay | Match | 500 |
| Local Employer | Yes | 50 |
| Company Size | 1000 | 50 |
| Insignia Confidence | Excellent | 72 |
| Biometric Confidence | Not Used | 50 |
| Previous History | Preferred | 236 |
| Total Amt. Checks/6 days | $1500 | 45 |
| | Total: | 1050 |
| (Cutoff = 235) | TRANSACTION APPROVED | |

SCORE CALCULATION B

| Variable | Value | Score |
|---|---|---|
| Check Amount | $5000 | 10 |
| Positive Pay | Item Paid | -1000 |
| Local Employer | Yes | 50 |
| Company Size | 1000 | 50 |
| Insignia Confidence | Very Weak | 0 |
| Biometric Confidence | Not Used | 50 |
| Previous History | Neutral | 10 |
| Total Amt. Checks/6 days | $8000 | 10 |
| | Total: | -820 |
| (Cutoff = 235) | TRANSACTION DENIED | |

SCORE CALCULATION C

| Variable | Value | Score |
|---|---|---|
| Check Amount | $100 | 49 |
| Positive Pay | Data Unavail. | 50 |
| Local Employer | Unknown | 30 |
| Company Size | Unknown | 30 |
| Insignia Confidence | Unknown | 30 |
| Biometric Confidence | Not Used | 46 |
| Previous History | Above Avg. | 50 |
| Total Amt. Checks/6 days | $1000 | 45 |
| | Total: | 340 |
| (Cutoff = 235) | TRANSACTION APPROVED | |

SCORE CALCULATION D

| Variable | Value | Score |
|---|---|---|
| Check Amount | $100 | 49 |
| Positive Pay | No Match | -100 |
| Local Employer | No | 0 |
| Company Size | 250 | 40 |
| Insignia Confidence | 70% Conf. | 46 |
| Biometric Confidence | 55% Conf. | 20 |
| Previous History | Average | 44 |
| Total Amt. Checks/6 days | $1000 | 45 |
| | Total: | 144 |
| (Cutoff = 235) | TRANSACTION DENIED | |

FIG. 4

| 509 | 510 | 511 | 512 | 513 | 514 | 515 | 516 | 517 | |
|---|---|---|---|---|---|---|---|---|---|
| BANK ROUTING NUMBER | BANK ACCOUNT NUMBER | CHECK NO. | DATE ISSUED | PAYEE | AMOUNT | PAYOR | PAYMENT/ STATUS ACTIVITY | DATE OF PAYMENT/STATUS ACTIVITY | ... |
| | | | | | | | | | |
| | | | | | | | | | |
| | | | | | | | | | |
| | | | | | | | | | |
| | | | | | | | | | |
| | | | | | | | | | |
| | | | | | | | | | |

| ROUTING NUMBER | ACCOUNT NUMBER | PAYOR NAME | PAYOR LOCATION | ... |
|---|---|---|---|---|
| | | | | |
| | | | | |
| | | | | |
| | | | | |
| | | | | |
| | | | | |
| | | | | |

*FIG. 11C*

SYSTEMS AND METHODS FOR IDENTIFYING PAYOR LOCATION BASED ON TRANSACTION DATA

BACKGROUND OF THE INVENTION

1. Field of the Invention

This invention relates generally to risk assessment, and, more particularly, to systems and methods for evaluating risk variables associated with financial transactions.

2. Description of the Related Art

Checks continue to be a popular medium of financial exchange. Many individuals who receive paychecks from their employers or checks from other check issuers may not have a demand deposit account (DDA), such as a checking account in which to deposit their checks, or may prefer to cash their checks rather than depositing them in a bank account before withdrawing the funds. For example, many people prefer to cash their paychecks at a grocery store or check-cashing establishment.

The Financial Service Centers of America (FiSCA), the professional organization for the check cashing industry estimates that 6,000 neighborhood financial service centers cash 180 million checks annually, with the aggregate face value of checks cashed over $55 billion. Furthermore, Dove Consulting estimated that in 2000 there were 9,500 check cashing outlets with an additional 1,300 businesses that offered check cashing as a secondary line of business. A large portion of the clientele at these locations are individuals who do not themselves have bank accounts, a segment of the population sometimes referred to as being "unbanked."

Businesses that cash checks for their customers take a risk that they may not be able to successfully cash the checks they have accepted. Forged checks, stolen checks, checks that have been fraudulently altered, and checks written on accounts with insufficient funds or on accounts that have been closed may contribute to losses sustained by entities that agree to cash checks for individuals.

A check that is written by one party for cashing by another party is often known as a "second-party check." For example, a payroll check issued by an employer to an employee and presented by the employee for cashing at a supermarket, other retailer, or non-bank financial institution (NBFI) may be classified as a second-party check. Businesses that cash second-party checks face extra difficulties in assessing the risk of such transactions because they often wish to assess the trustworthiness of the person presenting the check for cashing as well as the party that wrote the check, the payor, who is not typically present.

Assessing the "unbanked" may be additionally difficult because historical information about their check-related activities may be sparse or unobtainable. Thus, unbanked individuals may have their check-cashing requests, and especially their second-party check-cashing requests, denied more frequently than do individuals with known bank accounts.

Various measures may be implemented by check-cashing entities to reduce the incidence of fraud. For example, check-cashing entities may consult positive pay files before agreeing to cash a check. Positive pay files are lists provided by check issuers, such as employers, of information about checks that they have issued. Finding a record in a positive pay file that matches a check presented to a check-cashing entity and that indicates that the check has not yet been cashed may serve to increase confidence in the legitimacy and "cashability" of the check. Finding a record in a positive pay file that matches a check presented to a check-cashing entity and that indicates that the check has already been cashed may serve to increase suspicion in the fraudulent nature of the check and may decrease confidence in the "cashability" of the check. Thus, positive pay information can, in some circumstances, be useful for check-cashing entities. However, positive pay information is not always available for a presented check and is not always accessible to a check-cashing entity that is considering cashing the check.

As another example of measures that may be implemented to reduce the incidence of fraud, biometric input for identifying the individual presenting a check may be used as a basis for accepting or declining a proposed check-cashing transaction.

Various methods for assessing risk associated with aspects of a check-cashing transaction exist that can be used in a binary fashion to accept or to decline a proposed transaction, but are not useful for expressing intermediate levels of uncertainty regarding risk associated with aspects of the transaction or for generating a risk assessment that is able to integrate a wide variety of relevant, but sometimes contradictory, risk assessment information.

In spite of currently available measures to avoid fraudulent transactions, businesses that cash second-party checks and other non-cash financial instruments continue to sustain losses that could be avoided with enhanced risk assessment.

SUMMARY

Effective new systems and methods are described for use in conjunction with an enhanced risk assessment of a proposed second-party check-cashing transaction, wherein the assessment is based at least in part on location-related information associated with the transaction. For example, in some embodiments, a payroll check presented to a check-cashing entity for cashing may be assessed as being of lower risk when an employer who has issued the payroll check is a local employer rather than when the employer is located at a greater distance from the check-cashing entity. Embodiments of systems and methods are described that allow a check authorization system to use information obtained in association with a proposed check-cashing transaction to identify a location associated with the payor of a presented check.

Systems and methods are described for building, maintaining, and using a repository of information about payors of second-party checks presented at a check-cashing entity for cashing. In various embodiments, the repository comprises stored information useful for determining the location of a payor of a second-party check. In one embodiment, information from the check that identifies an account on which the check is drawn, such as magnetic ink character recognition (MICR) line information from a paycheck, is used to access a repository of employer location information. In one embodiment, the payor location information is used to determine a proximity between the payor location and the check cashing entity location. In one embodiment, when a check is presented for which stored payor location information is not available, identifying information about the payor and/or the payor location is requested and is added to the repository.

In various embodiments, location-based information about the presented check may be expressed as a gradated location-based risk score that reflects a degree of confidence in the likelihood of the check-cashing entity successfully settling the check with the issuing bank. The location-based risk score may be combined with risk scores that are descriptive of other aspects of the proposed check-cashing transaction and may be used to generate an accept/decline recommendation for the transaction.

Various features of the invention provide check-cashing entities with systems and methods for approving a greater portion of legitimate proposed check cashing transactions without incurring a corresponding increase in losses due to returned checks or fraud. The enhanced risk assessment systems and methods described herein may thus encourage the proliferation of locations willing to cash second-party checks, may allow check-cashing entities to keep their service fees low, and may ease the process of check cashing for persons presenting legitimate second-party checks. Thus, the new systems and methods serve to benefit both the check-cashing entities and those presenting the checks.

An embodiment of a method is described for compiling a computer-accessible repository of employer location information for use in assessing the risk of a payroll check-cashing transaction. The method comprises the acts of identifying employers in a desired geographical location and obtaining from the employers identifiers for checking accounts associated with the employers, wherein the checking accounts are accounts drawn on by the employers for writing payroll checks. The method further comprises compiling a repository of records on a computer-accessible storage medium, wherein a record comprises information to identify an employer location and at least one of: an associated employer name and the associated employer checking account. In response to receiving a request to cash a payroll check for which the repository of records does not hold associated employer information, the method further comprises requesting from a check-cashing entity that is processing the request information about at least one of: an employer name, an employer bank account identification, and employer location information. The method further comprises adding the employer information received from the check-cashing entity to the repository.

An embodiment of a method is described for compiling a computer-accessible repository of check-issuer location information for use in check transaction risk assessment. The method comprises the acts of: identifying check issuers in a desired geographical location, obtaining from the check issuers identifiers for checking accounts that are associated with the check issuers, and compiling on a computer-accessible storage medium a repository of records, wherein a record comprises information to identify a check issuer name, an associated check issuers location, and the associated check issuers checking account.

An embodiment of a computer-accessible storage medium is described that stores records of information about check issuers and records of information about check-cashing entities, wherein a record about a check issuer comprises a check issuer identifier and location information that is associated with the check issuer, and a record about a check-cashing identity comprises an identifier for the check-cashing identity and location information associated with the check-cashing identity.

An embodiment of a method of accessing location information for a check transaction is described. The method comprises the acts of obtaining from a check information about an account associated with the check and using the account information to access stored information about a payor associated with the account and about a payor location.

An embodiment of a method is described for compiling a computer-accessible repository of location information about issuers of negotiable instruments. The method comprises the acts of: identifying issuers of negotiable instruments in a desired geographical location, obtaining identifiers associated with negotiable instruments from the issuers of the negotiable instruments, and compiling a repository of records on a computer-accessible storage medium, wherein a record comprises information to identify a name associated with an issuer of negotiable instruments, an associated issuer location, and the associated identifiers associated with the negotiable instruments.

An embodiment of a computer-accessible storage medium is described, wherein the storage medium stores records of information about issuers of negotiable financial instruments and records of information about check-cashing entities. A record about an issuer of a negotiable financial instrument comprises an issuer identifier and location information associated with the issuer. A record about a check-cashing identity comprises an identifier for the check-cashing identity and location information associated with the check-cashing identity.

An embodiment of a system is described for compiling a computer-accessible repository of check issuer location information for use in check transaction risk assessment. The system comprises means for identifying check issuers in a desired geographical location and means for compiling a repository of records on a computer-accessible storage medium, wherein a record comprises information to identify a check issuer name, an associated check issuer location, and an associated check issuer checking account, and wherein the checking account is an account drawn on by the check issuer for issuing checks.

An embodiment of a computer-accessible storage medium is described that comprises information that associates check issuer bank account information with check issuer location information and check-cashing entity location information.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

FIG. 4 depicts four examples of risk score calculations for second-party check transactions.

FIG. 5 shows one embodiment of a repository of positive pay information.

FIG. 11C shows one embodiment of a repository of location-related information about check issuers.

DETAILED DESCRIPTION OF THE EMBODIMENTS

Figure 1:
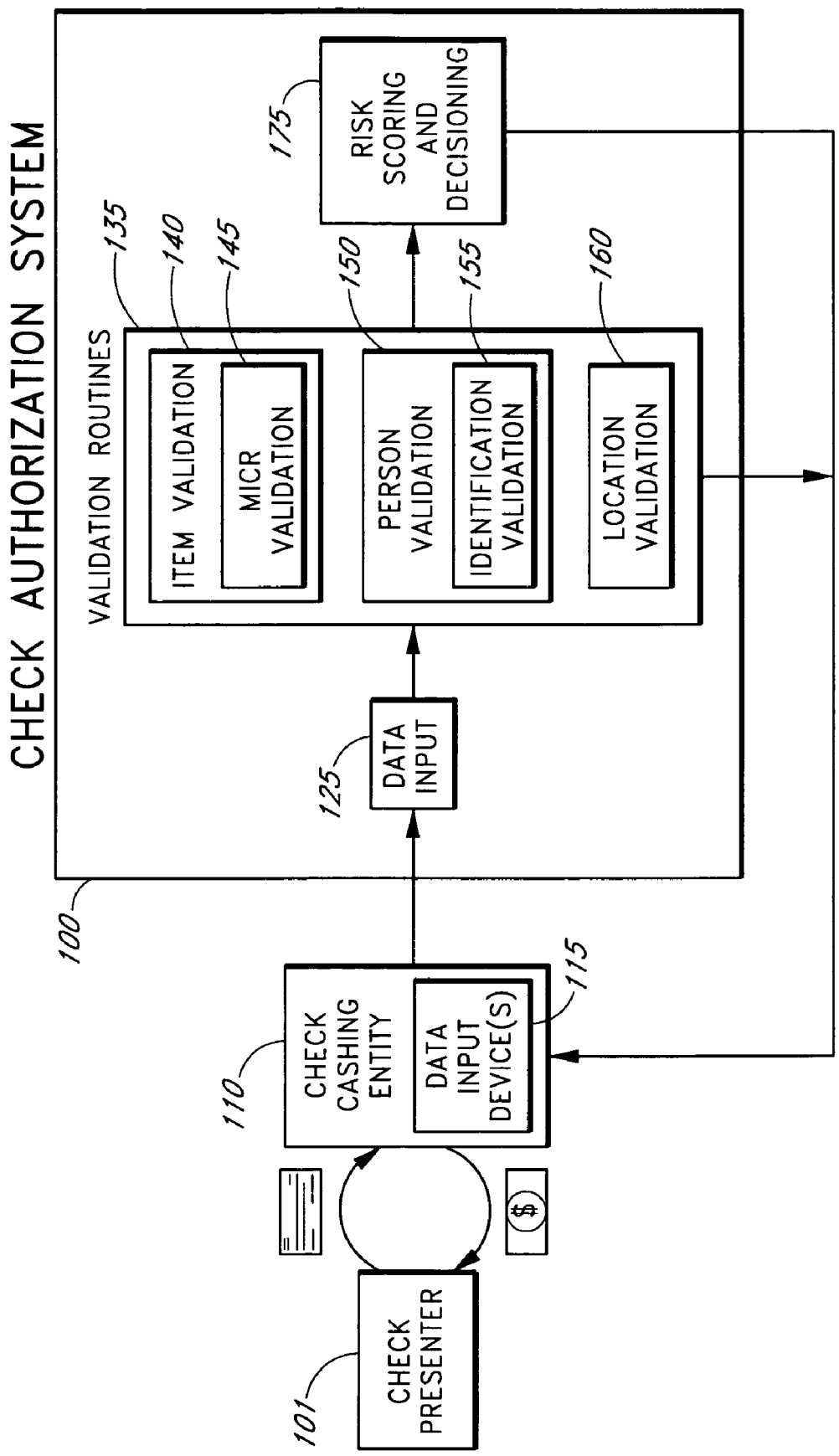
FIG. 1 is a block diagram of one embodiment of a system to authorize the acceptance of second-party checks.

Check fraud is a severe problem within the check cashing and payday loan industries. Check cashing may refer to exchanging a business payroll or insurance check, a government payroll or benefit check, a personal check or other check for at least one of: money, goods and/or services. Payday loan checks refer to a specific subset of personal checks that are cashed for money and are post-dated, often for about two weeks from the check-cashing transaction date. Check-cashing entities and other businesses that offer at least one of check cashing and payday loan check cashing services typically do so for a fee, which may be a flat fee per item, such as $3.00 per check, or may be a percentage of the check item's face value, such as 1% of the face value of the check, or may be determined according to another method.

Various features of the invention provide general check-cashing and payday loan check-cashing entities with systems and methods for approving a greater portion of legitimate proposed check-cashing transactions without incurring a corresponding increase in losses due to returned checks or fraud. More accurate risk assessment for proposed check-cashing transactions may be carried out by considering a variety of factors that reflect the trustworthiness of a person who presents a check and the legitimacy of the check item itself.

For example, risk assessment for proposed check-cashing transactions may be enhanced by a more accurate assessment of the trustworthiness of the check presenter, which may be based at least in part on validating that the person is who he/she claims to be. This can be done, for example, by using biometric information obtained from the check presenter as a factor in a risk score calculation. For example, an individual who intends to cash checks at a check-cashing entity may "register" by providing a biometric sample and variety of additional self-identifying information. Subsequently, when the individual presents a check for cashing at a retailer point of sale or other check-cashing entity location, biometric information obtained from the check presenter at the time of presentment may be compared with stored biometric information from the time of registration in order to verify the identity of the check presenter. Biometric data from a check presenter, one type of person validation data, when compared with a trusted source of biometric data, may yield a perfect or near-perfect match, a clear mismatch, or an intermediate level of confidence in the correct identification of the check presenter, which may be converted to a biometric risk score. The biometric risk score may then be combined with other risk factor scores pertaining to the check presenter, to the check item, and to the location of the check-cashing transaction to generate an overall risk score for the proposed check-cashing transaction, as will be described in greater detail below.

As another example, a more accurate risk assessment associated with a proposed check-cashing transaction may evaluate the authenticity of the check item offered for cashing and may be based, at least in part, on data associated with the check item, such as positive pay information, which is sometimes available from a party who has written or issued the check. Positive pay information, when available, lists information about checks that a check issuer has written and that may be compared to information from the check that is being presented for cashing. For example, information such as payee name, check number, check amount, and/or check issue date obtained from the presented check item at a point of sale or other check-cashing entity location may be compared with information stored in a positive pay list, as will be described in greater detail below. When information from the check item is compared with positive pay data it may yield a clear match, a clear mismatch, or an assessment of confidence in the correct identification of the check item that is less than clear. A positive pay risk or confidence score based on the comparison of the check item to the positive pay information may reflect a level of confidence in the correct identification of the check item. The positive pay risk score may then be combined with other risk factor scores associated with the proposed check-cashing transaction to generate a combined risk score for the proposed check-cashing transaction, as will be described in greater detail below.

Another form of risk assessment that aims to evaluate the legitimacy of a check or other negotiable instrument presented for cashing may be based on watermarks, insignia, security numbers, or other authenticating marks from the face or the back of a check or other negotiable instrument. Authenticating marks are indicia that are typically difficult to reproduce illegitimately and that may thus be relied upon to help ensure the legitimacy of a negotiable instrument. Information about one or more such insignia or authenticating marks obtained from a check presented for cashing at a point of sale or other check-cashing entity location may be compared to stored information about expected configurations for the marks to yield a clear match, a clear mismatch, or an assessment of confidence in the correct identification of the check item that is less than clear. An insignia-related risk or confidence score based on the comparison of the check item to the expected configuration may reflect a level of confidence in the correct identification of the check item. The insignia-related risk score may then be combined with other risk factor scores associated with the proposed check-cashing transaction to generate a combined risk score for the proposed check-cashing transaction, as will be described in greater detail below.

As another example, a more accurate assessment of the cashability of the check item may, additionally or alternatively, be based at least in part on information about the proximity of the check-cashing entity's location to the location of the check issuer, or on other location-based information. For example, in some embodiments, based in part on characteristics of the check-cashing entity, checks issued by check issuers located at a greater distance from the check-cashing entity may exhibit a higher frequency of associated cashing problems. Thus, a location-related risk score may be assigned to a proposed transaction based on the proximity of the check-cashing entity to the check issuer's location. The location-related proximity risk score may be combined with other risk factor scores to generate an overall risk score for the proposed check-cashing transaction, as will be described in greater detail below.

Various embodiments of a check authorization system with enhanced risk assessment features are described. Information obtained by a check-cashing entity in association with a proposed check-cashing transaction may be transmitted to a check authorization system which uses at least some of the information to calculate a risk score for the proposed transaction. In some embodiments, based at least in part on the calculated risk score, the check authorization system may authorize acceptance of the check for cashing or may recommend or provide an indication that the check-cashing entity accept or decline the proposed check-cashing transaction.

As will be apparent to one of ordinary skill in the art, many of the disclosed features may be used without others, and may be implemented differently than described herein. For example, although described primarily in the context of a point-of-sale check cashing environment for second-party checks, the various inventive features are also useful in other situations in which an entity accepts an unknown financial instrument, such as may occur in an accounts receivable or remittance environment. Furthermore, although described with respect to an "individual" presenting a check for cashing, the systems and methods may apply to a group or other entity wishing to cash a financial instrument. The following description is thus intended to illustrate, and not to limit the claimed systems and methods.

Risk Scoring for Checks and Other Negotiable Instruments

FIG. 1 is a block diagram of one embodiment of a system 100 to authorize acceptance of second-party checks. As shown in FIG. 1, a check presenter 101 presents a check to a check-cashing entity 110. In the embodiment shown, the check-cashing entity 110 requests approval for the transaction from a check authorization system 100. In one preferred embodiment, if the check authorization system 100 approves the transaction, the check-cashing entity 110 may accept the check and pay the check presenter 101 an equivalent amount of cash, minus any fees associated with the transaction. In other embodiments, if the check authorization system 100 approves the transaction, the check-cashing entity 110 may accept the check in exchange for goods and/or services, for a combination of goods and/or services and cash, or for deposit. As used herein, the term "cashing" is used to signify accepting the check for any combination of cash, goods, services, credit, or the like.

The check presenter 101 may be an individual wishing to cash a paycheck or other check. In other embodiments, the check presenter 101 may be another type of entity, such as a company or corporation, a non-profit organization, group of individuals, or other entity that has a check or other negotiable financial instrument to be cashed.

In various embodiments, the check to be cashed is a payroll check being cashed by an employee. In other embodiments, the check presenter 101 may wish to cash a different type of check or negotiable financial instrument, such as, but not limited to: a personal check, a corporate check, company insurance refund check, a government check, such as a tax refund check, Social Security check, payroll check, or other government-issued check, a traveler's check, bank check, official check, convenience check, money order, second-party check or other obligation, third-party check, value-carrying paper, or other type of cashable financial instrument. It is to be understood that the use of the term "check" in the context of this disclosure may refer to any of the above or other types of financial instrument.

In some embodiments, the check-cashing entity 110 may be a grocery store, convenience store, or other retail or merchant facility that wishes to provide second-party check cashing services to its customers at points of sale, at specialized kiosks, or at other locations within the merchant facility. In other embodiments, the check-cashing entity may be a pawnshop, resort, casino, or other establishment that wishes to make cashing checks convenient for its patrons. In still other embodiments, the check-cashing entity 110 may be a financial institution or non-bank financial institution (NBFI) such as a specialized business that offers check-cashing or money exchange services to individuals wishing to cash checks, possibly along with related services such as payday loans, local and overseas money wiring, and the like. In some embodiments, the check-cashing entity 110 may be a kiosk, stand, or other manned or unmanned location configured to provide check-cashing services.

In the embodiment shown in FIG. 1, the check-cashing entity 110 comprises one or more computer processors. In various embodiments, the computer processor is one of a wide variety of point-of-sale devices, such as an Eclipse terminal. The computer processors may comprise, by way of example, personal computers (PCs), mainframe computers, other processors, program logic, or other substrate configurations representing data and instructions, which operate as described herein. In other embodiments, the processors may comprise controller circuitry, processor circuitry, processors, general purpose single-chip or multi-chip microprocessors, digital signal processors, embedded microprocessors, microcontrollers and the like.

In various embodiments, the check-cashing entity 110 may comprise a display for communicating a message to an operator at the check-cashing entity 110, such as instructions for working with the check authorization system 100, a message received from the check authorization system 100, and the like.

In the embodiment shown in FIG. 1, the check-cashing entity 110 comprises one or more data input devices 115 for obtaining data associated with the proposed check-cashing transaction from the check presenter 101 and from the check. For example, the data input devices 115 may comprise a check-scanning device for scanning an electronic image of the check or of another document. The data input devices 115 may comprise a device configured to read a magnetic ink character recognition (MICR) line from the face of the check or other document. The data input devices 115 may comprise a graphic device or system configured to obtain information about a watermark, barcode, insignia, security number, background pattern, reflective fibers, electronic signal, or other authenticating mark or device from a check. The data input devices 115 may comprise a device configured to read a magnetic stripe from a driver's license, identification card, credit card, or other suitably configured card. The data input devices 115 may comprise a device configured to scan, photograph, or otherwise capture an image and/or other information from a driver's license or other identification card or document. The data input devices 115 may comprise an input system configured to use optical character recognition (OCR) technology. The data input devices 115 may comprise one or more devices or systems for obtaining biometric input from the check presenter 101, such as, for example, a camera, microphone, or device capable of obtaining a fingerprint, handprint, voice sample, handwriting sample, iris or retina scan, or other biometric or biomedically implanted information useful for identifying the check presenter 101. The data input devices 115 may comprise a keyboard, keypad, stylus, touchscreen, or other device for manually entering data associated with the proposed check-cashing transaction. The data input devices 115 may comprise a voice recognition system, or other device for verbally entering data associated with the proposed check-cashing transaction. The data input devices 115 may comprise a device or system for obtaining other information useful for assessing the risk associated with approving the proposed check-cashing transaction.

In various embodiments, the check presenter 101 registers with the check-cashing entity 110 prior to or at the time of a first check-cashing transaction, providing the check-cashing entity with identifying information about the check presenter 101 and other information useful for ensuring the security of and/or assessing the risk associated with accepting checks for cashing from the check presenter 101. In some embodiments, the check presenter 101 may be asked to provide information about typical checks that the check presenter 101 expects to present for cashing. In some embodiments, the check-cashing entity may ask for information about the name and location of the registering check presenter's 101 employer. For example, the check presenter 101 may expect to cash a bi-monthly paycheck from a given employer for a given estimated amount of money. In some embodiments, the check-cashing entity 110 may ask the check presenter 101 to submit a biometric sample that may be stored and later compared with a biometric sample obtained from the check presenter 101 when a check is being presented for cashing. For example, an individual wishing to register for check cashing privileges may be asked by the check-cashing entity 110 to submit a fingerprint, or to be photographed, or to allow a sample retina scan to be taken. The biometric sample submitted during registration may be stored by the check-cashing entity 110 or by a third party biometric evaluation service and may be used for comparison with a sample submitted in association with a proposed transaction.

In some embodiments, when a check presenter 101 is registered for check cashing and is accepted, the check-cashing entity 110 issues a personal identification number (PIN) to the check presenter 101 for use in subsequent check-cashing transactions and to allow for easy access to stored information about the check presenter 101. In other embodiments, other useful information is gathered about the check presenter 101 and/or about the checks that are expected to be cashed.

In the embodiment shown in FIG. 1, the check-cashing entity 110 comprises a communications interface for communicating with the check authorization system 100 to request an authorization approval or decline recommendation for the proposed check-cashing transaction, transmitting at least some of the information received from the check presenter 101 and from the check. The check-cashing entity 110 also comprises a communications interface to receive requests for further information from the check authorization system 100 and to receive an indication from the check authorization system 100 regarding whether to accept or to deny the proposed check-cashing transaction.

In one embodiment, the check authorization system 100 is a business entity that provides risk assessment services to check-cashing entities 110. In one embodiment, the check authorization system 100 is one component of a business entity that that provides check-cashing entities 110 with risk assessment services in addition to other check-related services, such as check settlement services, check guarantee services, and the like. In various embodiments, check-cashing entities 110 may contract with the check authorization system 100 to receive services comprising at least one of: validation services, risk assessment services, check processing services, and check settlement services. These services may be customized to serve the varying needs and preferences of different check-cashing entities. For example, risk assessment of proposed check-cashing transactions may be customized, based on a contracted agreement between the check authorization system 100 and a given check-cashing entity 110, to accommodate varying levels of risk tolerance, varying levels of exposure to fraudulent check-cashing activities, and varying characteristics of typical transactions and typical check presenters on the part of the check-cashing entity 110.

In other embodiments, the check authorization system 100 is a software component that is internal to the check-cashing entity 10 and that performs validation and authorization functions with check-cashing transactions.

In one embodiment, the check-cashing entity 110 communicates with the check authorization system 100 using a dial-up communications medium or other suitable medium for accessing the Internet, which is a global network of computers. In other embodiments, the check-cashing entity 110 communicates with the check authorization system 100 using a communications medium that may comprise, by way of example, a Virtual Private Network (VPN), dedicated communication lines such as T1 or frame relay for host-to-host connection, or other combination of telephone networks, wireless data transmission systems, two-way cable systems, customized computer networks, interactive kiosk networks, automatic teller machine networks, interactive television networks, and the like. In other embodiments, the check-cashing entity 110 communicates with the check authorization system 100 using other technologies.

As shown in FIG. 1, the check authorization system 100 comprises a data input component 125, validation routines 135, and a risk scoring and decisioning component 175. With respect to a variety of different components associated with the check authorization system 100 and described herein, the components may be embodied as computer program logic configured to execute on one or more computer processors. In one embodiment, the program logic may advantageously be implemented as one or more modules. The modules may comprise, but are not limited to, any of the following: software or hardware components such as object-oriented components, class components, task components, processes methods, functions, attributes, procedures, subroutines, segments of program code, drivers, firmware, microcode, circuitry, data, databases, data structures, tables, arrays, or variables.

The one or more computer processors associated with the check authorization system 100 may comprise, by way of example, personal computers (PCs), mainframe computers, other processors, program logic, or other substrate configurations representing data and instructions, which operate as described herein. In other embodiments, the processors may comprise controller circuitry, processor circuitry, processors, general purpose single-chip or multi-chip microprocessors, digital signal processors, embedded microprocessors, microcontrollers and the like.

In one embodiment, the data input component 125 accepts data that is transferred from the check-cashing entity 110 regarding the check presenter 101, regarding the check-cashing entity 110, and regarding the check that the check presenter 101 wishes to cash. In some embodiments, the data input component 125 may also receive other data useful for authorizing a check from other sources. The data input component 125 sends the data to the validation routines 135 for validation and for use in risk assessment.

In various embodiments, the validation routines 135 validate the data received, as will be described in greater detail with reference to FIG. 2. In some embodiments, validating the data comprises verifying that various general characteristics of the data, such as, for example, the format of the data, the range of the data values, and the like, conform to expected and acceptable specifications. In some embodiments, the validation routines 135 serve as a filter, rejecting or returning for correction any data that does not conform to the validation specifications. In some embodiments, validating the data comprises verifying individual or numerous specific, possibly even unique, characteristics of the data such as, for example, a bar code, check number and corresponding dollar amount, watermark, biometric fingerprint, specific known personal identification number (PIN) or ID, or the like.

In some embodiments, the validation routines 135 use the data received from the check-cashing entity 110 to gather further data that is useful for assessing the risk associated with accepting the proposed check-cashing transaction. For example, using check account identification information and other information that may be gathered from the face of the check, the validation routines 135 may be able to access positive pay information for the account, as will be described in greater detail with reference to FIGS. 5-8. As another example, using check account identification information, the validation routines 135 may be able to access stored historical data associated with the account that may be indicative of the trustworthiness of the check issuer.

In some embodiments, the validation routines 135 use the data received to assign risk scores to various factors associated with the proposed transaction. In some embodiments, risk scores for variables are calculated to express a measure of similarity with a desired or expected value. This may be the case when, instead of a perfect match or mismatch, the validation routines indicate similarity or desirability of some but not all aspects of a variable. In some embodiments, the factors are considered as variables in a more comprehensive calculation of risk associated with proposed transaction and the factor risk scores are used in a more comprehensive risk scoring calculation or other risk assessment for the proposed transaction.

In the embodiment depicted in FIG. 1, the validation routines 135 comprise validation routines for item validation 140, for person validation 150, and for location validation 160.

The item validation routines 140 comprise routines for gathering and validating data about the check or other financial instrument presented for cashing. Item validation routines serve to increase confidence that a financial instrument received for cashing is legitimate, is cashable, and is not a forgery, a stolen check, or a check that has been altered. For example, a MICR validation routine 145 validates that MICR information received from the check-cashing entity 110 conforms to accepted MICR formatting standards. In embodiments where information about the check issuer is submitted by the check-cashing entity 110, and where such data is available, the MICR validation routine 145 may comprise routines to verify that the account identified in the MICR line information is indeed associated with the check issuer.

In some embodiments, the item validation routines 140 comprise routines to access positive pay or other reconciliation information available about the check being presented for cashing. Positive pay information comprises information made available by a check issuer about checks that the check issuer has issued. Other types of reconciliation information may be provided by government entities that issue checks and by issuers of traveler's checks, money orders, convenience checks, and the like. In some embodiments, positive pay information or other reconciliation information is used to help assess the legitimacy and cashability of the check being presented. Other embodiments use other features and/or characteristics of the item to be cashed, comprising, but not limited to, bar codes, watermarks, special ink bleeds, unique icons, encryption features, and the like.

Person validation routines 150 comprise one or more routines to gather and/or evaluate data sent to the check authorization system 100 useful for assessing the trustworthiness of the check presenter 101 and for assessing confidence that the check-presenter 101 is the payee of the presented check. For example, person validation routines 150 may comprise an identification validation routine 155 that validates an association between an identification number received as input and a payee name on the check. In one embodiment, an identification validation routine 155 verifies that identification information, such as a driver's license or social security number, received about the check presenter 101 conforms to formatting standards for the type of identification. In one embodiment, person validation routines 150 comprise routines to evaluate biometric input obtained from the check presenter 101. Person validation routines 150 may comprise one or more routines to gather and/or evaluate other data associated with identifying the check presenter 101. For example, person validation routines may also validate factors that comprise, but are not limited to, personal identification numbers (PINs), store or location membership IDs, photo IDs, correspondence of input data, such as name, address, Social Security Number to credit bureau or credit header data, and the like.

Location validation routines 160 comprise routines to collect and/or to validate information associated with the check-cashing entity 110. For example, a location validation routine 160 may use identification information received about the check-cashing entity 110 to access additional information about the check-cashing entity 110 that may be relevant to an assessment of the risk associated with accepting the proposed check-cashing transaction. For example, historical data may reveal that high-dollar-value checks cashed at pawn shops are more frequently fraudulent than similar checks cashed at grocery stores, and this data may be used as a factor in a risk assessment for the proposed transaction. In embodiments in which information about the proximity of the check issuer's location to the check-cashing entity's 110 location is used for risk assessment, a location validation routine 160 may access information about the location of the check-cashing entity 110 for comparison. As another example, the location validation routines 160 may additionally or alternatively access information about service preferences from a service agreement entered into by the check-cashing entity 110 and the check authorization system 100 that may be relevant to a risk assessment of the proposed transaction. For example, agreements about levels of risk that the check-cashing entity 110 is willing to accept when cashing a check may influence risk assessment for transactions at the check-cashing entity 110.

As depicted in the embodiment of FIG. 1, if any of the validation routines 135 reveal that data received via the data input component 125 is not in conformance with expected standards, or otherwise indicates an unacceptable check-cashing transaction, the check authorization system 100 may preemptively reject the proposed transaction and may notify the check-cashing entity 110 to that effect. In some embodiments, rather than preemptively rejecting the proposed transaction, the check authorization system 100 may send a request for further information or for corrected information to the check-cashing entity 110. In other embodiments, the validation routines 135 may be organized in a hierarchy, such that a set of validations may be performed and passes before a next set of validations is performed.

When the validation routines component 135 indicates that the data is acceptable, the check authorization system 100 may activate the risk scoring and decisioning component 175, which in some embodiments, calculates a risk score for the proposed transaction and provides an approval or decline recommendation to the check-cashing entity 110. In some embodiments, the validation routines component 135 transmits data that has been validated as to its format, value range, and the like, and the risk scoring and decisioning component 175 assigns risk scores to the risk factors for use in calculating a transaction risk score. In some embodiments, the validation routines component 135 calculates risk scores associated with individual validated input data items and transmits the risk scores to the risk scoring and decisioning component 17 for use in calculating a risk score for the check-cashing transaction.

Risk scoring algorithms generally take into account available pieces of data that have been determined to be statistically significant to an assessment of the risk associated with accepting a transaction. The transaction risk score may be a normalized value that indicates the probability that the transaction will be good. In some embodiments, risk assessment for the proposed transaction and for the individual risk factors is accomplished using at least one of: a decision tree, expert system, set of business rules, neural network, Bayesian network, or the like, in addition to or as an alternative to calculating a risk score. Risk scoring and decisioning functions and structures are described in greater detail with reference to FIGS. 3-4 and FIGS. 8-14.

The check authorization system 100 may be implemented by a business entity offering services associated with the acceptance and processing of second-party checks. For example, in one embodiment, the check authorization system 100 system offers validation services to verify the conformance of data received by the check-cashing entity 110 to acceptable values and/or formats. The check authorization system 100 may be one component of a more comprehensive business entity that offers services related to risk management and/or transaction handling for check-related or other financial transactions. The check authorization system 100 may also be implemented as computer software, a distributed file, database accessed via the Internet, or on a computer operated by the check authorization system 100 or the check-cashing entity 110, or on a server for a networked group of check-cashing entities 110, such as a chain of check-cashing stores, or as a centralized system that provides services to entities who subscribe to their services, or in some other suitably configured manner.

Based on service agreements reached between the check-cashing entity 110 and the check authorization system 100, a notification based at least in part on the risk assessment performed by the risk scoring and decisioning component 175 may be transmitted from the check authorization system 100 to the check-cashing entity 110. The check-cashing entity 110 may then accept or decline the check for cashing.

The structure and configuration of components and communications links depicted in FIG. 1 are one of a plurality of possible structures and configurations suitable to the purposes of the check authorization system 100 described herein. Furthermore, other embodiments of the systems and methods described herein are envisioned which may comprise some, all, or none of the features described with reference to FIG. 1. Thus, FIG. 1 is intended to aid in describing and clarifying the features and not to limit the description.

Figure 2:
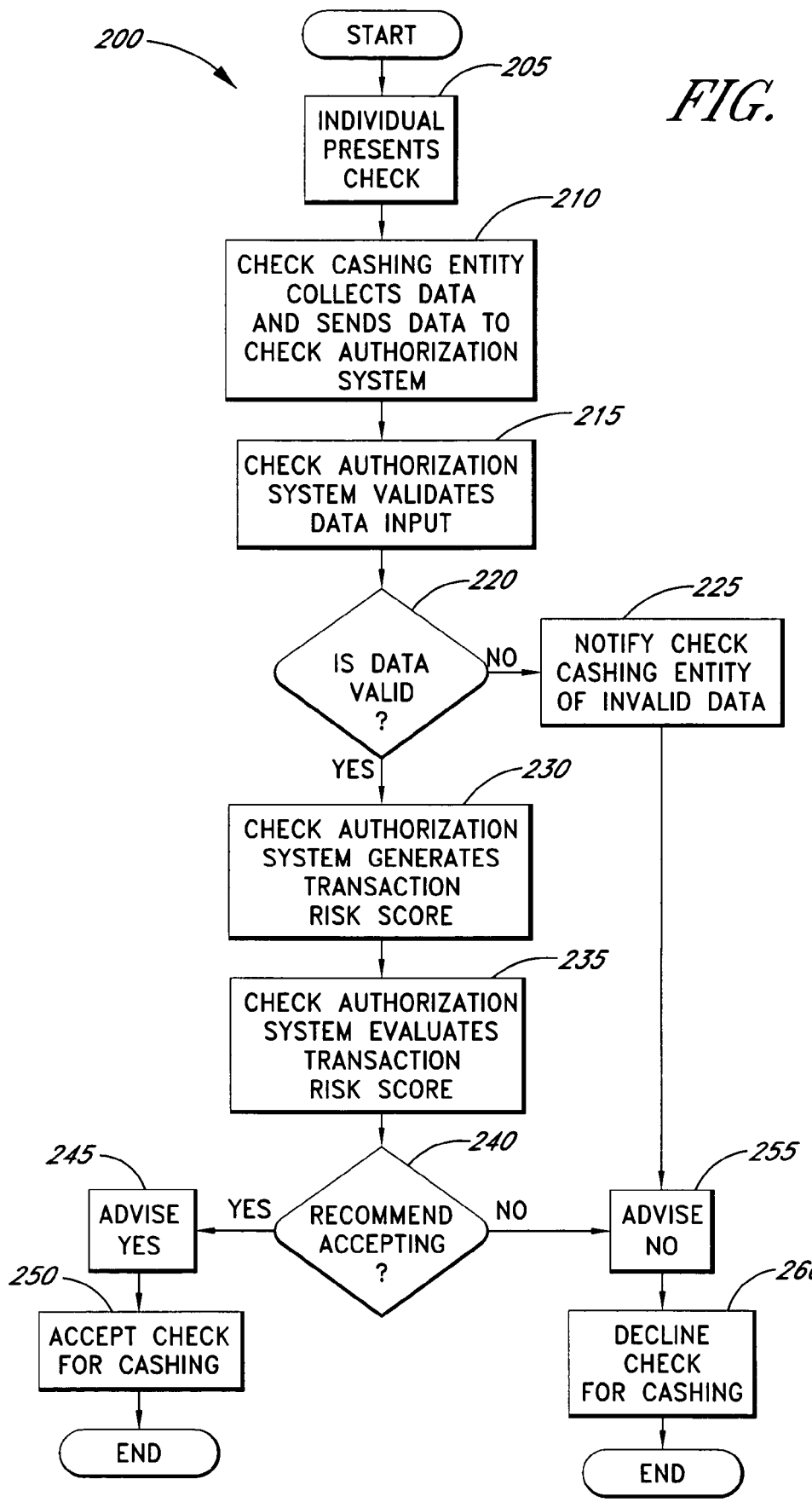
FIG. 2 is a flowchart depicting one embodiment of a process to authorize the acceptance of second-party checks.

FIG. 2 is a flowchart depicting one embodiment of a process 200 to authorize the acceptance of second-party checks. The process 200 begins at a start state and moves to state 205 when a check presenter 101 wishing to cash a check or other financial instrument presents the instrument to a check-cashing entity 110.

The process continues at state 210, where the check-cashing entity 110 collects data associated with the proposed check-cashing transaction and sends the data to the check authorization system 100.

In various embodiments, various types of data may be collected by the check-cashing entity 110. For example, information about the check presenter 101 and information about the check or other financial instrument to be cashed may be collected and transmitted to the check authorization system 100. Some examples of information about the check presenter 101 that may, in various embodiments, be collected comprise: a driver's license number, social security number, other identification or PIN number, name, address, employer information, photograph, other biometric information, other information from a smart card, information from a biomedical implant, and the like. Some examples of information about the check that may be collected comprise: payor information, payee information, check amount, issue date, account number and bank routing number for the account on which the check is drawn, other imprinted information from the face of the check, MICR line information, optical or other scan or image of the check or of any authenticating marks or insignia from the check, information about characteristics of the check such as check dimensions and/or reflectivity of the check material, and the like. In various embodiments, the check-cashing entity 110 may transmit information about the check-cashing entity 110 itself, so that the check authorization system 100 may identify, may categorize, and/or may access stored information about the check-cashing entity 110, such as check entity location, type, and/or contracted service parameters.

The check-cashing entity 110 communicates with the check authorization system 100 to request an authorization approval or decline recommendation for the proposed check-cashing transaction, transmitting at least some of the information received from the check presenter 101 and from the check.

The process 200 continues at state 215, where the check authorization system 100 validates the data received from the check-cashing entity 110. As was described with reference to FIG. 1, in one embodiment, validation comprises verifying that data received from the check-cashing entity 110 falls into acceptable ranges of values, is correctly formatted, and makes sense when combined with other data. In other embodiments, determining that received data is valid may rely on other criteria. In some embodiments, validating data comprises comparing data input with stored data values or data ranges. In some embodiments, the check authorization system 100 uses internally stored data for comparing with data input. In some embodiments, the check authorization system 100 accesses externally stored data via dial-up or other computer communication technologies for comparing with data input.

In some embodiments, validation further comprises accessing additional data deemed to be useful to a risk assessment of the proposed transaction. For example, in embodiments that use positive pay information for calculating a transaction risk score, validation may comprise accessing stored positive pay information associated with the check, as will be described in greater detail with reference to FIGS. 5-8. In one embodiment, if positive pay information associated with a proposed transaction indicates a high level of risk associated with accepting the transaction, the positive pay information may be characterized as not being "valid" for purposes of approving the transaction.

The process continues at state 220, where the check authorization system 100 determines if the transaction data is valid. In one embodiment, if some or all of the data is determined not to be valid, the check authorization system 100 notifies the check-cashing entity of the invalid data in state 225, and in state 255 advises the check-cashing entity 110 not to accept the check for cashing.

Returning to state 220, if the check authorization system 100 determines that the transaction data is valid, the process 200 continues in state 230, where the risk scoring and decisioning component 175 of the check authorization system 100 generates risk scores for some or all of the input variables as well as a combined risk score for the proposed check-cashing transaction, as will be described in greater detail with reference to FIG. 3 and FIG. 4.

Continuing on to state 235, the check authorization system 100 evaluates the calculated risk score to determine whether to recommend that the check-cashing entity 110 accept or decline the proposed transaction. In one embodiment, the determination is based on at least one of: predetermined threshold values, pre-agreed business practices associated with the entity's 110 service agreement, and business rules affected by the entity's 110 type. In other embodiments, the check authorization system 100 evaluates the calculated risk score based on other criteria.

The process 200 continues to state 240, where, based at least in part on the evaluation of state 235, the check authorization system 100 recommends accepting or declining the proposed check-cashing transaction. If the check authorization system 100 determines that recommending acceptance of the proposed transaction is indicated, the process 200 continues at state 245 where the check authorization system 100 advises the check-cashing entity 110 to accept the transaction. The process 200 continues to state 250, where the check-cashing entity 110 accepts the check from the check presenter 101 for cashing, and the process 200 is complete.

Returning now to state 240, if the check authorization system 100 determines that recommending that the check-cashing entity 110 decline the proposed transaction is indicated, a decline recommendation is transmitted to the check-cashing entity 110. In one embodiment, if a risk score calculated for the transaction falls within a pre-determined "decline range of value" set by the check-cashing entity 110, the check authorization system 100 declines or recommends declining the proposed transaction. The process 200 continues at state 255 where the check authorization system 100 advises the check-cashing entity 110 to decline the transaction. The process 200 continues to state 260, where the check-cashing entity 110 may decline to cash the check offered by the check presenter 101, and the process 200 is complete.

The flowchart of FIG. 2 describes one embodiment of the process 200 to authorize the acceptance of second-party checks as comprising various states in which various functions are carried out. As will be familiar to one of ordinary skill in the art, in other embodiments, the process 200 may be executed using a different order, configuration, or set of states, and the states of the process 200 may perform the functions differently from the embodiment of FIG. 2, without departing from the spirit of process 200.

Figure 3:
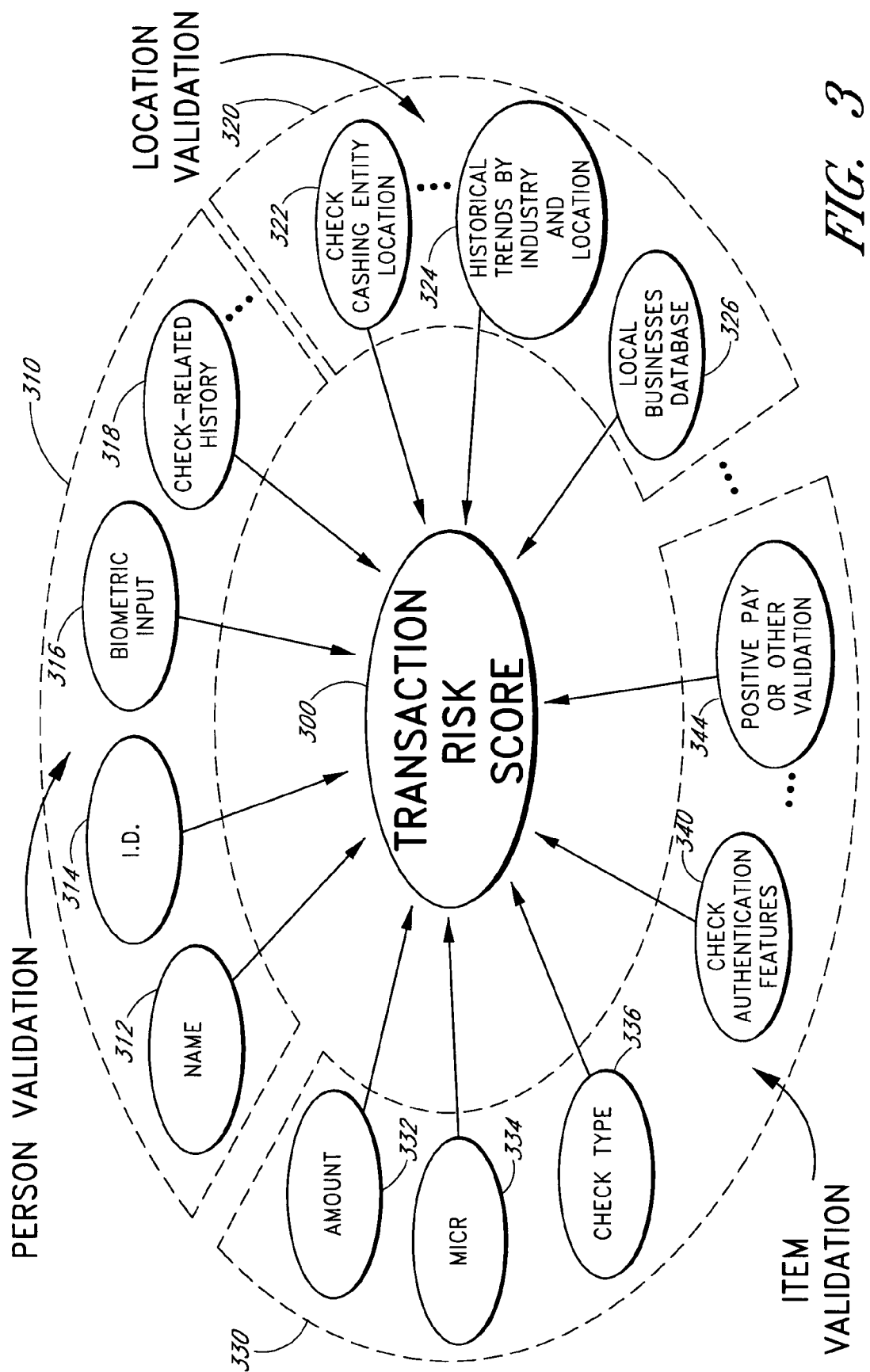
FIG. 3 is a diagram that depicts one embodiment of a set of factors used to generate a transaction risk score for acceptance of a second-party check.

FIG. 3 is a diagram that depicts one embodiment of a set of factors used to generate a transaction risk score 300 for acceptance of a second-party check.

Assessing a risk score may advantageously comprise predictive modeling systems that analyze a plurality of relevant variables, or factors, in order to determine the probability of a particular transaction being good or bad, such as the probability the transaction will or will not clear the banking system. In some embodiments, individual factors or a subset of factors may be evaluated and assigned a risk score, which may then be used on its own to assess a proposed transactions, or may be aggregated with other scores to generate a transaction risk score. Transaction risk scoring algorithms generally take into account those pieces of available data that have been determined to be statistically significant to an assessment of the risk associated with accepting a transaction. The risk score may be a normalized value that indicates the probability that the transaction will be good.

For ease of description, the factors in the embodiment depicted in FIG. 3 are illustrated as being conceptually divided into three categories: factors associated with person validation 310, factors associated with location validation 320, and factors associated with item validation 330. In various embodiments, other categories and/or other factors may be used additionally or alternatively for use in calculating a transaction risk score 300. Furthermore, the specific instances of item validation, such as using positive pay information, and personal validation, such as using biometric information, described herein are intended to be exemplary, rather than limiting.

As was described with reference to validation routines 135 in FIG. 1, person validation refers to a consideration of factors 310 that may increase the accuracy of an assessment of the check presenter's 101 trustworthiness. Item validation refers to a consideration of factors 330 that may increase the accuracy of an assessment of the check item's authenticity. Location validation refers to a consideration of factors 320 associated with characteristics of the check-cashing entity 110 that may provide additional information for increasing the accuracy of a risk assessment for the transaction. In some embodiments, location validation 320 further refers to factors reflective of preferences and business agreements between the check-cashing entity 110 and the check authorization system 100.

As depicted in FIG. 3, person validation factors 310 comprise factors that serve to identify the check presenter 101, such as, for example, the check presenter's name 312 and identification information 314. The identification factors 314 may comprise information from a driver's licenser or state-issued identification card, other photo identification card, a social security card, smart card, transponder, biomedical identification implant, or other technology for identifying the check presenter 101.

In one embodiment, biometric input 316 obtained from the check presenter 101 at the check-cashing entity 110 is used to increase confidence that the check presenter 101 is being correctly identified. Examples of biometric input include, but are not limited to, input from at least one of a: fingerprint, palm print, hand geometry, voice sample recognition, facial recognition, facial geometry scan, iris scan, retina scan, DNA sample, biomedical implant chip or other device, signature scan, and keystroke dynamics. In one embodiment, biometric input information about the check presenter 101 is compared to stored biometric-related information for the check presenter 101. In one embodiment, biometric input such as a fingerprint or facial image is input from the check presenter 101 at the check-cashing entity 110 and is compared to corresponding information extracted from another source of identification information received from the check presenter 101, such as a fingerprint or photograph on a driver's license, smart card, or other identification information source. In various embodiments, the above-described comparisons of biometric input may be executed by the check-cashing entity 110, by the check authorization system 100, or by a third party service.

In one embodiment, identification 314 information gathered about the check presenter 101 allows the check authorization system 100 to access stored information about the check presenter's 101 check-related history 318. The check-related history 318 may comprise information about checks that the check presenter 101 has previously written. Thus, for example, if the check presenter 101 has a checking account and has recently written several checks that have bounced, this information may be used as a factor in an assessment of the risk of accepting the proposed check-cashing transaction. The check-related history 318 may comprise information about checks that the check presenter 101 has previously cashed. Thus, for example, if the check presenter 101 has, on a weekly basis, cashed checks that were settled without problem, this information may be used as a factor in an assessment of the risk of accepting the proposed check-cashing transaction. Information about checks that the check presenter 101 has cashed may, in some embodiments, be obtained for both check presenters 101 that have checking accounts and for check presenters 101 that do not have checking accounts, thus allowing for an enhanced risk assessment of "unbanked" check presenters 101.

In some embodiments, the check-related history 318 may comprise information about the number of check transactions and/or the cumulative dollar amount of the check transactions in which the check presenter 101 was recently involved, as will be described in greater detail with reference to FIG. 4. In other embodiments, other types of check-related information 318 may be used to enhance the risk assessment for a proposed check-cashing transaction. Similarly, in various embodiments, other types of person validation factors 310 may be used to enhance the risk assessment for a proposed check-cashing transaction.

As depicted in FIG. 3, item validation factors 330 comprise factors that serve to assess a level of confidence in the authenticity and cashability of the check or other financial instrument being presented for cashing. Examples of item validation factors 330 used for calculating a transaction risk score 300, as depicted in FIG. 3, comprise, for example, the amount of the check 332, MICR-line information 334 extracted from the check, and check type 336 information. In some embodiments, risk associated with a proposed check-cashing transaction may be assessed as being higher with a greater check amount 332. MICR-line information 334 may comprise, in some embodiments, information for identifying the bank and the account on which the check is drawn, as well as the check number. In some embodiments, information about the check type 332 allows the check authorization system 100 to distinguish, for example, a payroll check from a personal check or a cashier's check, which may allow for accessing associated information and for assessing the proposed transaction accordingly.

FIG. 3 also depicts the use of check authentication features 340, such as, for example, a watermark, heat-sensitive mark, security validation number, bar code, insignia, background pattern, color scheme, microprinting, colorshifting ink, holographic strips, ultraviolet light sensitive fibers, encryption, or other authentication mark or device which may serve to enhance confidence in the authenticity of the check, in addition to or as an alternative to features that serve to identify a check. In some embodiments, a data input device 115 at the check-cashing entity 110 is configured to obtain an image of a bar code, watermark, insignia, or other authenticating mark from the face of the check for comparison with an expected image of the authenticating mark. In some embodiments, allowances are made for imperfections in data input technology associated with the input device 115 and/or imperfections in the authenticating mark on the check face that may cause the comparison with the expected image of the mark to yield a result that is neither a perfect match nor a definite mismatch. For example, a check that has been folded and refolded before being presented for cashing, or that has become damp, rubbed, or otherwise allowed to experience a degree of deterioration, may exhibit an authenticating mark that is less than perfect even when the check is legitimate and cashable. An insignia-related risk score based on a level of confidence associated with a comparison of an authenticating mark may be used as a factor in a risk assessment for the proposed transaction.

Also depicted in FIG. 3 as an example of an item validation factor 330 is information from a positive pay file 344, other list of reconciliation information, or check validation information. Positive pay systems are check reconciliation systems whereby a check issuer keeps a list of issued checks and provides a copy of the list to its bank or other provider of positive pay information services. The list, often known as a positive pay file, may include information such as, but not limited to, check identification number, check amount, check issue date, and payee name. In some embodiments, before the check issuer's bank accepts a check for debiting from the check issuer's account, information from the presented check is compared to the information on the positive pay file. If the check does not match an entry on the list, it may not be accepted for cashing or it may be associated with a higher perceived level of risk. As a check is accepted for cashing, a notation may be made in the positive pay file signifying that the item has now been paid. If the same check, or what appears to be the same check, is presented again for cashing, the notation in the list shows that the check has already been paid, implying that at least one of the checks is a copy or forgery.

Positive pay information may be useful to entities that cash second-party checks. Verifying that a check matches information on a positive pay file provided by the check issuer increases the check-cashing entity's confidence in the cashability of the check and, thus, in the security of accepting the check.

In other embodiments, as an addition or an alternative to some, all, or none of the item validation factors described with reference to FIG. 3, other types of factors pertaining to the validity of the item being presented for cashing may also be used in calculating a transaction risk score 300 or in otherwise assessing the risk of the proposed check-cashing transaction. As one example, additional reconciliation information may be available for issued money orders, traveler's checks, government checks, and the like.

FIG. 3 also depicts examples of location validation factors 320 associated with the check-cashing entity 110 that may be used in calculating a transaction risk score 300. Historical trends by industry and location 324 may draw on stored information about previous check-cashing transactions at the check-cashing entity 110, or at similar check-cashing entities, and upon associated levels of risk associated with future transactions at similar settings. Thus, if checks cashed at grocery stores have demonstrated a lower level of fraud than have checks cashed at gambling casinos, then the historical trends by industry and location 324 factors of the transaction risk score 300 calculation may reflect this information. In some embodiments, check-cashing entities may be categorized according to a Standard Industry Code (SIC), that may be used to communicate with the check authorization system 100 about the check-cashing entity's 110 type and to identify other check-cashing entities of a similar type. In addition or as an alternative to these examples of historical trends by industry and location 324, other types of similar information may be used in the calculation of the transaction risk score 300.

Check-cashing entity location factors 322 when used in conjunction with information from a local businesses database 326 may affect the calculation and/or evaluation of a geographic-related risk score based on the proximity of the check-cashing entity 110 to a locations associated with an issuer of the presented check. For example, in some embodiments, the risk associated with accepting a check issued by a local business may be assessed as being lower than the risk associated with accepting a check issued by a non-local business. In some embodiments, the risk associated with accepting a check issued by a large, well-established business may be assessed as being lower than the risk associated with accepting a check issued by a small, newly established business.

Local business databases 326 may be created and/or maintained by the check authorization system 100 or by an outside source of information, such as a business or governmental agency. Local business databases 326 may comprise information such as, but not limited to, name, address, business type, and business size of businesses in a local area. For example, in some embodiments, available census information that associates businesses with Metropolitan Statistical Areas (MSA's) in which they are located allows the check authorization system 100 to ascertain whether a payroll check is written by a business in the same MSA or in a neighboring MSA to that of the check-cashing entity 110. The check authorization system 100 may have access to one or more local business databases 326 for gaining information useful in assessing the risk associated with accepting a check issued by a given business.

In various embodiments, check-cashing entity location factors 322 may comprise rules, threshold values, and factor weights pertaining to geographic-related risk assessment that are based on agreements established between the check-cashing entity 110 and the check authorization system 100. Using local business databases 326 and other location-related information to enhance risk assessment for check-cashing transactions is described in greater detail with reference to FIGS. 11A, 11B, and 12.

In other embodiments, as an addition or an alternative to some or all of the location validation factors 320 described with reference to FIG. 3, other types of factors pertaining to the check-cashing entity 110 may be used in calculating a transaction risk score 300 or in otherwise assessing the risk of the proposed check-cashing transaction. As one example, additional information about known check-issuing government entities local to the check-cashing entity 110 may be available for use in a risk assessment of the proposed check-cashing transaction.

In other embodiments, factors and/or categories of factors other than the person validation 310, location validation 320, and item validation 330 factors depicted in FIG. 3, may additionally or alternatively be used to generate a transaction risk score 300 for a proposed check-cashing transaction.

FIG. 4 depicts four examples of risk scores that may be calculated for assessing the risk of accepting payroll checks for cashing. For purposes of clarity and ease of explanation, the risk score calculations are described as a simplified set of score calculations for four different hypothetical transaction situations. In the embodiment depicted in FIG. 4, each hypothetical transaction is described in terms of variables 410. Variables 410 are assigned values 420 that may represent a dollar amount, percentage, other numeric amount, category, or the like. Variable values 420 are based at least in part on input obtained in association with the transaction. For example, a check amount variable 410 may be assigned a value 420 of $1000 based on information received from the check-cashing entity 110. In the sample score calculations shown in FIG. 4, the variable values 420 assigned may also be based at least in part on information associated with the transaction that is accessed from sources other than the check-cashing entity 110.

As depicted in the sample score calculations of FIG. 4, risk score factors, also known as variables 410, are associated with gradated risk score values 430 that express a level of perceived risk associated with an individual variable value 420. A transaction risk score 440 is calculated to reflect an assessed level of risk for the transaction as a whole, thus being influenced by the individual risk score values 430. In the sample score calculations of FIG. 4, the transaction risk score 440 is calculated as the sum of the variable risk scores 430. As will be familiar to one of ordinary skill in the art, the transaction risk score 440 may be calculated according to other methods. As one example, in one embodiment, variable risk scores 430 are weighted to reflect their relevance to a transaction risk assessment before being summed into the transaction risk score 440.

As described above, the risk score values 430 express a gradated level of perceived risk associated with the variable values 420. Thus, in various embodiments, the gradated risk scores allow for an expression of perceived risk levels that may be other than either an absolute absence of perceived risk or an absolute absence of perceived security. In various embodiments, risk score values 430 may be assigned to variable values 420 based on a variety of criteria, business priorities, statistical models, historical observations, and the like. For example, a previously observed pattern of higher risk associated with cashing payroll checks from small and mid-sized companies over larger companies may lead to an assignment of risk scores 430 that reflect higher risk associated with a paycheck from a company with two hundred and fifty employees and lower risk associated with a paycheck from a company with one thousand employees. When variable values 420 are expressed as numerical values, risk scores 430 may correspond to the variables based on ranges into which the variable values fall.

In various embodiments, assignments of risk scores to variable values may be customized to suit the preferences and priorities of a given check-cashing entity 110 for whom the risk scoring is being carried out. Thus, for example, two check-cashing entities may associate a different level of risk with a given variable value, such as a Biometric Confidence value of 90%, and risk score assignments for the two check-cashing entities 110 may be different one from the another.

In some embodiments, risk scores 430 are assigned to variable values 420 based on an automated learning or decision-making algorithm that identifies risk patterns associated with various variable values 420. For example, the automated learning or decision-making algorithm may comprise a neural network, Bayesian or other probabilistic network, genetic algorithm, statistical analysis, decision tree, expert system, decision tree, ruled-based decision system, linear calculation, other scoring mechanism, or a combination of any of the foregoing.

In some embodiments, risk scores 430 are assigned to variable values 420 based on a human evaluation of the level of risk associated with various variable values 420. In some embodiments, risk scores 430 are assigned to variable values 420 based on a combination of one or more automated algorithms and human evaluation. In some embodiments, risk scores 430 are assigned to variable values 420 arbitrarily. In some embodiments, methods used to assign risk scores 430 to variable values 420 may vary, based at least in part on trends specific to a given industry or type of check-cashing entity 110. In some embodiments, methods used to assign risk scores 430 to variable values 420 may vary, based at least in part on preferences expressed by the check-cashing entity 110.

In some embodiments, analysis of check-cashing transactions that allows for an observation of risk patterns may be carried out on a regular basis, such as semi-annually. In some embodiments, variable value/risk score assignments may be updated accordingly.

In the example depicted in FIG. 4, the four score calculations use the same set of variables 410. Furthermore, the four score calculations use the same cutoff value of "235" for the total transaction risk score 440, such that transactions with a total transaction risk score 440 equal to or more than the cutoff value are approved, and transactions with a total transaction risk score below the cutoff value are denied. In some embodiments that use a transaction scoring system such as that illustrated in FIG. 4, the cutoff value may be determined based at least in part on a statistical analysis of past check-cashing transactions and on a level of risk deemed to be acceptable to the check-cashing entity 110 and/or to the check authorization system 100. In some embodiments, the cutoff value may be determined by an automated system. In some embodiments, the cutoff value may be determined by a program administrator or other manager working on behalf of the check authorization system 100. In some embodiments, the cutoff value may vary by application, by industry, or by contracted agreements between the check-cashing entity 110 and the check authorization system 100.

In other embodiments, other aspects of risk-scoring, such as, but not limited to: selection of variables 410 to be used in calculating a transaction risk score 440, assignment of values 420 to variables 410, assignment of risk score values 430 to variables 410, and the like, may be customized to suit the preferences and/or characteristics of a check-cashing entity 110 or a group of check-cashing entities.

In FIG. 4, the four example Score Calculations A-D assign values 420 for variables 410 that represent: the value of the check offered for cashing, positive pay information available for the check, information about the location and size of the employer/check issuer, a measure of confidence based on authentication marks on the check, a measure of confidence based on any biometric input associated with the check presenter 101, previous known check-writing history of the employee/check-presenter 101, and a total dollar amount of check transactions in which the check presenter 101 has been involved during the previous six days.

The four example score calculations of FIG. 4 reflect four different proposed check-cashing transactions, with the variable values 420 reflecting various aspects of the proposed transactions. For each variable 410 in the score calculations, a score 430 is assigned to the variable based on the assessed risk associated with the value of the variable 420. In the examples shown in FIG. 4, a higher score indicates a higher degree of confidence that the check item will be successfully cashed. For example, the scores for the Check Amount variables in Score Calculations A-D assign higher scores to lower Check Amount values, thus reflecting an assumption that the higher the check amount, the greater the risk involved in approving the check-cashing transaction. In other embodiments, Check Amount score values may be assigned to reflect a preferred range of check amounts for cashing or may be based on other assumptions.

Furthermore, in other embodiments, scores 430 may be assigned to variables according to other rules and assumptions. For example, higher scores may be assigned to reflect a higher assessment of risk, rather than to reflect a lower assessment of risk, as is the case in the example calculations of FIG. 4. In still other embodiments, transactions risk scores may be generated using any one of a number of other methods, as was described in greater detail above, and as will be familiar to those of ordinary skill in the art.

In these examples, a threshold or cutoff value of "235" points for the total transaction risk score 440 is used for determining which transactions to approve and which transactions to decline. For example, Score Calculations A and C, with total transaction risk scores 440 of "1050" and "330," respectively, are approved, while score calculations B and D, with scores of "−820" and "144," respectively, are declined.

Score Calculation A reflects the hypothetical situation of an employee with an excellent check-related history who comes to cash a $1000 paycheck from a large, local employer, where a search of available positive pay information reveals a match between an unpaid item in the positive pay file and the presented check, where a scan of an authentication mark on the check provides an excellent match, and where no biometric input is used. With a transaction risk score of "1050" and a cutoff score of "235," the transaction is approved.

Score Calculation B reflects the hypothetical situation of another employee with a check-related history that is neither very positive nor very negative who comes to cash a $5000 paycheck from the same large, local employer. In this case, a search of available positive pay information for the company's paychecks reveals that an item matching the presented check has already been paid, and where a scan of an authentication mark on the check provides a very weak match. As above, no biometric input is used. With a transaction risk score of "−820" and a cutoff score of "235," the transaction is denied.

Score Calculation C reflects the hypothetical situation of an employee with a very good check-related history who comes to cash a $100 paycheck from an unknown employer, where no positive pay information is available for the company's paychecks, and where a scan of an authentication mark on the check provides a match with a confidence level of 70%. Biometric input in this example provides a relatively high degree of confidence in the check presenter's identity. With a transaction risk score of "330" and a cutoff score of "235," the transaction is approved.

Score Calculation D reflects the hypothetical situation of an employee with an average check-related history who comes to cash a $100 paycheck from a mid-sized, non-local employer, where a search reveals that, while positive pay information is available for the company's paychecks, no match with the presented check is found. Furthermore, biometric input from the employee provides an uncertain identification, and where again a scan of an authentication mark on the check provides a match with a confidence level of 70%. With a transaction risk score of "144" and a cutoff score of "235," the transaction is denied.

Focusing on the use of positive pay information as a factor in risk assessments, the Positive Pay variable scores from Score Calculations A-D of FIG. 4 illustrate four possible outcomes when positive pay file information is searched in association with a proposed check-cashing transaction. In Score Calculation A, the check offered for cashing matches an entry for an unpaid check in the employer's positive pay file, and the high score assigned to the Positive Pay variable reflects a high degree of confidence in the check's authenticity and cashability.

In one embodiment, in a situation not illustrated in FIG. 4, when a positive pay match is found with regards to a bank number and a check number associated with a proposed check-cashing transaction, but when the check amount does not match the check amount listed in the positive pay file, a low score, such as "10" may be assigned to the variable to reflect some doubt about the authenticity, correctness, and cashability of the presented check.

In Score Calculation B, the check offered for cashing matches an entry for a previously paid check in the employer's positive pay file, indicating that a problem exists with the check. The check presented by the employee may be a forgery; the previous check that matched the entry may have been a forgery; an error may exist in the positive pay file; some other problem may exist. In any event, the very low score assigned to the Positive Pay variable reflects a high degree of doubt about in the check's authenticity and cashability.

In Score Calculation C, the check offered for cashing does not appear to be associated with an available positive pay file from the employer. It may be that the employer does not use positive pay file technology. It may be that the employer provides positive pay information about its paychecks to a limited set of viewers, but that access to the employer's positive pay file is unavailable to the check authorization system 100 or other entity performing a risk assessment for the transaction. It may be that an error has caused the positive pay information to incorrectly appear to be unavailable. Positive Pay information may be unavailable for another reason, such as a temporary interruption of a computer network connection used to access the positive pay information.

In the example shown in Score Calculation C of FIG. 4, the Positive Pay variable is assigned a neutral value that allows the risk scoring and decisioning component 175 of the check authorization system 100 to avoid penalizing a check for which no positive pay information is available, while still being able to benefit from the predictive information that can be extracted when access to a positive pay file is available.

In Score Calculation D, the check offered for cashing does not match an entry in the employer's positive pay file, although a positive pay file from the employer is available, thus indicating that a problem may exist with the check. The check presented by the employee may be a forgery or a stolen check; the employer's positive pay file may not be sufficiently up-to-date to include an entry for the check; an error may exist in the positive pay file; some other problem may exist. In any event, the low score assigned to the Positive Pay variable reflects a degree of doubt about the check's authenticity and cashability, while allowing other risk variables to overrule the doubt if they are sufficiently positive. In the example in Score Calculation D, the other risk variables are not sufficiently positive to allow for approving the transaction.

Thus, using positive pay information as a factor in a risk assessment allows a check authorization system 100 or other risk assessment system to be sufficiently robust to assess a check-cashing transaction even when definitive information as to the cashability of the check is not available. The use of positive pay information as a risk assessment factor allows a check authorization system 100 to approve cashing checks, given appropriate mitigating conditions, even when positive pay information is unavailable or reveals some doubt about the item, while still being able to benefit from significant and definitive information from positive pay files when it is available. Systems and methods for using positive pay information in association with risk scoring for a financial transaction are described further with reference to FIGS. 5-8 below.

Focusing on the use of authentication mark input as a factor in a risk assessment, the insignia-related scores from Score Calculations A-D of FIG. 4 illustrate several scenarios using authentication mark input in association with a risk assessment for a proposed check-cashing transaction.

Authentication marks are marks or devices associated with a check that serve to aid in identifying authentic checks. Typically, authentication marks are difficult and/or costly for counterfeiters to reproduce and thus help to distinguish authentic from counterfeit checks. Some examples of authentication marks are: watermarks, bar codes, insignia, color schemes, background patterns, colorshifting ink, holographic strips, security validation numbers, and ultraviolet light sensitive fibers, among others.

In various embodiments, one or more data input devices 115 at a check-cashing entity 110 obtain insignia-related information from a presented check.

An insignia-related variable value reflects a measure of similarity between the authentication mark or device on the check and an expected authentication mark configuration. The expected authentication configuration may be maintained as a stored computer-accessible graphics or other file, as a stored formula or algorithm, or in some other form useful for aiding in the assessment of an obtained authentication mark or device.

Less than perfect matches between obtained authentication mark data and the expected authentication mark configuration may be the result of a fraudulent check, but may also be the result of such legitimate causes as mechanical limitations of the input device 115, or legitimate wear and tear of the check item.

The sample score calculations reveal a use of authentication mark input that goes beyond a rigid, binary, accept/decline judgement based on a comparison of authentication mark input with an expected configuration for the authentication mark. The score calculations of FIG. 4 illustrate an embodiment that integrates the assessment risk based on insignia-related input into the calculation of a more comprehensive transaction risk score.

Score Calculations A, B, and D illustrate embodiments in which insignia-related scores reflect a level of confidence obtained from an insignia-related comparison, such as a comparison of a machine-readable watermark from a presented check with a stored image of an expected watermark configuration. In another embodiment, a level of reflectivity exhibited by the fibers of a check material may be captured by an input device 115 at the check-cashing entity 110 and compared with an expected level of reflectivity for the check.

In one embodiment, higher insignia-related values reflect a higher level of confidence in the accurate authentication of the check and are accordingly assigned higher scores to reflect an associated higher level of confidence in the success of the check-cashing transaction, if approved. Conversely, low levels of confidence in the accurate matching of insignia-related input may be assigned low score values to reflect an increased level of perceived risk associated with approving the check-cashing transaction.

Using insignia-related scores that reflect a gradated level of confidence in the authenticity of the check presented allows the risk scoring and decisioning component 175 of the check authorization system 100 to assess the risk of check-cashing transactions without automatically declining transactions in which the insignia-related level is below a threshold value. Thus, low insignia-related scores need not, on their own, necessarily disqualify a check-cashing transaction from approval, and situations in which low insignia-related scores occur, such as those due to hardware defects, operator errors, physical deterioration of the check item caused by normal wear and tear, or other abnormalities, may be approved.

In FIG. 4, score calculation C depicts a check-cashing transaction in which no insignia-related input is obtained from the presented check by the check-cashing entity 110. Such a situation may occur when a check-cashing entity 110 is not equipped to obtain insignia-related information from the checks that it receives for cashing. Such a situation may additionally or alternatively occur when no authentication marks or other insignia-related devices are available in association with the presented check. In the embodiment shown in Score Calculation C, check presenters 101 with no insignia-related input are assigned a moderate insignia-related score similar to one that may be assigned if insignia-related input had been collected and matched with a confidence level of 70%. In other embodiments, checks presented at check-cashing entities 110 with no insignia-related input may be handled differently. For example, they may be automatically assigned a higher insignia-related score, or, in other embodiments, may be automatically assigned a lower insignia-related score. In some embodiments, transactions that occur where insignia-related data is not obtained may be assessed using score calculations that do not include insignia-related variables in their calculations, thus avoiding the need to arbitrarily assign an insignia-related score to such transactions. Systems and methods for using insignia-related information in association with risk scoring for a financial transaction are described further with reference to FIGS. 13-14 below.

Focusing on the use of biometric input as a factor in a risk assessment, the Biometric Confidence scores from Score Calculations A-D of FIG. 4 illustrate several possible uses of biometric input in association with a risk assessment for a proposed check-cashing transaction. The sample score calculations reveal a use of biometric input that goes beyond a binary, accept/decline judgement based on a comparison of biometric input and that integrates the assessment risk based on biometric input into the calculation of a more comprehensive transaction risk score. As illustrated in Score Calculations C and D, Biometric Confidence scores may be reflective of the level of confidence obtained from a biometric comparison, such as a comparison of an check presenter's 101 scanned driver's license photograph with a digital photograph taken of the check presenter 101 by the check-cashing entity 110, or a comparison of a stored fingerprint image taken during a "registration" transaction with a fingerprint taken by the check-cashing entity 110 at the time of check presentment. In one embodiment, higher Biometric Confidence values reflect a higher level of confidence in the accurate identification of the check presenter 101, and are accordingly assigned higher scores to reflect an associated higher level of confidence in the success of the check-cashing transaction, if approved. Conversely, low levels of confidence in the accurate matching of biometric input may be assigned low score values to reflect an increased level of perceived risk associated with approving the check-cashing transaction. For example, in one embodiment, Biometric Confidence levels that are below 50% may be assigned a negative score value of "−100."

Using Biometric Confidence scores that reflect a gradated level of confidence in the accurate identification of the check presenter 101 allows the risk scoring and decisioning component 175 of the check authorization system 100 to assess the risk of check-cashing transactions without automatically declining transactions in which the Biometric Confidence level is below a threshold value. Thus, in some embodiments, situations in which low Biometric Confidence scores occur due to hardware defects, operator errors, unanticipated physical changes on the part of the check presenter 101, or other abnormalities, may not, on their own, disqualify a check-cashing transaction from approval.

In FIG. 4, Score Calculations A and B depict check-cashing transactions in which no biometric input is obtained from the employee/check-presenter 101 by the check-cashing entity 110. Score calculations A and B illustrate a scoring policy that exists in some embodiments in which check presenters 101 are not penalized with a low Biometric Confidence score if the check-cashing entity does not obtain biometric input. In Score calculations A and B, check presenters 101 with no biometric input are assigned a Biometric Confidence score similar to one they would be assigned if biometric input had been collected and matched with a high degree of confidence. In other embodiments, check presenters 101 at check-cashing entities 110 with no biometric input may be handled differently. For example, they may be assigned a Biometric Confidence score reflective of a more moderate level of confidence, or may be assigned a Biometric Confidence score reflective of a low level of confidence. In some embodiments, transactions that occur where biometric data is not collected may be assessed using score calculations that do not include biometric variables in their calculations. Systems and methods associated with the use of biometric information for risk scoring of financial transactions is described further with reference to FIGS. 9-10 below.

Focusing on the use of location-related information as a factor in a risk assessment, Score Calculations A and B in FIG. 4 depict situations in which the presented checks are written by an employer that has been determined to be local, which is reflected in the higher assigned risk scores 430 associated with a higher level of confidence in the transactions. Score Calculation D depicts a situation in which the presented check is written by an employer that has been determined to be non-local, which is reflected in the low risk scores 430 associated with a lower level of confidence in the transaction. Score Calculation C depicts a situation in which location-related information about the proximity of the check issuer to the check-cashing entity 110 is not available. In the embodiment shown in FIG. 4, the mid-range location-related score 430 in Score Calculation C, reflects a policy which transactions are not penalized when location-related proximity information for the check issuer is not available. In various embodiments, location-related proximity information may be assessed and assigned risk scores differently, as suits the preferences of the check-cashing entity 110 and the check authorization system 100, as will be described in greater detail with reference to FIGS. 11-12 below.

The score calculations depicted in FIG. 4 are intended to illustrate one embodiment of a method for assigning a risk score 440 to a proposed check-cashing transaction and for using the risk score to make a recommendation whether to approve or to deny a proposed check-cashing transaction. In one embodiment, a score calculation such as those depicted in FIG. 4 is created for a given transaction and is printed for review. With respect to various other embodiments, the score calculations of FIG. 4 serve as a symbolic depiction of the type of calculation that may be executed to generate an authorization determination for a check-cashing transaction. In still other embodiments, a consideration of risk factors useful for assessing the risk associated with accepting a proposed check-cashing transaction may be used in another manner, without departing from the spirit of the invention described herein.

Risk Scoring Using Positive Pay Information

FIG. 5 shows one embodiment of a database of positive pay information, sometimes known as a positive pay file 500. In the embodiment shown in FIG. 5, the positive pay file 500 is configured as a table of positive pay information, as will be described in greater detail below. In other embodiments, the positive pay information is stored in one or more other useful configurations on a computer-accessible storage medium.

As described above, positive pay information may comprise information about checks that have been issued by one or more check issuers, also known in some embodiments as check issuers, check drawers, or payors. The positive pay information may be used to help identify checks that the check issuer is willing to honor, that is, is willing to withdraw funds from an associated accounts for payment of the check. Positive pay information may be used at least in part to reconcile a record of issued checks with a record of paid checks, and thus, in some embodiments, positive pay information may be known as reconciliation information.

In the embodiment shown in FIG. 5, the positive pay file 500 comprises records that correspond to checks written by the check issuer to be drawn against funds in a given bank account or other source of funds.

In one embodiment, information extracted from the face of the presented check via electronic or magnetic imaging, scanning, optical character recognition, manual input or other input technologies is used to access an associated positive pay record, if one exists. Once an associated positive pay record is located for a presented check, information stored in the positive pay file 500 may be compared with information extracted from the face of the check and from other sources associated with the proposed check-cashing transaction in order to enhance confidence that the presented check is a bona fide, unaltered, cashable check.

In the embodiment depicted in FIG. 5, records in the positive pay file 500 comprise at least nine fields. A bank routing number field 509 and bank account number field 510 allow for accurate identification of an account associated with a record in the positive pay file 500. A check number field 511 stores an identification number for the check or other financial instrument associated with the record. In one embodiment, a search for positive pay information associated with a check presented to a check-cashing entity 110 identifies the desired positive pay record by locating a record with a check number field 511 value that matches a check number encoded in the MICR line of the presented check.

A date issued field 512 stores a record of the date on which the associated check was written. In some embodiments, the check number field 511 and/or the date issued field 512 help to identify a given check item when an employer regularly, such as weekly or bi-weekly, issues a check for the same amount to a given employee.

A payee field 513 lists the name of the person to whom the check was issued, and may be compared to a name obtained from a driver's license or other source of identification information available for the check presenter 101 and/or may be compared to a payee name on the face of the check. In one embodiment, additional identifying information for the payee is stored in the positive pay file 500. For example, address information for the payee may be stored, an identification number for the payee may be stored, or any other information that may be used to enhance verification-that the check presenter 101 is the intended payee of the check.

An amount field 514 stores a record of the amount for which the check was written. Comparing the value in the amount field 514 with an amount written on the face of the presented check enhances a check-cashing entity's 110 ability to detect checks whose amount information has been altered fraudulently.

A payor field 515 stores a record of the company or other entity that issued the check. In the embodiment shown in FIG. 5, the positive pay file 500 comprises records that correspond to checks written by the check issuer against funds in a given bank account or other source of funds. In one embodiment in which the positive pay file 500 stores positive pay information for a company with many divisions, the payor field 515 may comprise information about the division within the company that issued the check.

In one embodiment, the positive pay file 500 comprises positive pay information for a plurality of check issuers' bank accounts. For example, a company that manages payroll accounts for and prepares checks for a number of large businesses may make positive pay information for the large businesses available to the check authorization system 100. In embodiments where a positive pay file 500 comprises information for more than one check issuer, the records of the positive pay file 500 may comprise a field or fields useful for distinguishing a bank account and/or check issuer associated with each check. In one embodiment in which the positive pay file 500 comprises positive pay information consolidated from more than one individual check issuer's positive pay file, the payor field 515 may comprise at least one of: a name of a payor, a bank number and account number of a payor's store of funds, an identifier for a payor, and an identifier for a payroll or other check-writing service contracted by the payor to issue checks on behalf of the payor. Alternately, payor information for the check may be stored using more than one field in the record. In some embodiments where the positive pay file 500 comprises information about checks written by one company, a payor field 515 may be not needed and not used.

The embodiment of the positive pay file 500 depicted in FIG. 5 further comprises a payment/status activity field 516 and a date of payment/status activity field 517. In some embodiments, the payment/status activity field 516 comprises information about activity relevant to the record that occurs after the check is issued. Examples of information that may be stored in the payment/status activity field 516 comprise, but are not limited to information about: checks cashed and/or otherwise paid, checks voided, stop payments, and checks that are outstanding and have not yet been paid. In other embodiments, the payment/status activity field 516 may comprise information about at least one of: check-cashing transactions in which the check was cashed; check-cashing transactions in which the check was presented for cashing, but was declined; reports of the check being stolen; notification that the check has been voided; and notification that a stop-payment has been placed on the check. The date of payment/status activity field 517 may comprise a date associated with activity recorded in the payment/status activity field 516.

Thus the payment/status activity field 516 and the date of payment/status activity field 517 may serve to store a log of activity associated with a given check. For example, as described with reference to Score Calculation B in FIG. 4, the payment/status activity field 516 may provide notice to a check-cashing entity 110 or check authorization system 100 that a check with identification features similar to one currently being presented for cashing has already been paid by the check issuer. Conversely, a null value or a value of "active" in the payment/status activity field 516 for a given check record may provide notice that the check appears to be available for cashing. As another example, in one embodiment, if a check presenter 101 repeatedly presents a given check at various check-cashing entities 110 for cashing and is repeatedly declined, the positive pay file 500 may store a record of this activity and may provide an alert to suspicious behavior or a recommendation for special attention in handling the check.

As will be familiar to one of ordinary skill in the art, the positive pay file 500 may be configured and may be stored according to any of a wide variety of data storage methodologies, without departing from the spirit of the positive pay systems and methods described herein.

Figure 6A:
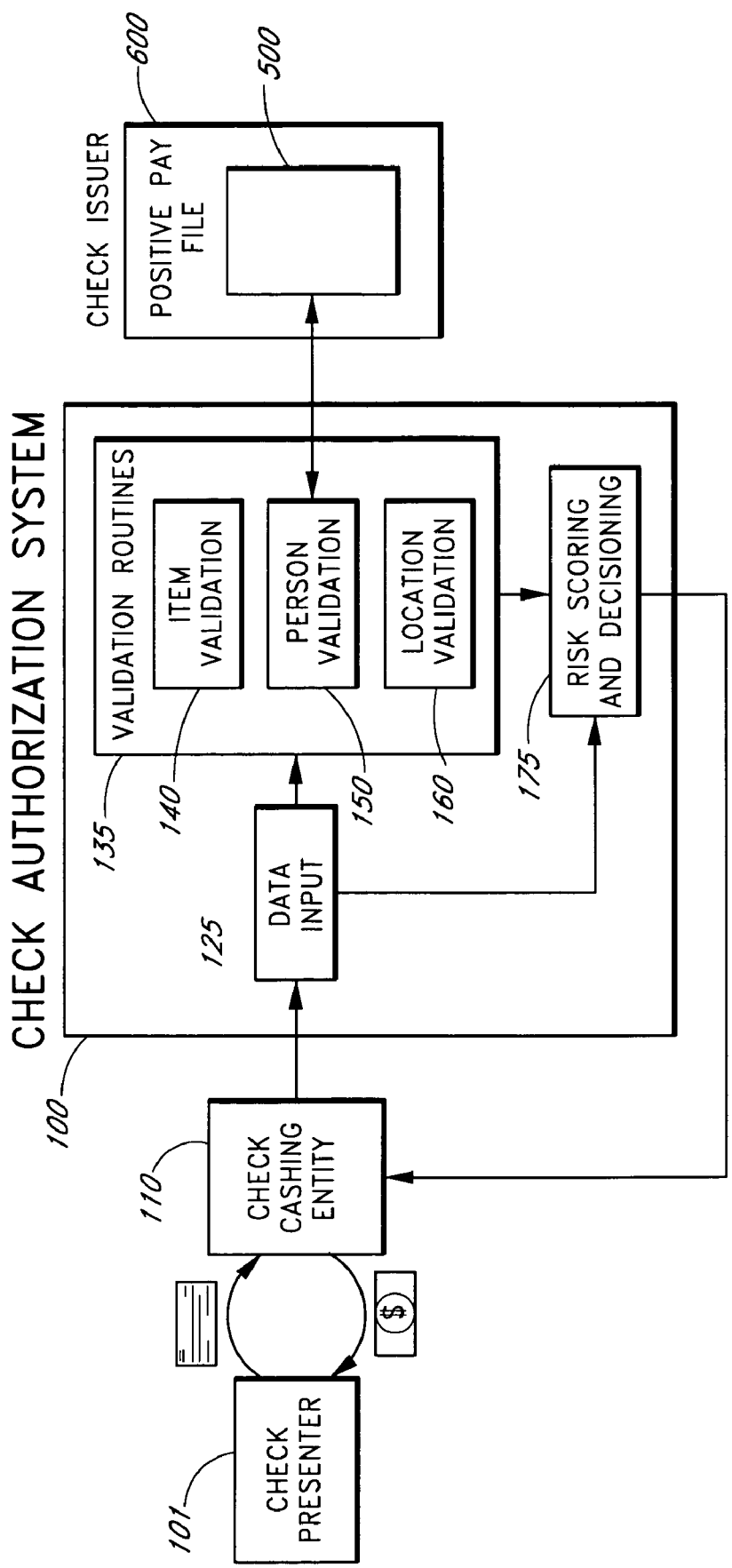
FIG. 6A is a block diagram of one embodiment of a system that uses positive pay information to generate a risk score for second-party check acceptance.
Figure 6B:
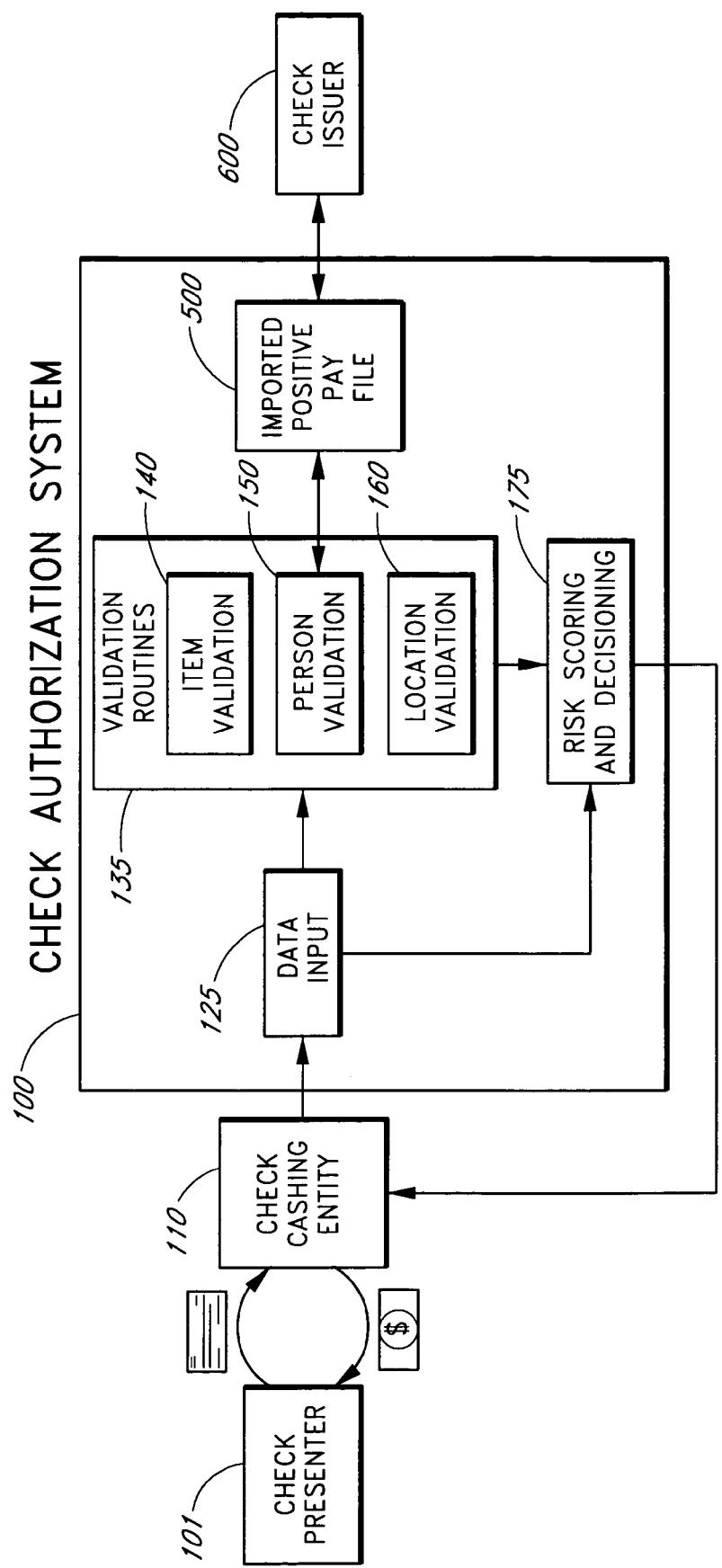
FIG. 6B is a block diagram of a second embodiment of a system that uses positive pay information to generate a risk score for second-party check acceptance.

FIGS. 6A and 6B are block diagrams of two embodiments of a system that uses positive pay information to generate a risk score for second-party check acceptance. As shown in FIGS. 6A and 6B, a check presenter 101 desiring to cash a check provides the check and other associated information to a check-cashing entity 110, as has been described in greater detail with reference to FIG. 1. The check-cashing entity 110 transmits data about the proposed check-cashing transaction to the data input component 125 of the check authorization system 100. Based on agreements entered into between the check authorization system 100 and the check-cashing entity 110, the check authorization system 100 may provide at least one of: data validation services, data gathering services, risk assessment services, guarantee services, and/or check settlement services for the proposed check-cashing transaction.

As shown in the embodiments of FIGS. 6A and 6B, the data input component 125 transmits the received data to the validation routines component 135 for validation and for access to additional data relevant to a risk assessment of the proposed transaction. The validation routines 135 comprise routines for person validation 150, item validation 140, and location validation 160. To reiterate what has been described in greater detail with reference to FIG. 1, person validation routines 150 collect and validate data that is considered to be indicative of the trustworthiness of the check presenter 101; item validation routines 140 collect and validate data that is considered to be indicative of the authenticity of the check item; location validation routines 160 collect and to validate data associated with the check-cashing entity 110.

The validation routines 135 transmit data associated with the transaction to the risk scoring and decisioning component 175 for risk scoring, or other risk assessment, and for generating an approve/decline recommendation associated with the proposed transaction to the check-cashing entity 110.

As depicted in FIGS. 6A and 6B, the item validation routines 140 access positive pay information in order to collect data indicative of the legitimacy and cashability of the check. FIG. 6A depicts an embodiment in which a positive pay file 500 comprising information associated with the check is stored by and is made accessible by the check issuer 600 or by another entity operating on behalf of the check issuer 600. For example, an employer who is the issuer of a payroll check may authorize its bank, a payroll service, or another positive pay service entity to maintain and to provide access to positive pay information associated with its payroll checks. Similarly, an issuer of insurance refund checks may provide access to information associated with its insurance refund checks.

In various embodiments, the item validation routines 140 of FIG. 6A access the positive pay file 500, which may be stored at a financial entity, via a communications system. Examples of appropriate communications systems comprise, but are not limited to, wired or wireless computer network systems, telephone systems, dedicated connections, and the like. In other embodiments, the item validation routines 140 access the positive pay file 500 using a communications medium that may comprise, by way of example, a dial-up communications system, a Virtual Private Network (VPN), dedicated communication lines such as T1 or frame relay for host-to-host connection, or other combination of telephone networks, wireless data transmission systems, two-way cable systems, customized computer networks, interactive kiosk networks, automatic teller machine networks, interactive television networks, and the like. In other embodiments, the check-cashing entity 110 communicates with the check authorization system 100 using other technologies.

FIG. 6B depicts an embodiment in which a positive pay file 500 comprising information associated with the check is transmitted by the check issuer 600 or by another entity operating on behalf of the check issuer 600 to the check authorization system 500 for internal storage. For example, a payroll service acting on behalf of a check issuer 600 may daily transmit, download, or update a positive pay file 500 for use by the item validation routines 140 of the check authorization system 100.

Figure 7A:
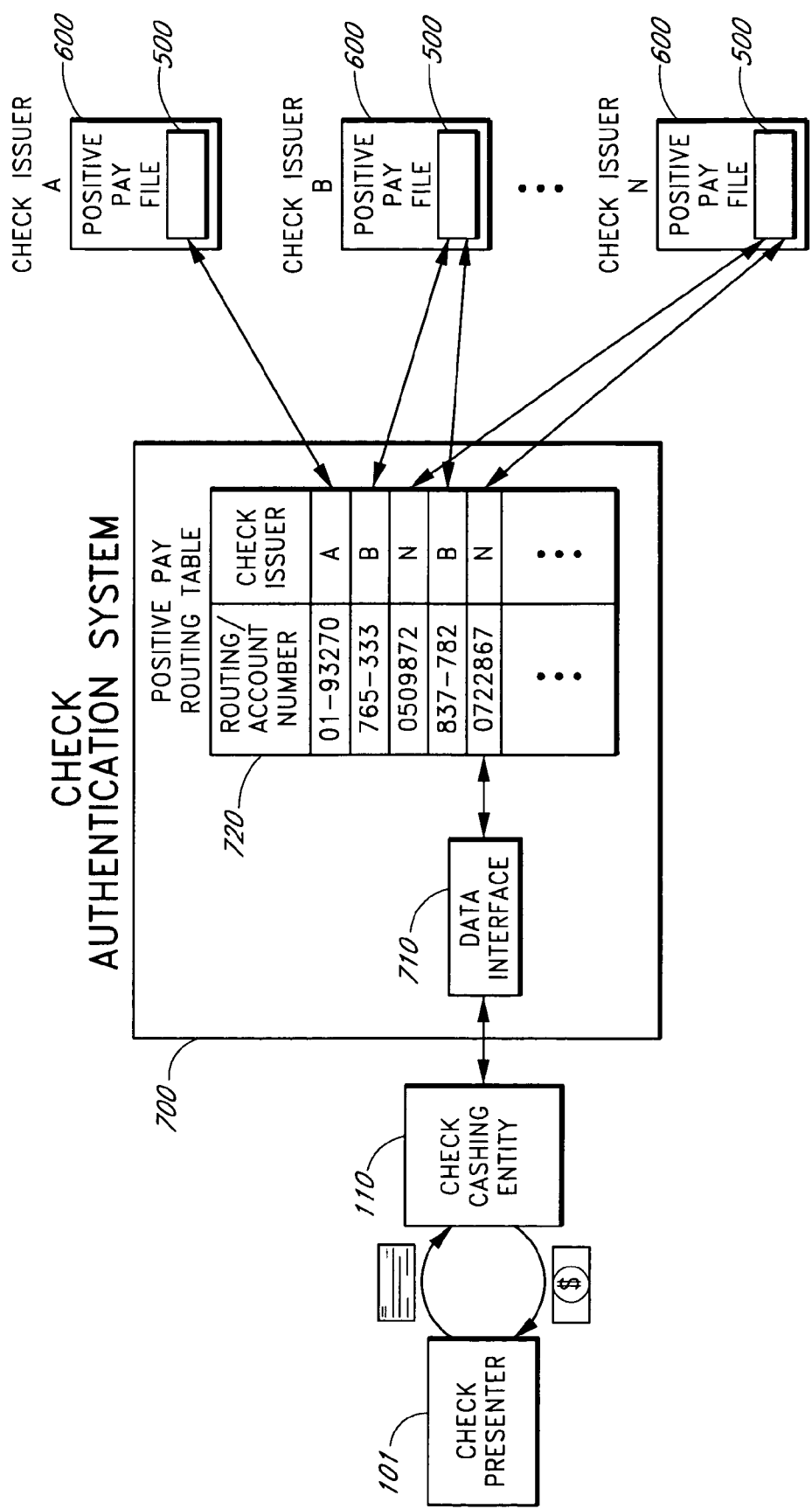
FIG. 7A is a block diagram of one embodiment of a system to access externally stored positive pay information.
Figure 7B:
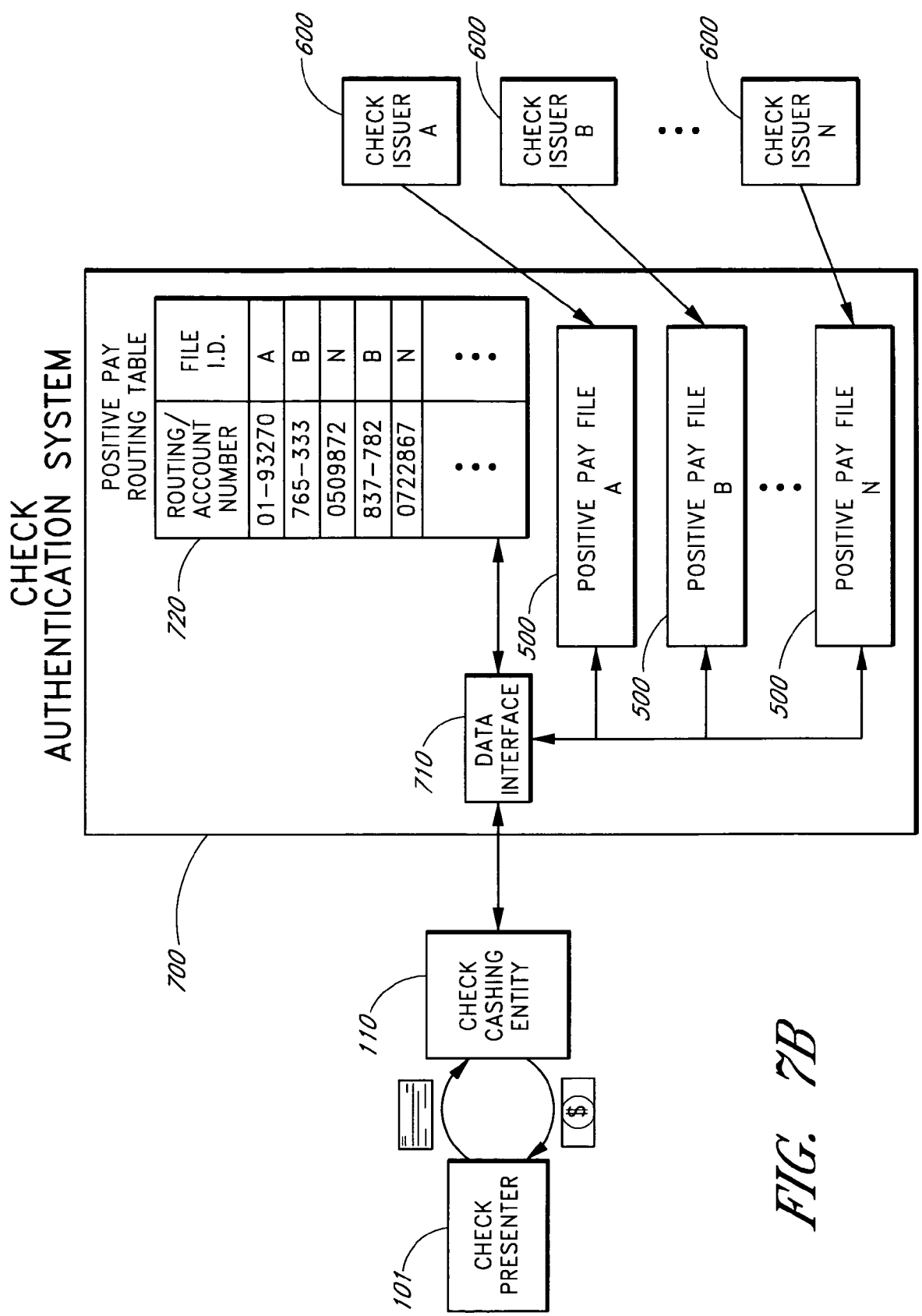
FIG. 7B is a block diagram of one embodiment of a system to access internally stored positive pay information.

FIGS. 7A and 7B are block diagrams of two embodiments of a system for accessing positive pay information using a positive pay routing table 720. FIG. 7A depicts an embodiment of a system to access externally stored positive pay information. FIG. 7B is a block diagram of one embodiment of a system to access internally stored positive pay information. Both the embodiment depicted in FIG. 7A and the embodiment depicted in FIG. 7B may be implemented in conjunction with the embodiment of the check authorization system 100 depicted in FIGS. 6A and 6B. Furthermore, the check authorization system 100 may implement an embodiment of the system to access positive pay information that comprises elements of the embodiments depicted in FIGS. 7A and 7B.

Additionally or alternatively, the embodiments depicted in FIGS. 7A and 7B may be implemented in conjunction with systems 700 that access positive pay information for use associated with check-cashing transactions, but that do not provide the validation and/or risk assessment services offered by the check authorization system. Thus, the term check authentication system 700 is used in FIGS. 7A and 7B. In various embodiments of the check authorization system 100, positive pay information is accessed using a positive pay routing table 720 as is described in FIGS. 7A and 7B.

Referring now to FIG. 7A, a check presenter 101 presents a check to a check-cashing entity 110 for cashing. The check-cashing entity 110 communicates with a check authentication system 700 that provides access to positive pay information for the check. Data sent by the check-cashing entity 110 is received by the check authentication system 700 via a data interface 710. In one embodiment, the data comprises at least one of: a bank routing number and bank account number, a check issue date, a check number, an amount, a payee name, and a payor name. The data may additionally or alternatively comprise other information useful for locating positive pay information for the check. Data collected from the check may be obtained using at least one of a variety of technologies, comprising but not limited to: digital scanning, optical character recognition, MICR scanning, and manual input based on visual inspection.

In the embodiment shown in FIG. 7A, check issuers 600 may comprise employers or other businesses that issue checks, payroll services that manage payroll accounts for employers, banks that manage payrolls accounts or other checking accounts for businesses, third party services that provide positive pay information, or the like. As shown in FIG. 7A, check issuers 600 maintain positive pay files 500 that store information about issued checks, as was described in greater detail with reference to FIG. 5. The check authentication system 700 uses the data received via the data interface 710 to access an associated record in the positive pay routing table 720. The embodiment of the positive pay routing table 720 depicted in FIG. 7A provides information that allows the check authentication system 700 to access an externally stored positive pay file 500 associated with the check.

As depicted in FIG. 7A, the records of the positive pay routing table 720 may comprise two fields for identifying a positive pay file 500 associated with the presented check. In other embodiments, the fields used for determining which of a plurality of positive pay files to access may be at least one of the set consisting of: bank routing number, bank account number, subscriber number or name and check issuer. In other embodiments, other fields may be used to identify a positive pay file with a presented negotiable instrument and to provide access information for the identified positive pay file 500. In one embodiment, using information received by the data interface 710, the check authentication system 700 identifies a check issuer 600 that maintains the associated positive pay file 500.

The check authentication system 700 accesses the positive pay file 500, and, using the data received from the check-cashing entity 110, accesses a record associated with the check, if one exists. In some embodiments, this positive pay data may then be "scored" using customizable rules and routines in order to generate a positive pay score, as will be described in greater detail below.

The positive pay score may then be aggregated with other variable scores as was exemplified in the score calculations of FIG. 4 to calculate a transaction score. In some embodiments, the transaction score may then be assessed in order to determine if it is within a pre-set range of acceptable scores that is customizable based on a tolerance for risk set by the check authorization system 100 and/or by the check-cashing entity 110. As will be described in greater detail with reference to FIG. 8 below, the check authentication system 700 may transmit information obtained from the positive pay file 500 about the check or an accept/decline recommendation based at least in part on information obtained from the positive pay file 500 about the check to the check-cashing entity 110 via the data interface 710. The check-cashing entity may then decide whether to accept the proposed check-cashing transaction based at least in part on the positive pay information received from the check authentication system 700.

Referring now to FIG. 7B, a check presenter 101 presents a check to a check-cashing entity 110 for cashing. The check-cashing entity 110 communicates with a check authentication system 700 that provides access to positive pay information for the check. Data sent by the check-cashing entity 110 is received by the check authentication system 700 via a data interface 710. In one embodiment, the data comprises at least one of: a bank account number and bank routing number, a check issue date, a check number, an amount, a payor name, a payee name, and a payee identifier, such as a driver's license number, a Social Security number, a government issued identification number, and the like. The data may additionally or alternatively comprise other information useful for locating positive pay information for the check. Data obtained from the check may be obtained using at least one of a variety of technologies, comprising but not limited to: digital scanning, optical character recognition, MICR scanning, and manual input based on visual inspection.

In the embodiment shown in FIG. 7B, check issuers 600 may comprise employers or other businesses that issue checks, payroll services that manage payroll accounts for employers, banks that manage payrolls accounts or other checking accounts for businesses, third party services that provide positive pay information, or the like. As shown in FIG. 7B, check issuers 600 provide their positive pay files 500 to the check authentication system 700 for internal storage. The positive pay files 500 may be updated regularly, intermittently, or as suits the preferences of the check authentication system 700 and the check issuer 600.

The check authentication system 700 may store separate positive pay files 500 internally for individual check issuers 600, as depicted in FIG. 7B. In other embodiments, the check authentication system 700 may join more than one positive pay file 500 received from one or more check issuers 600 into an expanded positive pay file 500.

The check authentication system 700 uses the data received by the data interface 710 to access an associated record in the positive pay routing table 720. The embodiment of the positive pay, routing table 720 depicted in FIG. 7B provides information that allows the check authentication system 700 to access an internally stored positive pay file 500 associated with the check.

As depicted in FIG. 7B, the records of the positive pay routing table 720 comprise two fields: a field that identifies a bank routing and/or account number and a field that provides access information for an associated positive pay file. Using information about an account number received by the data interface 710, the check authentication system 700 identifies an associated, internally stored positive pay file 500. In other embodiments, the records of the positive pay routing table 720 comprise several fields. The fields used for determining which positive pay file to access may be, for example, bank routing number, bank account number, payee name or other identifier, and/or check issuer identification.

The check authentication system 700 accesses the internal positive pay file 500, and, using the data received from the check-cashing entity 110, accesses a record associated with the check, if one exists. As will be described in greater detail with reference to FIG. 8 below, the check authentication system 700 transmits information obtained from the positive pay file 500 about the check to the check-cashing entity 110 via the data interface 710. The check-cashing entity may then decide whether to accept the proposed check-cashing transaction based at least in part on the positive pay information received from the check authentication system 700. In some embodiments, the check authentication system 700 may generate a positive pay risk score based at least in part on information accessed in the positive pay file 500, as was described in greater detail with reference to FIG. 7A, and may transmit the score to the check-cashing entity 110.

FIGS. 7A and 7B depict embodiments in which the positive pay routing table 720 provides access information for positive pay files 500 that are stored either externally or internally to the check authentication system 700, respectively. In other embodiments, at least one check issuer 600 may choose to maintain its positive pay file 500 externally to the check authentication system 700, at least one check issuer may choose to provide its positive pay file 500 to the check authentication system 700 for internal storage, and the positive pay routing table 720 may provide routing information for accessing both internally and externally stored positive pay files 500.

Furthermore, FIGS. 7A and 7B depict embodiments in which checks issued from a given bank account are associated with a single positive pay file 500. In other embodiments, checks issued from a given bank account or by a given check issuer 600 may be associated with a plurality of positive pay files 500, and the positive pay routing table 720 may be configured to provide access to one or more of the plurality of positive pay files 500. For example, an employer may make positive pay information about issued payroll checks available from a positive pay file 500 accessible by the check authentication system 700, while a third party positive pay information service provider may also make a copy of the information available to the check authentication system 700. As will be familiar to one of ordinary skill in the art, such embodiments may be implemented without departing from the spirit of the systems and methods described herein.

Figure 8:
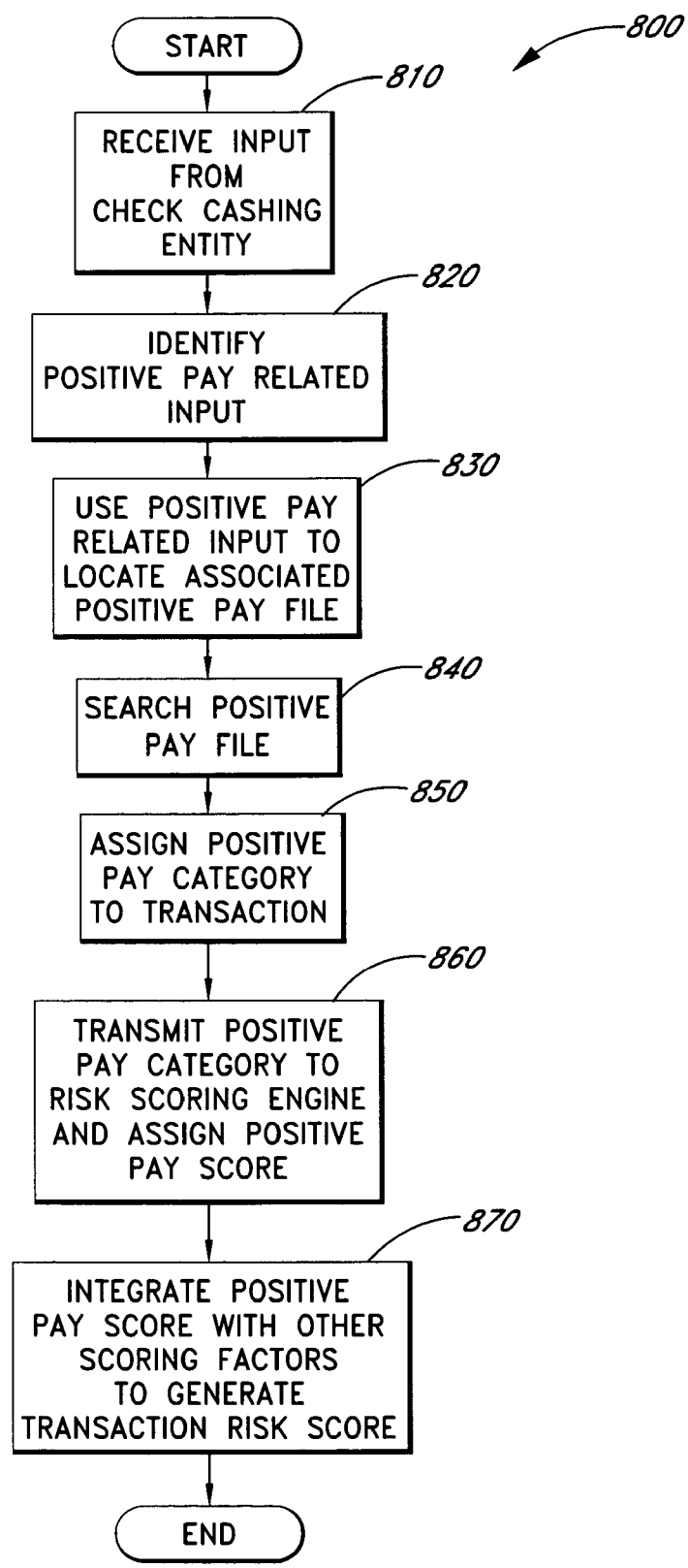
FIG. 8 is a flowchart that depicts one embodiment of a process that uses positive pay information to generate a risk score for second-party check acceptance.

FIG. 8 is a flowchart that depicts one embodiment of a process 800 to use positive pay information as a factor in a risk-scoring calculation for second-party check acceptance. The process 800, as depicted in FIG. 8, begins at a start state and moves to state 810 where the data input component 125 of the check authorization system 100 receives input about a proposed check-cashing transaction from a check-cashing entity 110.

Moving on to state 820, the input is transmitted to the validation routines 135, where the input useful for locating positive pay information is identified and, in state 830, is used to locate information associated with the presented check in a positive pay file 500. Input useful for locating positive pay information may comprise information extracted electronically, magnetically, or visually from the face of the presented check. In one embodiment, input useful for locating positive pay information may be transformed into a common format and may be input into the check authentication system 700. For example, in one embodiment, input related to positive pay may comprise at least one of: bank routing and account number, check number, payor, payee, payee identifier, check amount, and check issue date. In one embodiment, input related to positive pay information may comprise other information gathered from the check presenter 101. In one embodiment, the item validation routines 140 of the check authorization system 100 use the input to locate a positive pay file 500 with information about checks issued by the payor of the presented check.

Moving on to state 840, the item validation routines 140 of the check authorization system 100 use the input to attempt to locate a record in the identified positive pay file 500 that is associated with the presented check.

Moving on to state 850, the item validation routines 140 compare data from the fields 511-517 of the associated positive pay file record, if one was located, to data about the presented check that was received from the check-cashing entity 110. In some embodiments, the item validation routines 140 note whether some, all, or none of the fields 511-517 of the record match associated information from the presented check. In some embodiments, the item validation routines 140 assign a positive pay category to the check-cashing transaction based on a comparison of the presented check and the positive pay record, as was exemplified with reference to the score calculations of FIG. 4.

For example, in one embodiment, if information from the presented check matches associated fields in the positive pay record and if the record indicates that the check has not yet been cashed, the check-cashing transaction may be assigned a category of MATCH, indicating a high likelihood that the check is legitimate. In another embodiment, the check-cashing transaction may be assigned a score or value indicating high confidence, which further indicates a high likelihood that the check is legitimate.

In one embodiment, if the bank number and check number on the presented check match those in a positive pay record, but the check amount does not match, the transaction may be assigned a category of PARTIAL MATCH. In another embodiment, the transaction may be assigned a score or value indicating less confidence, which further indicates a lesser chance, when compared to the former example, that the check is legitimate. Additionally, the system may send the variance between the check amount in the positive pay file and the check being presented for cashing to the risk scoring decisioning component 175 to assign a score or value based on rules created for deviation between amounts. For example, a deviation of a few cents or a few whole dollars, such as $107 vs. $108, may be attributed to mis-keying of amount at the check-cashing entity 110 and may yield one score indicative of lower risk as compared to an amount that differs by total number of digits, such as $1,000 vs. $100, which may yield a different score.

If information from the presented check matches the associated fields in the positive pay record and if the record indicates that the check has already been cashed, the check-cashing transaction may be assigned a category of ITEM PAID, indicating a high likelihood that the check is a copy or is otherwise fraudulent or that the paid check was fraudulent. Similarly, a transaction may be assigned a category of ITEM STOPPED or ITEM VOIDED in situations where the check has been stopped or voided, respectively.

Based on proprietary rules that may be customized to suit the preferences of individual or groups of check-cashing entities, the assignment of an ITEM PAID, ITEM STOPPED, or ITEM VOIDED category or an equivalent scoring method may yield a positive pay risk score that further aggregates into the transaction risk score and that determines whether this transaction will be approved or declined, based on agreements made between the check-cashing entity 110 and the check authorization system 100.

If a positive pay file 500 with information about checks issued by the payor is available, but no record exists within the positive pay file 500 that matches the information from the presented check, then the transaction may be assigned a category of NO MATCH. A transaction assigned to a NO MATCH category may occur legitimately when the records in a positive pay file 500 are not sufficiently up-to-date to reflect recently issued checks. A NO MATCH category may also reflect the possibility that the check is fraudulent, or may reflect another situation. Based on proprietary rules that may be customized to suit the preferences of individual or groups of check-cashing entities, the assignment of a NO MATCH category or an equivalent scoring method may yield a positive pay risk score that further aggregates into the transaction risk score and that determines whether this transaction is to be approved or declined, based on agreements made between the check-cashing entity 110 and the check authorization system 100.

If a positive pay file 500 with information about checks issued by the payor is not available, the transaction may be assigned a category of DATA UNAVAIL, which may occur when the payor does not offer positive pay information or when the check authorization system 100 does not have access to the payor's positive pay information. Based on proprietary rules that may be customized to suit the preferences of individual or groups of check-cashing entities, the assignment of a DATA UNAVAIL category or an equivalent scoring method may yield a positive pay risk score that further aggregates into the transaction risk score and that determines whether this transaction is to be approved or declined, based on agreements made between the check-cashing entity 110 and the check authorization system 100.

In other embodiments, a different set of positive pay categories may be used to indicate whether or not a presented check item appears to be a valid item based on information from the positive pay file 500. In yet other embodiments of the process 800, a comparison of information from the presented check and information from the positive pay file 500 directly generates a positive pay risk score value, as will be described with reference to the description of state 860, without first being assigned a positive pay risk category.

Furthermore, in some embodiments, more than one positive pay file 500 may be accessed in association with a presented check. In some embodiments, a positive pay risk category may be assigned for each accessed positive pay file 500. In some embodiments, a positive pay risk category based on a collective assessment of information obtained from a plurality of positive pay files 500 may be determined for the transaction. In other embodiments, information from a plurality of positive pay files 500 may be assessed in other manners and the positive pay risk score determined for the proposed check-cashing transaction.

In other embodiments, the item validation routines 140 may characterize a comparison of the presented check and the positive pay record in terms of a percentage or other numeric score. In yet other embodiments, an assessment of a comparison between the presented check and the positive pay record may be carried out by the risk scoring and decisioning component 175 or by another component of the check authorization system 100.

Moving on to state 860, the item validation routines 140 transmit the assigned positive pay category to the risk scoring and decisioning component 175 of the check authorization system 100, where the risk scoring and decisioning component 175 assigns a positive pay risk score to the transaction based at least in part on the positive pay category.

As was described in greater detail with reference to FIG. 4, the assigned positive pay risk score reflects a perceived level of risk associated with approving a transaction with the assigned positive pay category. For example, in one embodiment, a positive pay category of MATCH is assigned a risk score of "500"; a positive pay category of PARTIAL MATCH is assigned a risk score of "10"; a positive pay category of NO MATCH is assigned a risk score of "−100"; a positive pay category of ITEM PAID, ITEM STOPPED, or ITEM VOIDED is assigned a risk score of "−1000"; and a positive pay category of DATA UNAVAIL is assigned a risk score of "50". In other embodiments, risk scores may be assigned to transactions according to other criteria.

Additionally, in other embodiments, there may be more than one variation of a partial match with information in the positive pay file 500, wherein the variations of partial match may each have a unique score, which may vary by type of check-cashing entity 110. In some embodiments, the positive pay risk score is used alone to assess the risk of a transaction. In other embodiments, the positive pay risk score is used as one factor in the calculation of a transaction risk score. In some embodiments, the positive pay risk score and/or the transaction score may be interpreted within the framework of a score card or set of preference-based agreements that identify acceptable and unacceptable ranges of scores and that determine what transactions are approved and declined.

As was described with reference to FIG. 1, in some embodiments, the item validation routines 160 may assign the positive pay risk score to the transaction and may transmit the assigned score along with other information about the transaction to the risk scoring and decisioning component 175 for scoring and an approve/decline recommendation.

As was described in greater detail with reference to FIG. 4 above, the positive pay risk score expresses a gradated level of perceived risk associated with the positive pay category or other positive pay variable value 420. In various embodiments, a gradated positive pay risk score may be assigned to positive pay variable values 420 based on a variety of criteria, business priorities, statistical models, historical observations, and the like. In some embodiments, positive pay risk scores are assigned to positive pay variable values 420 based on an automated learning or decision-making algorithm that identifies risk patterns associated with various variable values 420. In some embodiments, positive pay risk scores are assigned to positive pay variable values 420 based on a human evaluation of the level of risk associated with various variable values 420. In some embodiments, positive pay risk scores are assigned to positive pay variable values 420 based on a combination of one or more automated algorithms and human evaluation. In some embodiments, positive pay risk scores are assigned to positive pay variable values 420 arbitrarily. In some embodiments, methods used to assign positive pay risk scores to positive pay variable values 420 may vary, based at least in part on trends specific to a given industry or type of check-cashing entity 110. In some embodiments, methods used to assign positive pay risk scores to positive pay variable values 420 may vary, based at least in part on preferences expressed by the check-cashing entity 110.

Moving on to state 870, the risk scoring and decisioning component 175, in one embodiment, integrates the assigned positive pay score with other variable risk scores 430 that reflect risk associated with other aspects of the proposed check-cashing transaction, such as, for example, the check amount, the check-related history of the check presenter 101, and information about the check issuer, as was exemplified with reference to the score calculations of FIG. 4. Based at least in part on the positive pay risk score, the risk scoring and decisioning component 175 calculates a transaction risk score 440 for the proposed transaction.

Moving on to the end state, the process 800 to use positive pay information as a factor in a risk scoring calculation for a check-cashing transaction is complete. In one embodiment, the process 800 to use positive pay information as a factor in a risk score is used as part of a larger risk assessment process, in which the risk scoring and decisioning component 175 transmits a recommendation to approve or to decline the proposed check-cashing transaction to the check-cashing entity 110, based at least in part on the transaction risk score 440 calculated by the process 800.

As was described in greater detail with reference to FIG. 4, the transaction risk score 440 may, in some embodiments, be calculated as the sum of the variable risk scores 430. In other embodiments, the transaction risk score 440 may be calculated according to other methods. As one example, the variable risk scores 430 may be weighted to reflect their relevance to a transaction risk assessment before being summed into the transaction risk score 440.

Furthermore, recommendations based at least in part on transaction risk scores may be influenced by preferences, business decisions, and agreements set by the check-cashing entity 110, such that the same transaction risk score could lead to a recommendation to approve a check-cashing transaction for one check-cashing entity 110 and could lead to a recommendation to decline a check-cashing transaction for another check-cashing entity 110.

The flowchart of FIG. 8 describes one embodiment of the process 800 for using positive pay information to generate a risk score for second-party check acceptance as comprising various states in which various functions are carried out. As will be familiar to one of ordinary skill in the art, in other embodiments, the process 800 may be executed using a different order, configuration, or set of states, and the states of the process 800 may perform the functions differently from the embodiment of FIG. 8, without departing from the spirit of process 800.

Risk Scoring Using Biometric Information

FIGS. 9A, 9B, 9C, and 9D are block diagrams depicting four embodiments of a system that uses biometric input to generate a transaction risk score for second-party check acceptance. Examples of biometric input comprise, but are not limited to, input from: fingerprint, palm print, hand geometry, voice sample recognition, facial recognition, facial geometry scan, iris scan, retina scan, DNA, signature scan, and keystroke dynamics. Biometric input obtained from the check presenter 101 by the check-cashing entity 110 may be compared to biometric information available from a known person, as will be described in greater detail below. Biometric information may thus be used to enhance confidence in the accurate identification of the check presenter 101 and may enhance confidence that the check presenter 101 is the correct payee of the presented check. By incorporating biometric input in a risk scoring system for check cashing, an assessment of the check presenter's identity may be considered along with other factors indicative of a level of security associated with a proposed check-cashing transaction.

In the embodiments shown in FIGS. 9A, 9B, 9C, and 9D, biometric input from the check presenter may be obtained by the check-cashing entity 110 using a biometric input device 910. Biometric devices 910 may be of a variety of biometric input devices, commercially available currently and/or in the future, that measure, scan, image, record, or the like from the check presenter 101 to generate a biometric input.

In the embodiments shown in FIGS. 9A, 9B, 9C, and 9D, the biometric input received from the input device 910 is evaluated by a biometric input evaluator 920. The biometric input evaluator 920 compares the input from the biometric input device 910 with other available biometric information from the person who the check presenter 101 is claiming to be, thereby enhancing confidence in the correct identification of the check presenter 101. In the case of a second-party check transaction, the check presenter 101 is typically claiming to be to the payee of the check. When biometric input obtained from the check presenter 101 is compared to biometric information available for the payee of the presented check, the biometric input evaluator 920 may generate a raw score that expresses a level of similarity between the two and that may express a gradated level of confidence that the check presenter and the payee are the same person. In some embodiments, the raw score is expressed as a percentage of total confidence or similarity. In some embodiments, the raw score is expressed in another form, such as one that uses a system of categorization for expressing levels of confidence in the identity of the check presenter 101.

Figure 9A:
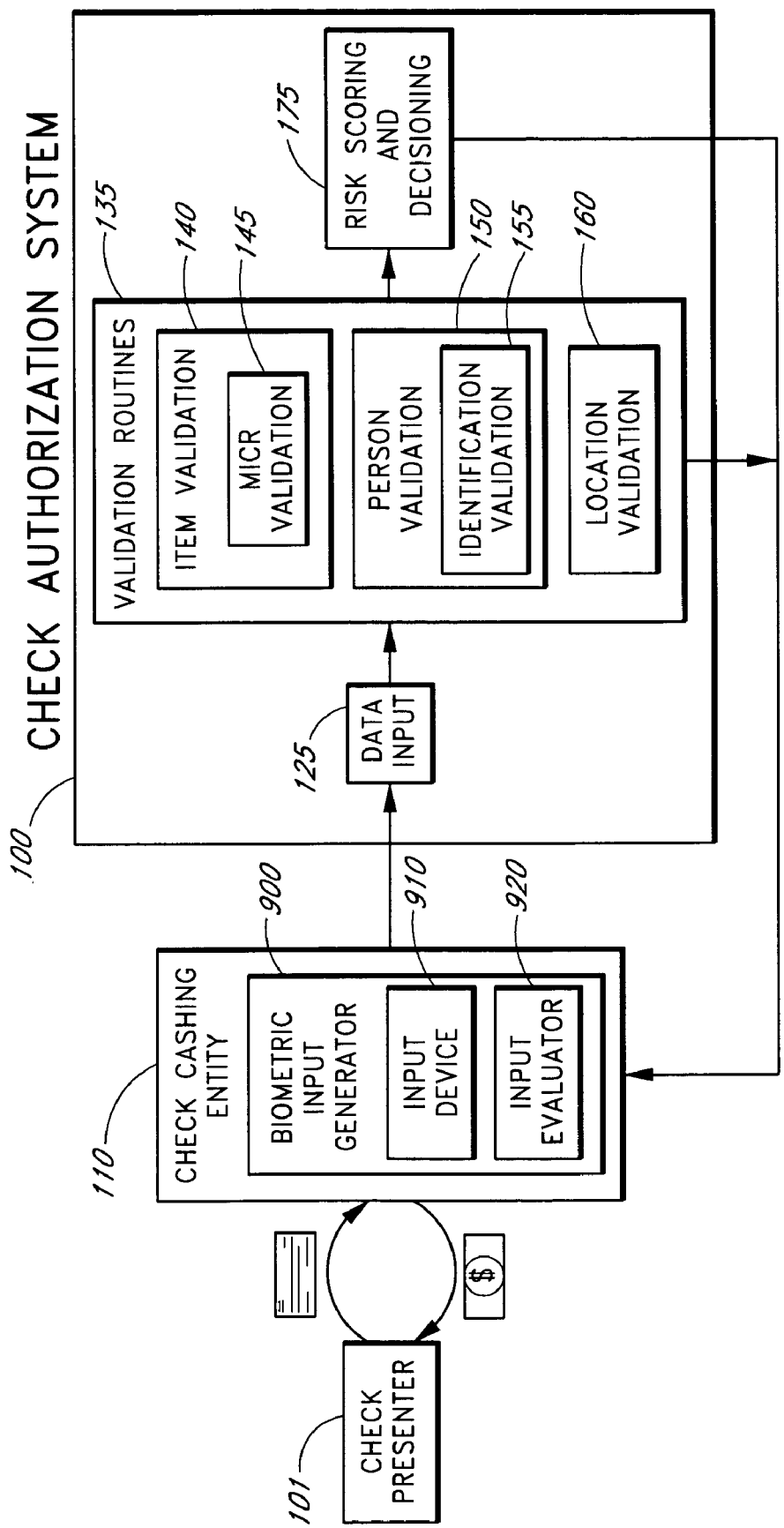
FIG. 9A is a block diagram of one embodiment of a system that uses biometric information to generate a risk score for second-party check acceptance.
Figure 9B:
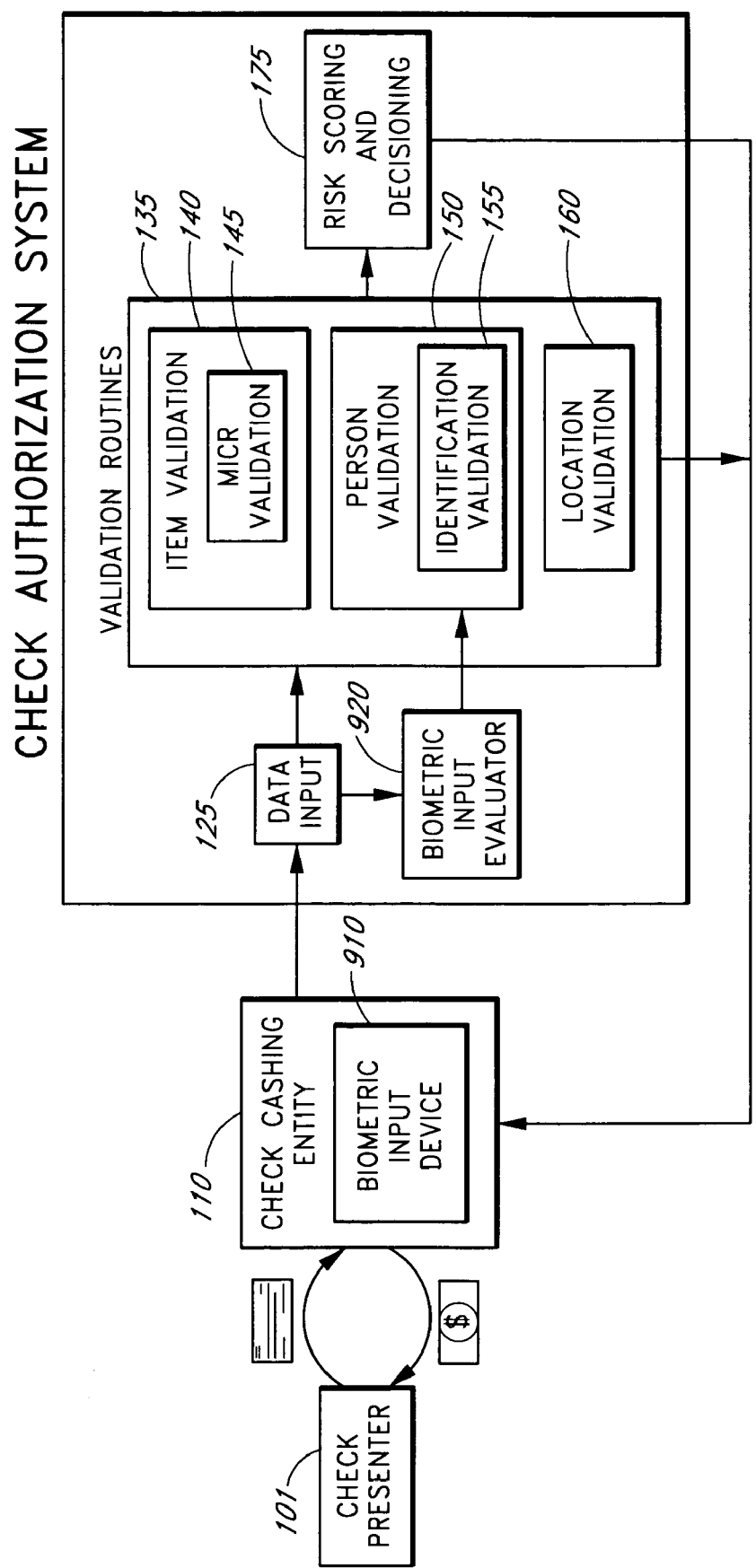
FIG. 9B is a block diagram of a second embodiment of a system that uses biometric information to generate a risk score for second-party check acceptance.

In the embodiments depicted in FIGS. 9A and 9B, biometric input such as a fingerprint or facial image received from the check presenter 101 at the check-cashing entity 110 may be compared by the biometric input evaluator 920 to corresponding information extracted from another source of identification information received from the check presenter 101 during the check-cashing transaction. For example, in one embodiment, biometric input obtained from the check presenter 101 at the time of check presentment may be compared to a fingerprint, a photograph, or other additional biometric information available on a driver's license, smart card, or other identification information source that is provided by the check presenter 101 to the check-cashing entity 110.

Figure 9C:
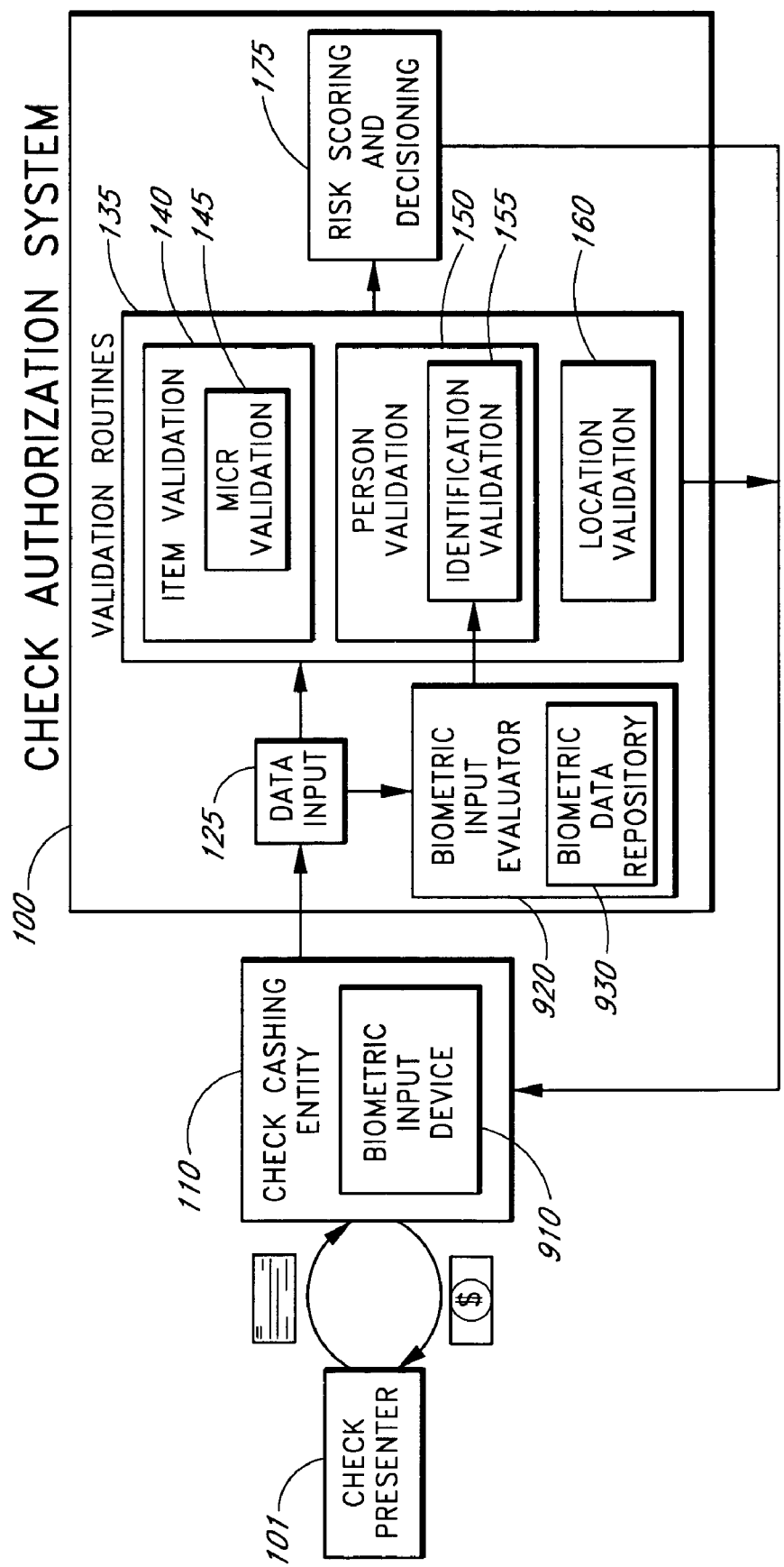
FIG. 9C is a block diagram of a third embodiment of a system that uses biometric information to generate a risk score for second-party check acceptance.
Figure 9D:
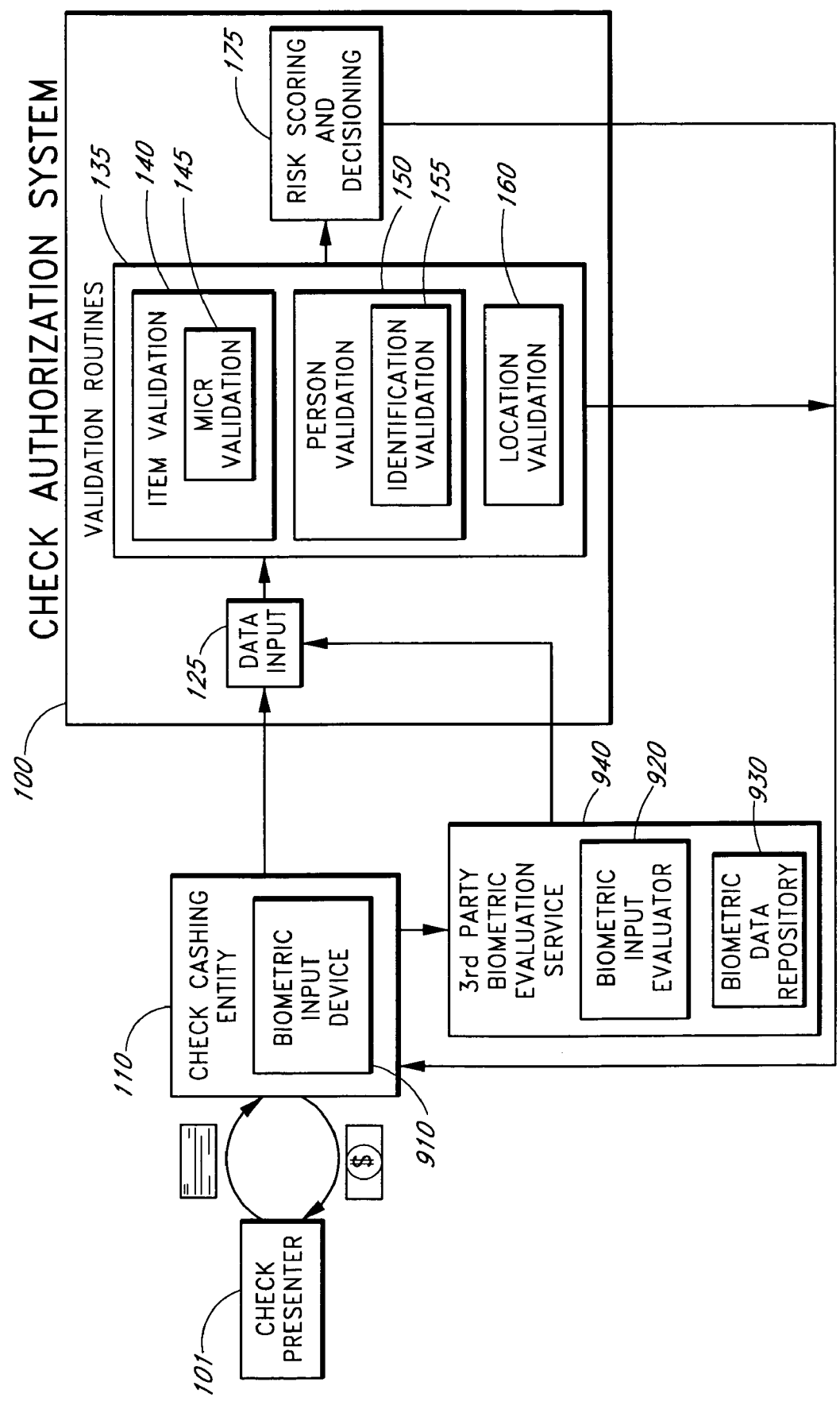
FIG. 9D is a block diagram of a fourth embodiment of a system that uses biometric information to generate a risk score for second-party check acceptance.

In the embodiments depicted in FIGS. 9C and 9D, biometric input information received from the check presenter 101 during the check-cashing transaction is compared by the biometric input evaluator 920 to stored biometric-related information. In some embodiments, individuals who wish to use the services of the check-cashing entity 10 may first register prior to having a check to cash, establishing their identity with the check-cashing entity 110 by having a photograph, fingerprint, or other biometric identification sample taken and stored for future comparisons by the biometric input evaluator 920. Stored biometric information provided at a registration transaction may be stored for future comparisons by the check-cashing entity 110, by the check authorization system 100, and/or by a third party biometric evaluation service, as will be described in greater detail below.

In other embodiments, the biometric input evaluator 920 may use another source of stored biometric information, such as a government database of fingerprints or an employer-supplied repository of employee photographs for comparison with the biometric input information received from the check presenter 101 during the check-cashing transaction. Such stored biometric information may be maintained for future comparisons by the check-cashing entity 110, by the check authorization system 100, and/or by a third party biometric evaluation service, as will be described in greater detail below.

Describing FIGS. 9A, 9B, 9C, and 9D individually now:

In FIG. 9A, the check presenter 101 presents a check to a check-cashing entity 110. The check-cashing entity 110 obtains various types of information associated with the proposed check-cashing transaction from the check presenter 101, as was described in greater detail with reference to FIG. 1. In the embodiment shown in FIG. 9A, the check-cashing entity 10 comprises a biometric input generator 900. The biometric input generator 900 comprises the biometric input device 910, which receives the biometric input from the check presenter 101, and the input evaluator 920, which compares the biometric input from the input device 910 to other information received from the check presenter 01 at the check-cashing entity location 110. For example, the biometric input device 910 may be a camera that photographs the check presenter's 101 face, and the input evaluator 920 may be a component configured to compare the photograph with a scanned image of the check presenter's 101 driver's license photograph, received from the check presenter 101 in conjunction with the proposed transaction. Alternatively, the input evaluator 920 may be a component configured to compare the photograph with a scanned image of the check presenter 101 that was taken when the check presenter 101 was previously registered with the check-cashing entity 110 and that has been stored for comparison.

In the embodiment depicted in FIG. 9A, the input evaluator 920 generates a raw numeric Biometric Confidence score or other expression of a level of confidence that the biometric input matches the other available biometric information received from the check presenter 101. In one embodiment, the Biometric Confidence score is expressed as a percentage or probability that two pieces of biometric data identify the same person. Thus, a score of 100% may expresses a high level of confidence that the check presenter 101 is the same person described by the other biometric information. A score of 50% may express confidence that there is a 50% probability that the check presenter 101 is not the same person as described by the other biometric information. In other embodiments the Biometric Confidence is expressed as a more general numeric value or score.

The check-cashing entity 110 transmits the Biometric Confidence score generated by the biometric input evaluator 900 to the data input component 125 of the check authorization system 100 together with other types of information associated with the proposed check-cashing transaction.

The data input component 125 transmits the received input to the validation routines 135 for item validation 140, person validation 150, and location validation 160. In some embodiments, the person validation routines 150 generate a Biometric Confidence score, also known as a biometric risk score, based at least in part on the raw numeric score. The Biometric Confidence score may be generated based on specific or proprietary rules for interpreting the comparison of the initial or registered biometric input, with the current transaction input. Further, these rules may yield the same or different scores based on similar input. For example, in accordance with the preferences of some check-cashing entities 110, or with respect to some industries or locations, a given partial match may yield a score of "40", but in accordance with the preferences of other check-cashing entities 110, it could yield a score of "30."

From the validation routines 135, the input data is transmitted on to the risk scoring and decisioning component 175, where a transaction risk score is calculated, based at least in part on the biometric input, and an approve/decline recommendation formulated for the proposed check-cashing transaction, as was described in greater detail with reference to FIGS. 1, 3, and 4.

In other embodiments, biometric input obtained from the check presenter 101 at the time of check presentment is compared to previously stored biometric information for the individual, Moving on now to a description of FIG. 9B, the check presenter 101 presents a check for cashing to a check-cashing entity 110. The check-cashing entity 110 obtains from the check presenter 101 various types of information associated with the proposed check-cashing transaction, as was described in greater detail with reference to FIG. 1. In the embodiment shown in FIG. 9B, the check-cashing entity 110 comprises a biometric input device 910, which receives the biometric input from the check presenter 101.

The check-cashing entity 110 transmits the biometric input to the data input component 125 of the check authorization system 100 together with other types of information associated with the proposed check-cashing transaction. In the embodiment shown in FIG. 9B, the input from the biometric input device 910 is transmitted to the check authorization system 100 before the input is compared and/or evaluated. Similarly, the other biometric information is transmitted to the check authorization system 100 prior to comparison. Instead, comparison of the biometric input and the other biometric information is carried out by the check authorization system 100, as will be described in greater detail below.

The data input component 125 transmits at least some of the received input to the validation routines 135 for item validation 140, person validation 150, and location validation 160.

In the embodiment depicted in FIG. 9B, the check authorization system 100 further comprises the biometric input evaluator 920. The data input component 125 is configured to transmit to the biometric input evaluator 920 both the biometric input obtained using the biometric input device 910 and the other biometric information received from the check presenter 101, as was described in greater detail with reference to FIG. 9A. The input evaluator 920 compares the biometric input from the input device 910 to the other biometric information received from the check presenter 101 and generates a raw numeric Biometric Confidence score or other expression of a level of confidence that the biometric input matches the other available biometric information received from the check presenter 101. The biometric input evaluator 920 transmits the Biometric Confidence score or other measure to the person validation routines 150, for inclusion with other validated data from the validation routines 135.

As was described with reference to FIG. 9A, in some embodiments, the person validation routines 150 generate a biometric risk score, based at least in part on the raw numeric score. The biometric risk score may be generated based on specific or proprietary rules for interpreting the comparison of the initial or registered biometric input, with the current transaction input. Further, these rules may yield the same or different scores based on similar input.

From the validation routines 135, the validated data is transmitted to the risk scoring and decisioning component 175, where a transaction risk score is calculated, based at least in part on the biometric input, and an approve/decline recommendation is generated for the proposed check-cashing transaction, as was described in greater detail with reference to FIGS. 1, 3, and 4.

In the embodiments depicted in FIG. 9C, the biometric input evaluator 920 evaluates the biometric input by comparing the input to stored biometric information about the person to whom the check is issued rather than to additional information gathered from the check presenter 101 by the check-cashing entity 110. For example, a fingerprint obtained from the check presenter 101 by the check-cashing entity 110 may be compared by the biometric input evaluator 920 to data in a repository of fingerprint information to determine whether the check presenter 101 appears to the person to whom the check is issued.

In FIG. 9C, the activities, functions, and components of the check-cashing entity 110 and the check presenter 101 are thus substantially the same as has been described with reference to FIG. 9B. Similarly, the activities, functions, and components of the check authorization system 100 are substantially the same as has been described with reference to FIG. 9B. In FIG. 9C, however, the biometric input evaluator 920 is configured to access data from a biometric data repository 930 for use in a comparison with the biometric input obtained from the check presenter 101. In the embodiment depicted in FIG. 9C, the biometric data repository 930 is a component of the check authorization system 100, and thus communications between the biometric input evaluator 920 and the biometric data repository 930 take place internally to the check authorization system 100. In other embodiments, the biometric data repository 930 resides external to the check authorization system 100, and thus communications between the biometric input evaluator 920 and the biometric data repository 930 take place via an external communications system. In the embodiment depicted in FIG. 9C as well as in embodiments in which the biometric data repository reside externally to the check authorization system 100, the validation routines 135 and the risk scoring and decisioning component 175 function in substantially that same way as was described with reference to FIGS. 9A and 9B.

FIG. 9D depicts an embodiment in which the check-cashing entity 110 obtains biometric input from the check presenter 101 at the time of presentment and sends information about the obtained biometric input to a third party biometric evaluation service 940 for evaluation, while other information obtained in connection with the transaction is transmitted directly to the check authorization system 100. In the embodiment depicted in FIG. 9D, the third party biometric evaluation service 940 comprises the biometric input evaluator 920 and the biometric data repository 930. As shown in FIG. 9D, the third party biometric evaluation service 940 is configured to communicate the results of its evaluation to the data input component 125 of the check authorization system 100. In other embodiments, the third party biometric evaluation service 940 is configured to communicate the results of its evaluation back to the check-cashing entity 110, which then transmits the results to the data input component 125 of the check authorization system 100.

In FIG. 9D, the activities, functions, and components of the check authorization system 100 are substantially the same as has been described with reference to FIGS. 9A, 9B, and 9C above.

In the embodiments shown in FIGS. 9A, 9B, 9C, and 9D, the biometric risk score may be used as one factor in an assessment of the risk associated with approving the proposed check-cashing transaction.

The structure and configuration of components and communications links depicted in FIGS. 9A, 9B, 9C, and 9D are one of a plurality of possible structures and configurations suitable to the purposes of the check authorization system 100 described herein. Furthermore, other embodiments of the systems and methods described herein are envisioned which may comprise some, all, or none of the features described with reference to FIGS. 9A, 9B, 9C, and 9D. Thus, FIGS. 9A, 9B, 9C, and 9D are intended to aid in describing and clarifying the features and not to limit the description.

Figure 10:
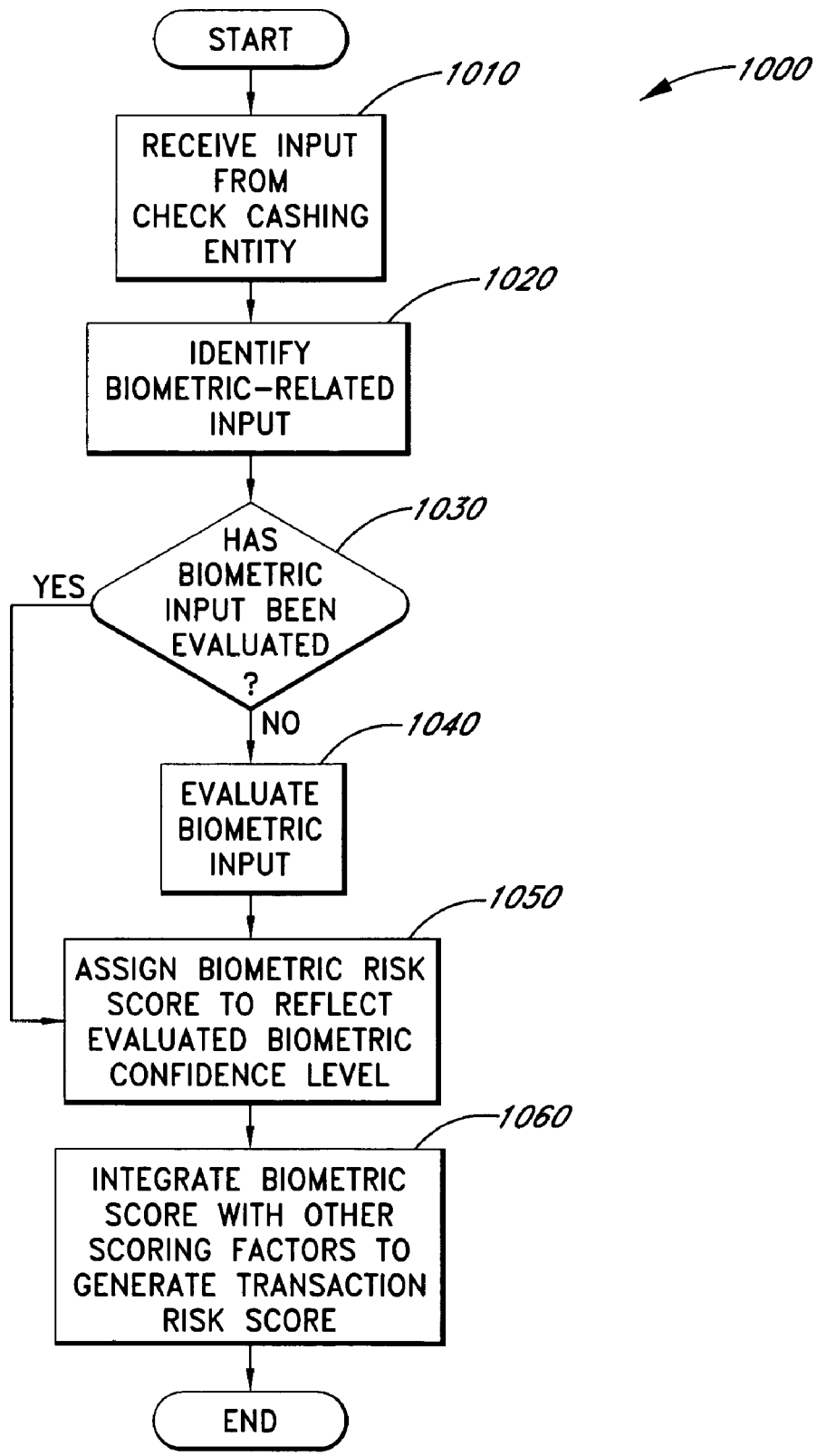
FIG. 10 is a flowchart that depicts one embodiment of a process that uses biometric information to generate a risk score for second-party check acceptance.

FIG. 10 is a flowchart that depicts one embodiment of a process 1000 to use biometric information as a factor in generating a risk score for second-party check acceptance. As depicted in FIG. 10, the process 1000 begins at a start state and continues to state 1010, where the data input component 125 receives input, comprising biometric-related input and other input associated with a proposed check-cashing transaction from the check-cashing entity 110. In state 1020, the data input component 125 identifies the biometric-related input, and, in state 1030, determines if the biometric input has already been evaluated regarding the level of confidence it generates that the check presenter 101 is the same person to whom the check was issued.

If the data input component 125 determines in state 1030 that the biometric input has not yet been evaluated, the data input component 125 transmits the biometric input to the biometric input evaluator 920 for evaluation in state 1040. In various embodiments, the biometric input evaluator 920 may evaluate the biometric input by at least one of: comparing the biometric input with information from an internal repository of biometric data, comparing the biometric input with information from an external repository of biometric data, comparing the biometric input with additional information received from the check presenter, and generating a measure of the level of confidence that the check presenter 101 is the correct payee of the check according to anther method.

When the biometric input has been evaluated, the process 1000 continues from state 1040 on to state 1050.

Returning now to state 1030, if the data input component 125 determines in state 1030 that the biometric input has been evaluated, the process 1000 continues on to state 1050, where a biometric risk score is assigned to reflect the evaluated Biometric Confidence level.

As was described with respect to the positive pay risk score referenced in FIG. 4, the biometric risk score may be assigned to the biometric variable value based on a variety of criteria, business priorities, statistical models, historical observations, and the like. In some embodiments, biometric risk scores are assigned to raw biometric variable values 420 based on an automated learning or decision-making algorithm that identifies risk patterns associated with various variable values 420. In some embodiments, biometric risk scores are assigned to biometric variable values 420 based on a human evaluation of the level of risk associated with various variable values 420. In some embodiments, biometric risk scores are assigned to biometric variable values 420 based on a combination of one or more automated algorithms and human evaluation. In some embodiments, biometric risk scores are assigned to biometric variable values 420 arbitrarily. In some embodiments, methods used to assign biometric risk scores to biometric variable values 420 may vary, based at least in part on trends specific to a given industry or type of check-cashing entity 110. In some embodiments, methods used to assign biometric risk scores to biometric variable values 420 may vary, based at least in part on preferences expressed by the check-cashing entity 110.

From state 1050, the process 1000 continues to state 1060, where the assigned biometric risk score may be used in conjunction with risk scores that reflect other aspects of the proposed check-cashing transaction to calculate a transaction risk score. For example, in one embodiment, the biometric risk score is used in conjunction with an insignia-related risk score to provide a transaction risk score with enhanced risk assessment for the check presenter 101 as well as for the presented check. In another embodiment, a transaction risk score is determined based at least in part on a biometric risk score and on a positive pay risk score. In other embodiments, a variety of combinations of risk scores may be used to determine a transaction risk score, as suits the preferences of the check-cashing entity, the check authorization system and other interested parties.

Thus, it may be that, in some embodiments, even with a biometric risk score indicative of a lower level of confidence in an accurate identification of the check presenter, if other factors influencing the transaction risk are sufficiently positive, the transaction risk score determined may be indicative of a recommendation to accept the transaction.

From state 1060, the process 1000 continues to an end state, where the process 1000 is complete. In various embodiments, the transaction risk score is used to generate an approve/decline recommendation for transmission to the check-cashing entity 110.

In various embodiments, recommendations based at least in part on transaction risk scores may be influenced by preferences, business decisions, and agreements set by the check-cashing entity 110, such that the same transaction risk score could lead to a recommendation to approve a check-cashing transaction for one check-cashing entity 110 and could lead to a recommendation to decline a check-cashing transaction for another check-cashing entity 110.

The flowchart of FIG. 10 describes one embodiment of the process 1000 to use biometric information to generate a risk score for second-party check acceptance as comprising various states in which various functions are carried out. As will be familiar to one of ordinary skill in the art, in other embodiments, the process 1000 may be executed using a different order, configuration, or set of states, and the states of the process 1000 may perform the functions differently from the embodiment of FIG. 10, without departing from the spirit of process 1000.

Risk Scoring Using Location-Related Information

Figure 11A:
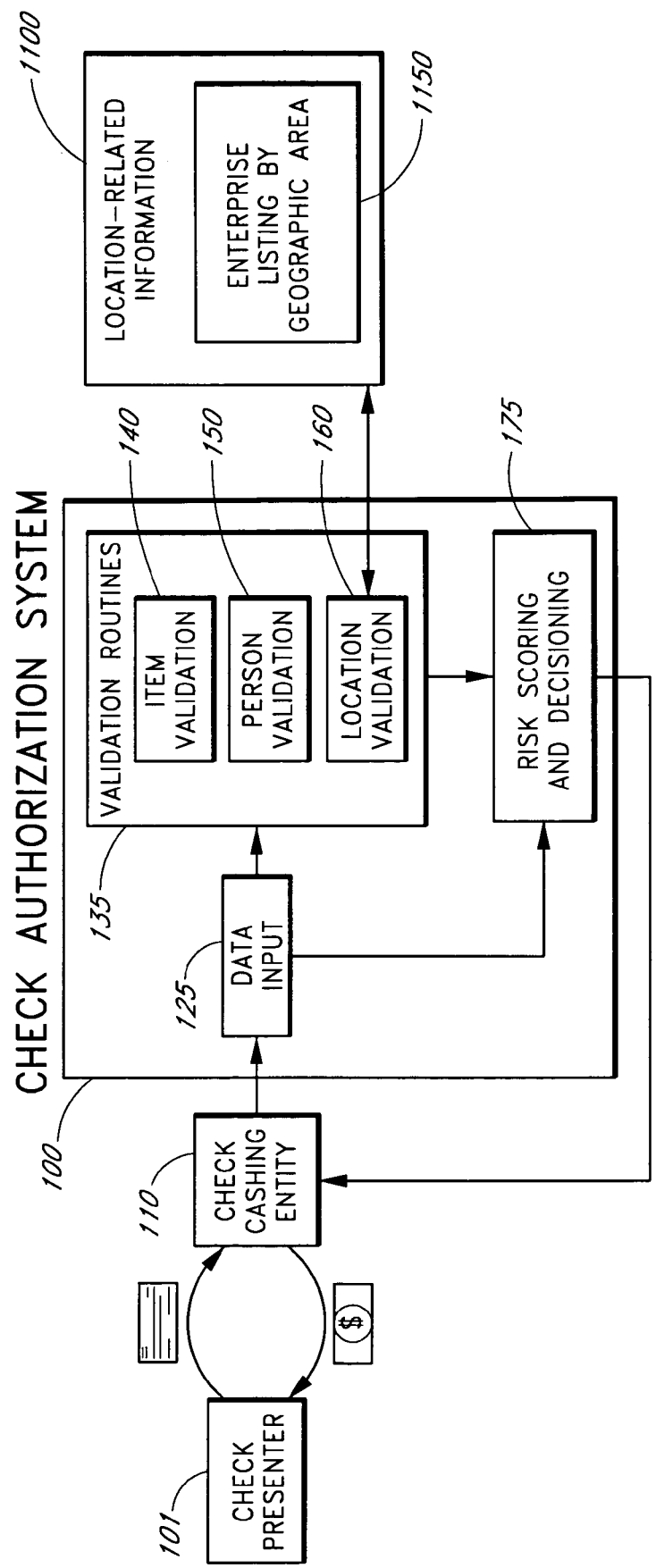
FIG. 11A is a block diagram of one embodiment of a system that uses location-related information to generate a risk score for second-party check acceptance.
Figure 11B:
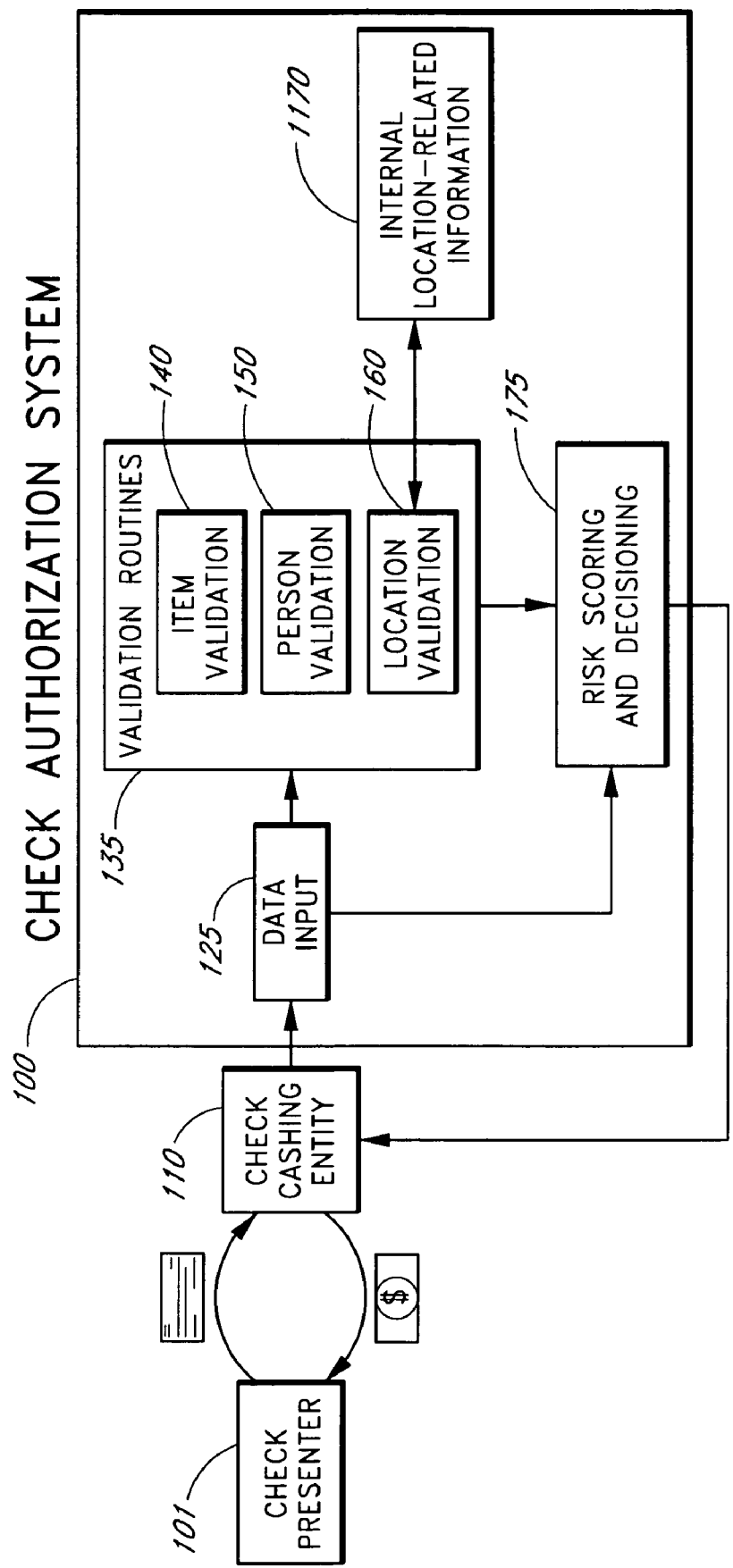
FIG. 11B is a block diagram of a second embodiment of a system that uses location-related information to generate a risk score for second-party check acceptance.

FIGS. 11A and 11B are block diagrams that depict two embodiments of a system that uses location-related information to generate a risk score for second-party check acceptance. Location-related information may be used to enhance confidence in the cashability of a check presented to a check-cashing entity for cashing. For example, in some embodiments, checks issued by employers that are local to the check-cashing entity 110 may be deemed to pose less risk for cashing than do checks issued by employers located at a greater distance from the check-cashing entity 110. In such embodiments, information about the location of the check issuer may be accessed by the check authorization system 100 and may be used to determine the proximity of the check issuer to the check-cashing entity 110 and to calculate a risk score for the proposed transaction.

For example, information may exist that categorizes the locations of businesses according to regions, such as Metropolitan Statistical Areas (MSA's) that are used and updated in government census surveys. As another example, information may be compiled and maintained by the check authorization system 100 or by a third party regarding large employers, government entities, or other check issuers that categorizes the locations of the check issuers by city, county, state, zip code, time zone, or other categories or regions, or that uses a system such as a global positioning system (GPS) or other coordinate system to describe the location of the check issuers.

Other types of location-related and/or proximity-based information that are found to be useful in enhancing risk assessment for a proposed check-cashing transaction may also be used, where permissible by law. For example, in an embodiment configured to authorize the cashing of government checks, information about the jurisdictions of various check-issuing governmental entities may be useful to the item validation routines 140 of a check authorization system 100.

In FIGS. 11A and 11B, the check presenter 101 presents a check to a check-cashing entity 110. The check-cashing entity 110 obtains various types of information associated with the proposed check-cashing transaction from the check presenter 101, comprising, among other types of information, information about the issuer of the check being presented for cashing. As has been described above, the check issuer may be an employer or other business entity, government entity, financial entity, other entity, individual, or the like. The information about the check issuer may be prompted for explicitly at the check-cashing entity 110 or may be extracted from other information obtained in association with the check-cashing transaction. For example, the check issuer may be identified by way of a routing number and account number read from the face of the presented check. The information about the check issuer may comprise information about the location of the check issuing business or may allow for stored information about the location of the check issuing business to be accessed. For example, in some embodiments, using information about the checking account on which the presented check is drawn allows the check authorization system 100 to access location-related information 1100, 1170 for the check issuer.

In various embodiments, information may be obtained by the check-cashing entity 110 using one or more input devices or systems comprising, but not limited to: a keypad, a voice recognition system, a touchscreen, an optical character recognition (OCR) reader, a scanner, a smartcard reader, and a stylus.

In some embodiments, if the check authorization system 100 is not initially able to successfully use the information about the check issuer received from the check-cashing entity 110, the check authorization system 100 may transmit an indication to that effect to the check-cashing entity 110, and a prompt may be displayed to an operator at the check-cashing entity 110 to input additional information about the check-issuer. For example, if the check authorization system 100 is not able to access location-related information about a check issuer using information from the MICR-line of the presented check, the operator at the check-cashing entity may be prompted to type in address information about the check issuer. In other embodiments, the operator may be prompted to enter information about the check issuer name, check issuer bank account identifier, and location information. In some embodiments, the additional information entered may be stored in the repository of location-related information 1170 for use in association with subsequent transactions.

As was described in greater detail with reference to FIG. 1, the check-cashing entity 110 transmits information related to the proposed check-cashing transaction 110 to the data input component 125 of the check authorization system 100 via a communications interface. The data input component 125 transmits at least some of the information to the validation routines 135 for processing by the item validation 140, the person validation 150, and the location validation 160 routines.

As depicted in FIGS. 11A and 11B, the location validation routines 160 access location-related information 1100, 1170 in order to assess location-related factors associated with the proposed check-cashing transaction, such as the proximity of the check-issuing business to the check-cashing entity's location 110.

Location-related information 1100, 1170 that is used by the item validation routines 140 of a check authorization system 100 may be stored externally or internally to the check authorization system 100. FIG. 11A depicts an embodiment in which the item validation routines 140 access enterprise listings by area 1150 from a source of location-related information 1100 that is located externally to the check authorization system 100. For example, information available from the U.S. Census Bureau or other government entity, from a business bureau, or from a third-party source of location information may be accessed externally by the check authorization system 100.

FIG. 11B depicts an embodiment in which location-related information 1170 is compiled and maintained by the check authorization system 100 and can be accessed by the item validation routines 140 internally. One embodiment of an internal repository of location-related information 1170 is described in greater detail with reference to FIG. 11C below.

In some embodiments, the location validation routines 160 may access information about the check-cashing entity's location 110 as well as information about the check issuer's location in order to make a comparison between the two. In some embodiments, information about the check-cashing entity's location 110 may be stored at the check authorization system 100. In some embodiments, information about the check-cashing entity's location 110 may be transmitted to the check authorization system 100 at the time of check presentment or may be obtained by the check authorization system 100 according to another method.

In some embodiments, the comparison between the check-cashing entity location 110 and the check issuer location may yield a result that is expressed in terms of distance, such as miles distance between the check-cashing entity 110 and the check issuer. In some embodiments, the comparison may yield a result that is expressed in terms of a number of MSA's, counties, zip code areas, telephone area code areas, or the like that are crossed to navigate from the check-cashing entity 110 to the check issuer. In some embodiments, the comparison may yield a result that is expressed in terms of a category, such as YES/NO categories for an embodiment that determines whether the check-cashing entity 110 and the check issuer are located in the same MSA, or as, for example, one of a set of proximity-based categories, such as LOCAL, MID_RANGE, and DISTANT for expressing distances of varying amounts.

As depicted in FIGS. 11A and 11B, in some embodiments, a comparison of the check issuer's location with the check-cashing entity's 110 location may be performed by the risk scoring and decisioning component 175 of the check authorization system 100. For example, information about the check-cashing entity's 110 location may be passed to the risk scoring and decisioning component 175 by the data input component 125, and information about the check issuer's location may be passed to the risk scoring and decisioning component 175 by the validation routines 135.

In various embodiments, the location validation routines 160 or the risk scoring and decisioning component 175 may assign a location-related risk score based at least in part on the location-related information associated with the proposed transaction.

Based on the needs, preferences, and characteristics of a check-cashing entity 110, location-related proximity information may be evaluated and used according to different guidelines, oftentimes referred to as "rules." Thus, definitions of what constitutes a "local" business, a "non-local" business, a long distance, a short distance, or any distance in between may be defined as suits the risk assessment preferences of the check-cashing entity 110, through customized rules. For example, risk assessment rules for checks presented at a convenience store in a small rural town may assign a score indicative of higher risk when the checks are issued by employers located at a long distance from the town than would risk assessment for checks presented at a resort that frequently hosts visitors from the same long distance.

As was described in greater detail with reference to FIG. 4 above, the location-related risk score 430 expresses a level of perceived risk associated with the location-related information, expressed as one or more location-related variable values 420. In various embodiments, a location-related risk score 430 may be assigned to location-related variable values 420 based on a variety of criteria, business priorities, statistical models, historical observations, and the like. In some embodiments, location-related risk scores are assigned to location-related variable values 420 based on an automated learning or decision-making algorithm that identifies risk patterns associated with various variable values 420. In some embodiments, location-related risk scores 430 are assigned to location-related variable values 420 based on a human evaluation of the level of risk associated with various variable values 420. In some embodiments, location-related risk scores are assigned to location-related variable values 420 based on a combination of one or more automated algorithms and human evaluation. In some embodiments, location-related risk scores are assigned to location-related variable values 420 arbitrarily. In some embodiments, methods used to assign location-related risk scores to location-related variable values 420 may vary, based at least in part on trends specific to a given industry or type of check-cashing entity 110. In some embodiments, methods used to assign location-related risk scores to location-related variable values 420 may vary, based at least in part on preferences expressed by the check-cashing entity 110.

The location-related risk score 430 may be used alone or may be combined with other risk scores to calculate a more comprehensive risk score 440 for the proposed check-cashing transaction. For example, in one embodiment, a more comprehensive transaction risk score 440 may be based on the location-related risk score as well as on biometric information obtained from an individual presenting a check for cashing.

The structure and configuration of components and communications links depicted in FIGS. 11A and 11B are one of a plurality of possible structures and configurations suitable to the purposes of the check authorization system 100 described herein. Furthermore, other embodiments of the systems and methods described herein are envisioned which may comprise some, all, or none of the features described with reference to FIGS. 11A and 11B. Thus, FIGS. 11A and 11B are intended to aid in describing and clarifying the features and not to limit the description.

FIG. 11C depicts one embodiment of a repository of location-related information 1170 about check issuers. In various embodiments, the repository 1170 may be compiled and maintained by the check authorization system 100 or by an external third party service. In various embodiments, the repository 1170 is stored on a computer-accessible storage medium.

For example, the repository 1170 may be a database of location-related information for employers who operate within a given proximity to one or more check-cashing entities 110. Compiling the database may comprise identifying employers in a desired geographical location, such as within twenty miles of a given check-cashing entity 110 or within the same county as the check-cashing entity 110, and creating records for the employers, wherein information about an employer, such as an employer name, and an associated employer location are stored within a record. In some embodiments, identifying employers or other check issuers within a desired geographical comprises identifying employers in a desired geographical location further comprises identifying employers within a desired region defined by at least one of the set consisting of: zip code, city, county, state, telephone area code, and Metropolitan Statistical Area (MSA). In some embodiments, check issuers for whom records are compiled in the repository 1170 may be from any geographical location. In some embodiments, the records may be compiled for employers within the desired geographical location who are above a minimum threshold in size, as measured by number of employees, net worth, or some by some other measure.

In some embodiments, compiling the database may further comprise obtaining from the employers identifiers for checking accounts that the employers use for issuing payroll checks to their employees and storing information about the checking account identifiers in the associated records of the repository. An identifier for a checking account on which a check is being drawn may frequently be obtained from the check when it is being presented for cashing. Thus, obtaining the check account identifier may allow for accessing the employer location information stored in the repository 1170.

In the embodiment shown in FIG. 11C, location information for the check issuer of a check presented for cashing may be accessed using identification information about a bank checking account on which the check is drawn. The identification information about the bank checking account may be available from a variety of sources, for example: using a magnetic ink reader to read a MICR-line on the face of the check, using optical character recognition (OCR) technology to read an imprinted bank and account number from the face of the check, having an operator of the data input device 115 at the check-cashing entity 110 read the check and manually or verbally and input bank and account number from the check, or by another currently-available or future-available method, as will be familiar to one of ordinary skill in the art.

The embodiment of the repository of location-related information 1170, as depicted in FIG. 11C, comprises four or more fields 1171-1174 useful for accessing location-related information for risk scoring. A bank number field 1171 and an account number field 1172 allow for accurate identification of a bank account associated with the presented check. When the repository 1170 comprises records referring to accounts from multiple banks, as is frequently the case, the bank number field 1171 and the account number field 1172, used in conjunction, may be considered to be an identifier for the account referred to in a record. In embodiments where the repository 1170 comprises records that refer to accounts in one bank, the bank number field 1171 may not be necessary for accurate identification of an account and its associated check issuer. A payor name field 1173 provides information about a name associated with the check issuer. Payor name information 1173 may be useful, for example, for verifying correct identification of the check issuer, or, as another example, may be used as an input in other embodiments for accessing payor location information.

A payor location field 1174 stores information about the location of a check issuer useful for determining a location-based risk score for the check-cashing transaction. In various embodiments, the payor location field 1174 may describe the payor location using at least one of: a street address, city identifier, county identifier, state identifier, zip code, telephone area code, metropolitan statistical area (MSA) identifier, GPS or other geographical coordinate descriptor, or other type of location identifier. Information from the payor location field 1174 may, in some embodiments, be used on its own to determine a location-based risk score, or may be used in combination with other information, such as location information for the check-cashing entity 110, to determine a location-based risk score for the check-cashing transaction. For example, the check authorization system 100 may calculate a distance between the payor location and the check-cashing entity 110 location. As another example, the check authorization system 100 may determine whether the payor location and the check-cashing entity 110 location are situated in the same zip code area, or the like, or whether the check-cashing entity 110 location payor location are situated in nearby zip code areas, or the like. Thus information about the proximity of the payor location and the check-cashing entity 110 location may be used for risk scoring purposes.

In other embodiments, the repository of location-related information 1170 may additionally or alternatively comprise other fields, such as one or more fields indicating whether the check issuer operates offices or other facilities located across multiple areas, such as a national corporation with branches in a plurality of states. In some embodiments, other information about the check issuers, such as number of years in business or employer size, based, for example, on number of employees or net worth, may be stored in the repository 1170 to provide additional information deemed to be useful to an assessment of the risk involved in accepting a check issued by the check issuer.

In some embodiments, one or more fields in the repository of location-related information 1170 may store pre-determined or pre-calculated proximity information for a given check issuer and one or more locations, such as for one or more check-cashing entity locations 110. For example, average distance information for a given check issuer and check-cashing entities 110 in various regions may be pre-calculated and stored in the repository 1170. Using such pre-determined proximity information, the check authorization system 100 may, in some embodiments, determine a location-related risk score for a check transaction without needing to use valuable computer processor time to determine or to calculate proximity information for the individual check transaction. In other embodiments, other types of pre-determined or pre-calculated location-related information may be stored in order to expedite location-based risk scoring by the check authorization system 100. In other embodiments, other types of geographic-related data for the check issuer and/or for the check-cashing entity 110 may be stored in the repository 1170.

Other fields, other embodiments of the repository of location-related information 1170, and other types of location-based information that may enhance a risk assessment of a financial transaction using location-based information are envisioned as embodiments of the systems and methods described herein without departing from the spirit of the invention.

In some embodiments of the systems and methods described herein, if a check presenter 101 presents a check with a check account identifier that does not appear in the repository of location-related information 1170, the check authorization system 100 may update the repository by requesting from the check-cashing entity 100 that is processing the transaction information about at least one of: an employer name, an employer bank account identification, and employer location information associated with the presented check, and adding the information received from the check-cashing entity 110 to the repository 1170. In some embodiments, the check authorization system 100 may transmit a message to the check-cashing entity 110 that causes a prompt to appear to an operator of a point-of-sale device at the check-cashing entity 110, requesting that the operator input the desired information.

Figure 12:
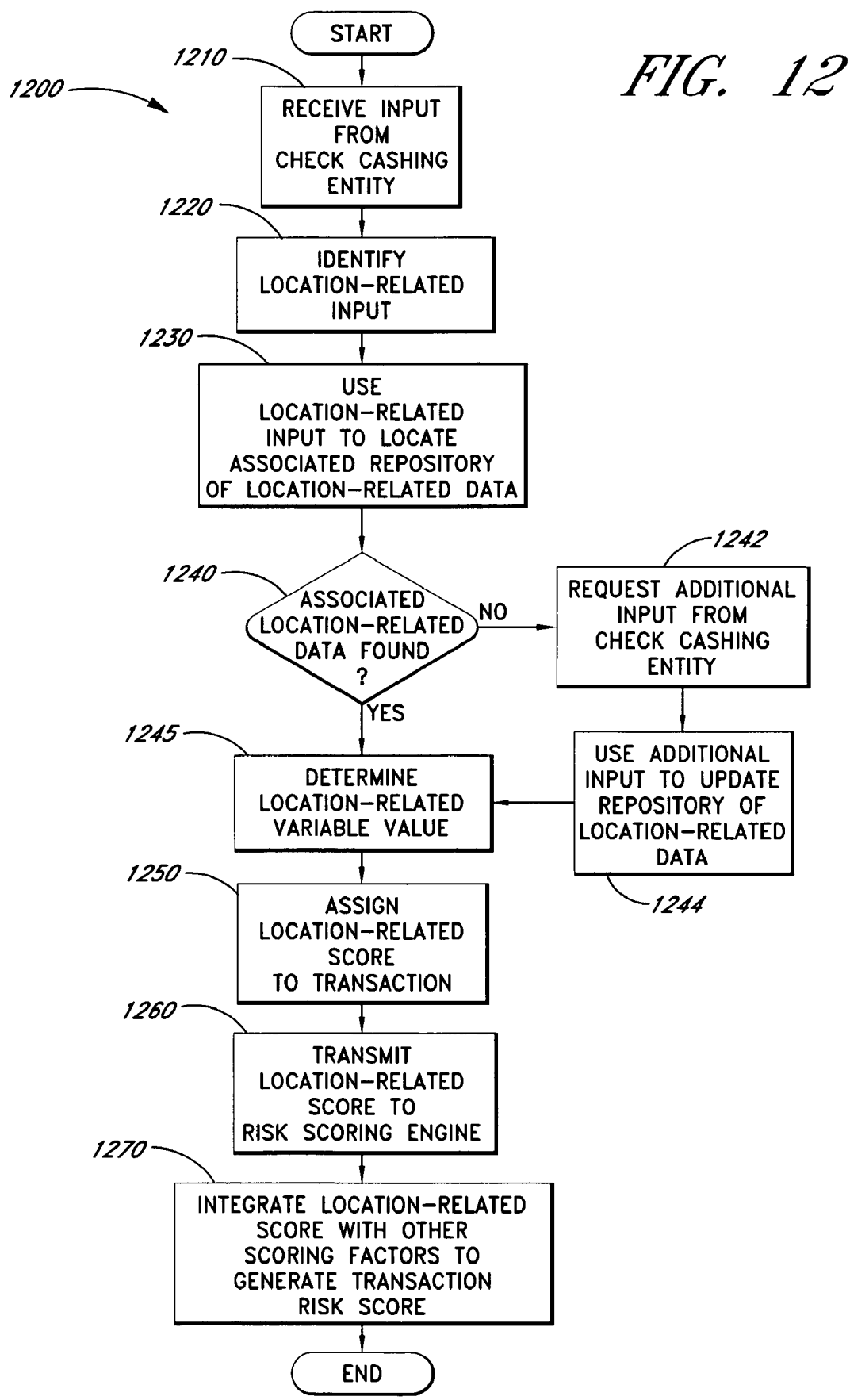
FIG. 12 is a flowchart that depicts one embodiment of a process that uses location-related information to generate a risk score for second-party check acceptance.

FIG. 12 is a flowchart that depicts one embodiment of a process 1200 to use location-related information to generate a risk score for second-party check acceptance. The process 1200, as depicted in FIG. 12, begins at a start state and moves to state 1210 where the data input component 125 of the check authorization system 100 receives input about a proposed check-cashing transaction from a check-cashing entity 110. As described with reference to FIG. 1, the input may comprise information about the check presenter, information about the check item, and other information useful for assessing the risk associated with accepting the check for cashing.

Moving on to state 1220, the input is transmitted to the validation routines 135, where a subset of the input that is useful for accessing location-related information is identified. In various embodiments, different types of input may be used to access location-related information. For example, in some embodiments, MICR-line information obtained from the face of the check provides identification for a bank and account number associated with the check. In embodiments where the check authorization system 100 has access to a suitably configured repository of information, location-related information for the check issuer may be accessed using the MICR-line information.

In other embodiments, the input useful for locating the desired location-related information may be at least one of: a business name for the check issuer and/or an address or other identifying information for the issuer of the check. In other embodiments, other data received by the data input component 125 may be useful in locating location-related information.

Moving on to state 1230, the location-related input is used in an attempt to locate associated location-related information about the check issuer from a suitable repository of location-related data 1100, 1170.

Moving on to state 1240, the process 1200 determines if the attempt to locate associated location-related information about the check issuer was successful. If the attempt was successful, the process 1200 moves on to state 1245 and a location-related variable value 420, as is described with reference to FIG. 4 is determined, based at least in part on the accessed location-related information. For example, a distance in miles from the check-cashing entity 110 to the check issuer location may be calculated as used as the location-related variable value 420. As is exemplified with reference to the example score calculations of FIG. 4, the issuer of the presented check may, in some embodiments, be characterized as being a "LOCAL" employer, a "NON-LOCAL" employer, or an "NOT AVAIL" employer for which location data is unavailable. In other embodiments, other systems for categorizing the transaction based on the location-related information may be used, as will be familiar to one of ordinary skill in the art.

Returning now to state 1240, if, in state 1240, the process 1200 determines that location-related information was not found in the repository, the process moves to state 1242, where a message is sent to the check-cashing entity 110, requesting additional input. In some embodiments, a message is displayed to an operator at the check-cashing entity 110, prompting the operator to request additional location-related information from the check-presenter 101 or to otherwise obtain additional location-related information.

In some embodiments, if no location-related information associated with the bank account identified in the check's MICR-line was found in the repository, and if additional input obtained from the check presenter 101 and the check-cashing entity 110 is able to provide location-related information for the check issuer, the check authorization system 100 adds the newly-obtained location-related information for the check issuer to the repository. For example, in one embodiment, the check authorization system 100 may create a record in the repository with MICR-line information from the check and with information about the check issuer's name and location obtained from the check presenter 101 and/or from information imprinted on the check.

Once location-related information for the check issuer has been obtained, the process 1200 moves on to state 1245, where a location-related variable value 420, is determined, based at least in part on the accessed location-related information, as described in greater detail above.

From state 1245, the process 1200 moves on to state 1250 where the item validation routines 140 assign a location-related risk score 430 to the transaction based on the location-relation variable value.

As was described in greater detail with reference to FIG. 4 above, the location-related risk score expresses a level of perceived risk associated with the location-related variable value 420. In various embodiments, a location-related risk score may be assigned to location-related variable values 420 based on a variety of criteria, business priorities, statistical models, historical observations, and the like. In some embodiments, location-related risk scores are assigned to location-related variable values 420 based on an automated learning or decision-making algorithm that identifies risk patterns associated with various variable values 420. In some embodiments, location-related risk scores are assigned to location-related variable values 420 based on a human evaluation of the level of risk associated with various variable values 420. In some embodiments, location-related risk scores are assigned to location-related variable values 420 based on a combination of one or more automated algorithms and human evaluation. In some embodiments, location-related risk scores are assigned to location-related variable values 420 arbitrarily. In some embodiments, methods used to assign location-related risk scores to location-related variable values 420 may vary, based at least in part on trends specific to a given industry or type of check-cashing entity 110. In some embodiments, methods used to assign location-related risk scores to location-related variable values 420 may vary, based at least in part on preferences expressed by the check-cashing entity 110.

Moving on to state 1260, the item validation routines 140 transmit the location-related score 430 to the risk scoring and decisioning component 175 of the check authorization system 100. As was described in greater detail with reference to FIG. 4, the location-related risk score reflects a perceived level of risk associated with approving a transaction with the assigned location-related category or characteristic.

Moving on to state 1270, the risk scoring and decisioning component 175 integrates the assigned location-related score with other scoring variables that reflect risk associated with other aspects of the proposed check-cashing transaction, such as, for example, the check amount, biometric input of the check presenter 101, and/or positive pay information associated with the check, as was exemplified with reference to the score calculations of FIG. 4. Based at least in part on the location-related risk score, the risk scoring and decisioning component 175 calculates a risk score 440 for the proposed transaction, and the process 1200 to use location-related information as a factor in a risk scoring calculation for a check-cashing transaction is complete.

In one embodiment, the process 1200 is used as part of a larger risk assessment process for check-cashing transactions, in which the risk scoring and decisioning component 175 transmits a recommendation to approve or to decline the proposed check-cashing transaction to the check-cashing entity 110, based at least in part on the transaction risk score 440 calculated by the process 1200.

In various embodiments, recommendations based at least in part on transaction risk scores may be influenced by preferences, business decisions, and agreements set by the check-cashing entity 110, such that the same transaction risk score could lead to a recommendation to approve a check-cashing transaction for one check-cashing entity 110 and could lead to a recommendation to decline a check-cashing transaction for another check-cashing entity 110.

The flowchart of FIG. 12 describes one embodiment of the process 1200 for using location-related information to generate a risk score for second-party check acceptance as comprising various states in which various functions are carried out. As will be familiar to one of ordinary skill in the art, in other embodiments, the process 1200 may be executed using a different order, configuration, or set of states, and the states of the process 1200 may perform the functions differently from the embodiment of FIG. 12, without departing from the spirit of process 1200.

Risk Scoring Using Information about Authentication Marks

Figure 13A:
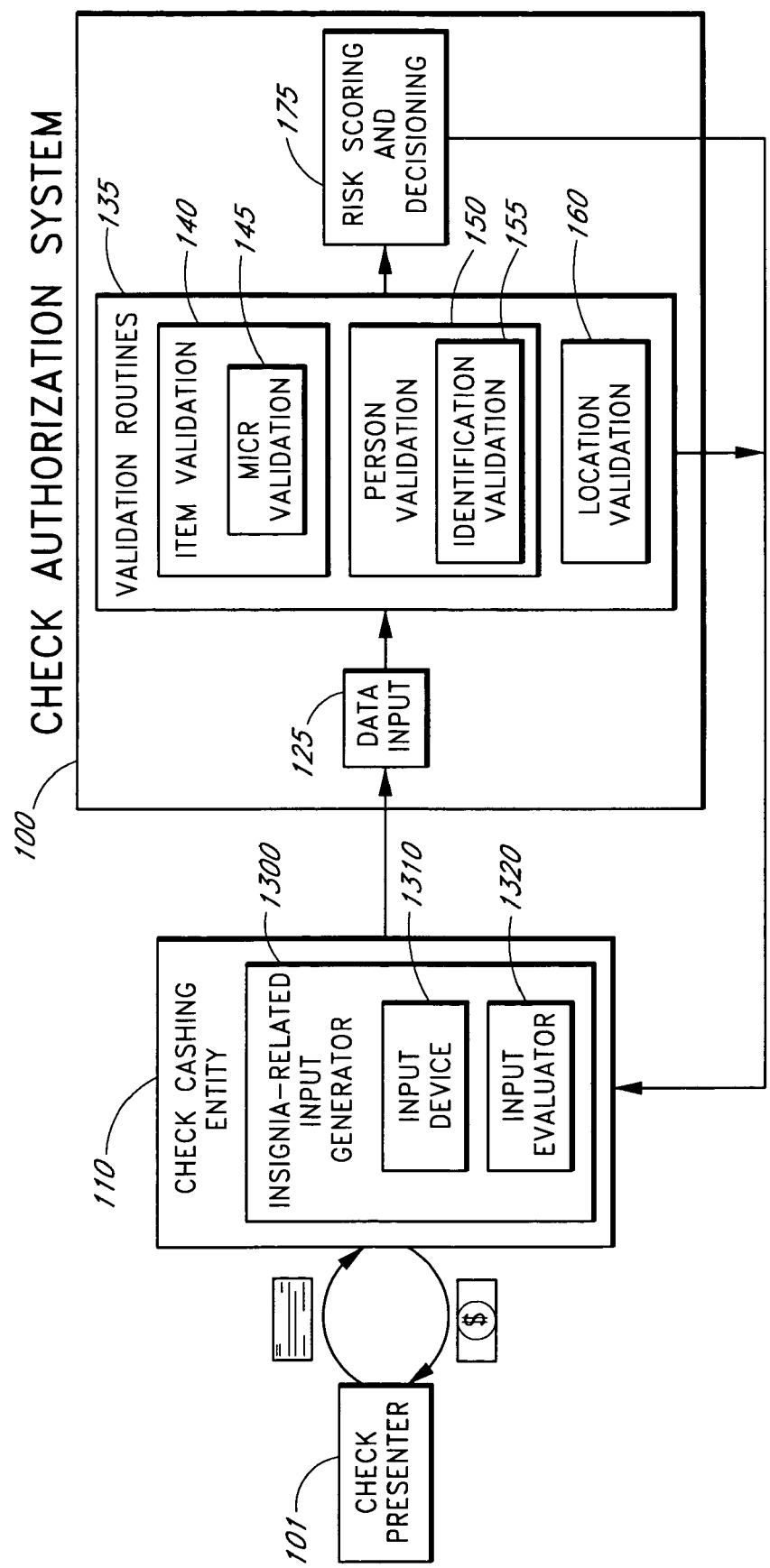
FIG. 13A is a block diagram of one embodiment of a system that uses insignia-related information to generate a risk score for second-party check acceptance.
Figure 13B:
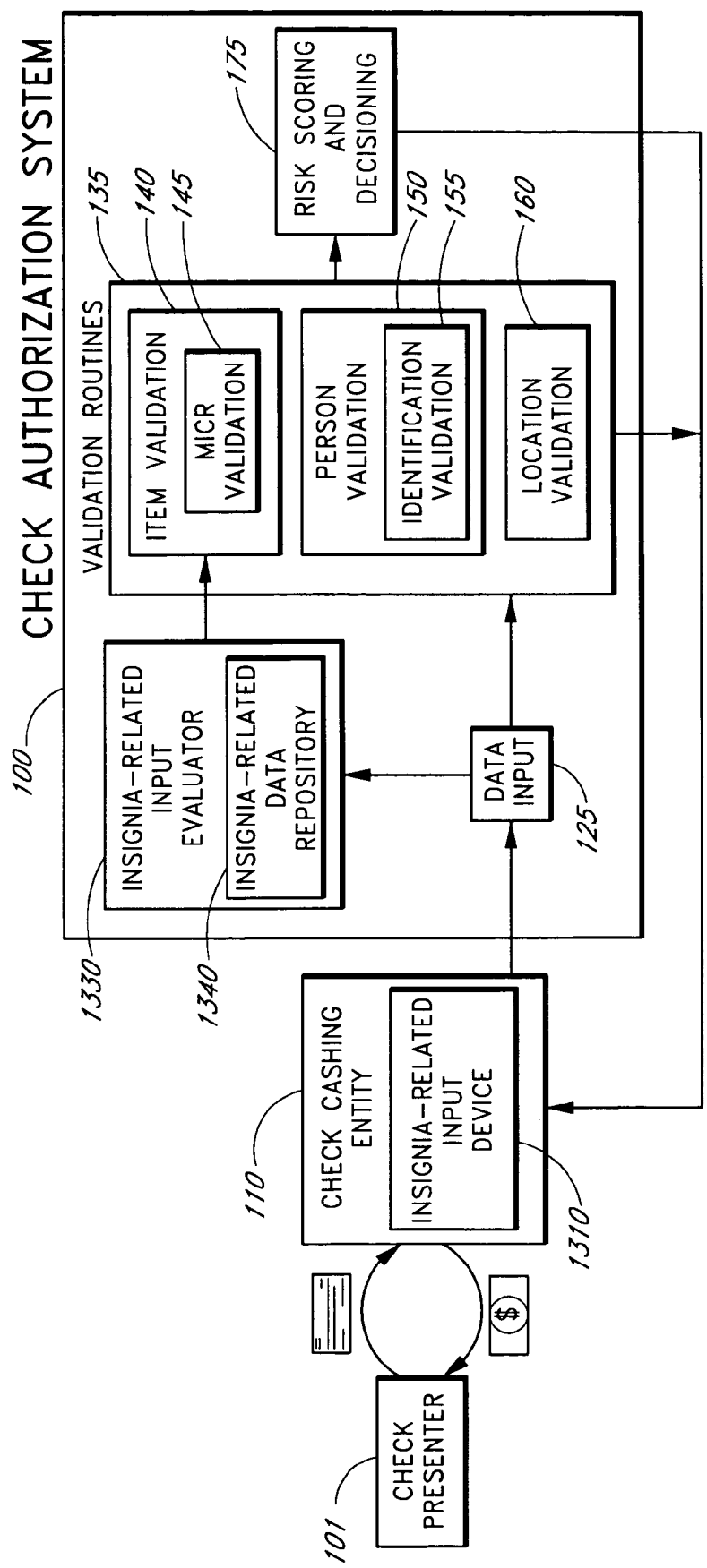
FIG. 13B is a block diagram of a second embodiment of a system that uses insignia-related information to generate a risk score for second-party check acceptance.
Figure 13C:
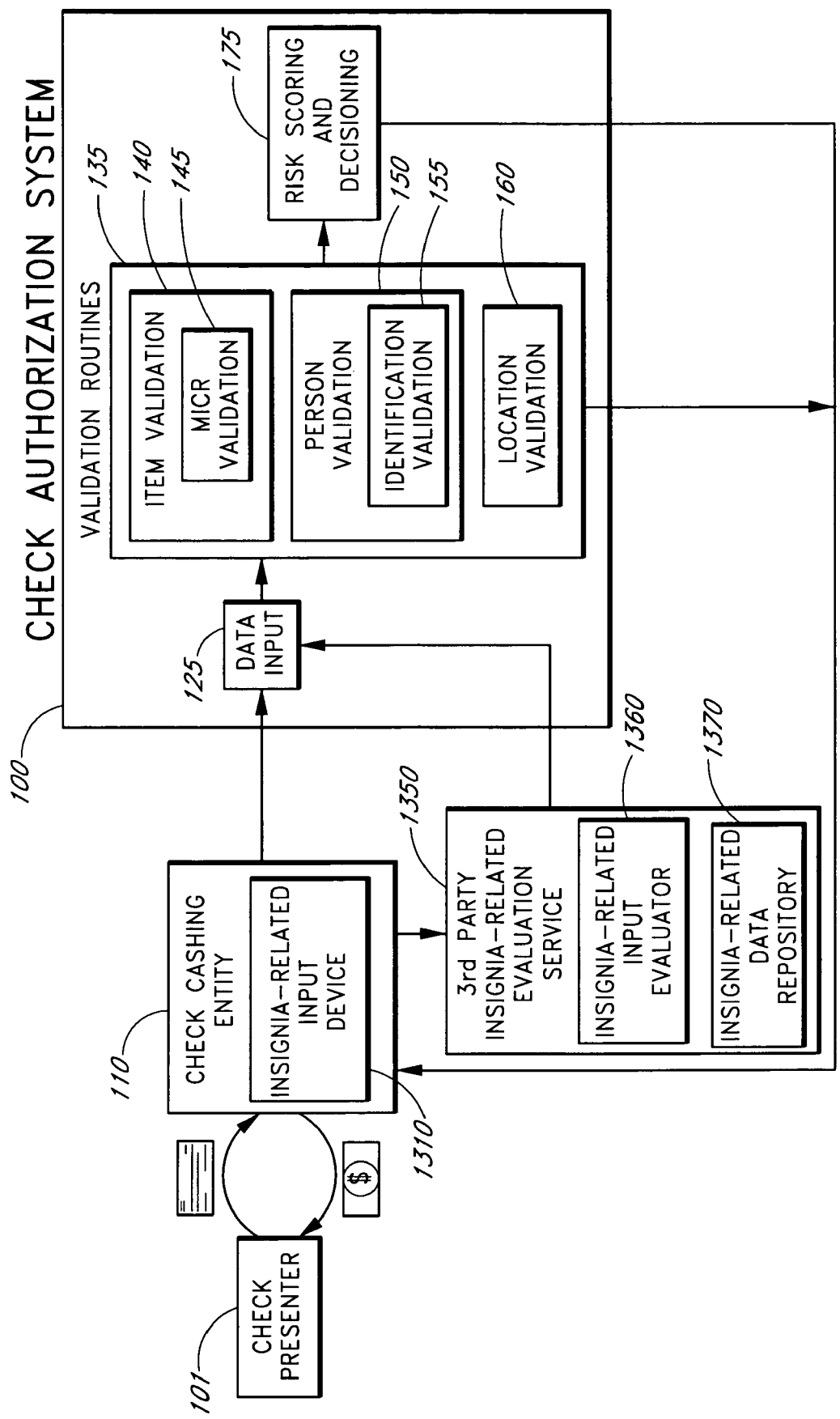
FIG. 13C is a block diagram of a third embodiment of a system that uses insignia-related information to generate a risk score for second-party check acceptance.

FIGS. 13A, 13B, and 13C are block diagrams that depict three embodiments of a system that uses authentication marks or other insignia-related information to generate a risk score for second-party check acceptance. Authentication mark are marks or devices incorporated into a check or other negotiable instrument that are difficult and/or costly for counterfeiters to reproduce and that thus help to distinguish a legitimate check or negotiable instrument from a counterfeit. Examples of authentication marks comprise, but are not limited to, watermarks, security validation numbers, bar codes, insignia, background patterns, color schemes, colorshifting ink, holographic strips, ultraviolet light sensitive fibers, encryption, and other marks or devices which may serve to enhance confidence in the authenticity of the check, in addition to or as an alternative to features that serve to identify a check and its associated bank account. Insignia-related information may be used to enhance confidence in the cashability of a check presented to a check-cashing entity for cashing. Other types of insignia-related and/or authentication-mark-based information that are found to be useful in enhancing risk assessment for a proposed check-cashing transaction may also be used.

In FIGS. 13A, 13B, and 13C, the check presenter 101 presents a check to a check-cashing entity 110. The check-cashing entity 110 obtains various types of information associated with the proposed check-cashing transaction from the check presenter 101, comprising, among other types of information, information about authenticating marks on the check being presented for cashing, which may be obtained using an insignia-related input device 1310 other type of graphic input system. The information about the authenticating mark, or insignia, may, in various embodiments, comprise one or more electronically captured images of the insignia. In some embodiments, information about the authenticating mark may comprise a front image and a back image of the authenticating mark. In some embodiments, information about the authenticating mark may comprise a front and back image of the presented check or other negotiable instrument. In some embodiments, information about the authenticating marks is input manually or verbally by an operator of an input device 115 at the check-cashing entity 110.

In various embodiments, insignia-related input from the presented check is evaluated by comparing it to an expected image, configuration, or characteristic for the authentication mark. In some embodiments, insignia-related input from the presented check is evaluated based on information other than a stored image, such as, for example, on rules that describe a correct or acceptable version of the authenticating mark. Stored insignia-related information, such as a database of expected images of authenticating marks or another repository of rules or other information associated with authenticating marks, may be used for comparing with insignia-related input obtained in conjunction with a proposed check-cashing transaction. As will be described with reference to FIGS. 13A, 13B, and 13C, the insignia-related information may be stored externally and/or internally to the check authorization system 100.

In various embodiments, insignia-related evaluation generates an expression of a perceived degree of similarity between an insignia-related input regarding a check's authenticating mark or marks and an expected image or configuration of the authenticating mark or marks. The insignia-related input may, in various embodiments, be a numeric expression, a category-based expression, or another expression of the perceived similarity between the insignia-related input and the expected configuration for the authenticating mark.

FIGS. 13A, 13B, and 13C differ from one another in that, in FIG. 13A, evaluation of the insignia-related input takes places at the check-cashing entity 110 before transmission of transaction-related data to the check authorization system 100, while in FIG. 13B, evaluation of the insignia-related input takes places at the check authorization system 100, and in FIG. 13C evaluation of the insignia-related input takes places at a third party service provider 1350.

In the embodiment shown in FIG. 13A, evaluation of the insignia-related input takes places at the check-cashing entity 110. In the embodiment shown, the check-cashing entity 110 comprises an insignia-related input generator 1300 that comprises both the insignia-related input device 1310 and an input evaluator 1320 for evaluating the insignia-related input. In some embodiments, the insignia-related input device 1310 further comprises a repository of insignia-related information for comparison with the obtained input form the presented check. In other embodiments, the check-cashing entity 110 may comprise other hardware and/or software resources for evaluating authenticating marks on checks presented for cashing. The evaluated insignia-related input is then transmitted to the data input component 125 of the check authorization system 100, as is other input associated with a proposed check-cashing transaction.

In the embodiment shown in FIG. 13B, evaluation of the insignia-related input takes places at the check authorization system 100. The check-cashing entity 110 sends insignia-related input obtained by the insignia-related input device 1310 along with other data associated with the proposed check transaction to the data input component 125 of the check authorization system 100. The data input component 125 sends the insignia-related input received from the check-cashing entity 110 to an internal insignia-related input evaluator 1330 for evaluation. In the embodiment shown in FIG. 13B, the insignia-related input evaluator 1330 comprises an insignia-related data repository 1340 for comparison with the insignia-related data obtained from the presented check. The evaluated insignia-related input is then transmitted to the item validation routines 140 for further processing.

In the embodiment shown in FIG. 13C, evaluation of the insignia-related input takes places at a third-party insignia-related input evaluation service 1350. The check-cashing entity 110 sends insignia-related input obtained by the insignia-related input device 1310 to the third-party insignia-related input evaluation service 1350 for evaluation. As shown in FIG. 13C, the third-party insignia-related input evaluation service 1350 comprises an insignia-related input evaluator 1360 which may use an insignia-related data repository 1370 for comparison with the obtained input from the presented check. In the embodiment depicted in FIG. 13C, the third-party insignia-related input evaluation service 1350 transmits the evaluated insignia-related input to the data input component 125 of the check authorization system 100. In other embodiments, the third-party insignia-related input evaluation service 1350 transmits the evaluated insignia-related input back to the check-cashing entity 110 for transmission, together with other information related to the proposed check transaction, to the data input component 125 of the check authorization system 100.

In some embodiments, the item validation routines 140 calculate and/or assign an insignia-related risk score to the transaction based at least in part on the insignia-related evaluation to expresses a level of perceived risk associated with the insignia-related evaluation. In various embodiments, an insignia-related risk score may be assigned to insignia-related evaluations based on a variety of criteria, business priorities, statistical models, historical observations, and the like. In some embodiments, insignia-related risk scores are assigned to insignia-related evaluations based on an automated learning or decision-making algorithm that identifies risk patterns associated with various evaluations. In some embodiments, insignia-related risk scores are assigned to insignia-related evaluations based on a human evaluation of the level of risk associated with various evaluations. In some embodiments, insignia-related risk scores are assigned to insignia-related evaluations based on a combination of one or more automated algorithms and human evaluation. In some embodiments, insignia-related risk scores are assigned to insignia-related evaluations arbitrarily. In some embodiments, methods used to assign insignia-related risk scores to insignia-related evaluations may vary, based at least in part on trends specific to a given industry or type of check-cashing entity 116. In some embodiments, methods used to assign insignia-related risk scores to insignia-related evaluations may vary, based at least in part on preferences expressed by the check-cashing entity 110.

Based on the needs, preferences, and characteristics of a check-cashing entity 110, insignia-related information may be evaluated and used according to different guidelines, oftentimes referred to as "rules." Thus, definitions of what constitutes an acceptable watermark or bar code scan, or other authenticating insignia data capture may be defined as suits the risk assessment needs of the check-cashing entity 110, through customized rules. For example, a bar code printed on the face of a check by a local employer may be known to frequently become smudged, distorted, or otherwise deteriorated when kept in an employee's pocket, often folded, and the like, whereas a watermark used on the checks of another employer may not. A local check-cashing entity 110 may recognize that the bar coded checks, while legitimate, more frequently produce degraded insignia-related input. The check-cashing entity 110 may be willing to accept the bar coded checks, even with a lower degree of similarity between the input barcodes and the expected images, while still demanding a higher degree of similarity between the watermarks and their expected configurations for the watermarked checks.

In some embodiments, the item validation routines 140 do not assign or calculated the insignia-related risk score, and instead the item validation routines 140 transmit the insignia-related evaluation to the risk scoring and decisioning component 175 for generation of an insignia-related risk score.

The insignia-related risk score may be used alone or may be combined with other risk scores to calculate a more comprehensive transaction risk score for the proposed check-cashing transaction. For example, an insignia-related risk score may be combined with a biometric risk score based at least in part on data that is received from an auxiliary biometric input system. Furthermore, the check authorization system 100 may transmit an accept/decline recommendation to the check-cashing entity 110 based at least in part on the transaction risk score. In various embodiments, recommendations based at least in part on transaction risk scores may be influenced by preferences, business decisions, and agreements set by the check-cashing entity 110, such that the same transaction risk score could lead to a recommendation to approve a check-cashing transaction for one check-cashing entity 110 and could lead to a recommendation to decline a check-cashing transaction for another check-cashing entity 110.

The structure and configuration of components and communications links depicted in FIGS. 13A, 13B, and 13C are one of a plurality of possible structures and configurations suitable to the purposes of the check authorization system 100 described herein. Furthermore, other embodiments of the systems and methods described herein are envisioned which may comprise some, all, or none of the features described with reference to FIGS. 13A, 13B, and 13C. Thus, FIGS. 13A, 13B, and 13C are intended to aid in describing and clarifying the features and not to limit the description.

Figure 14:
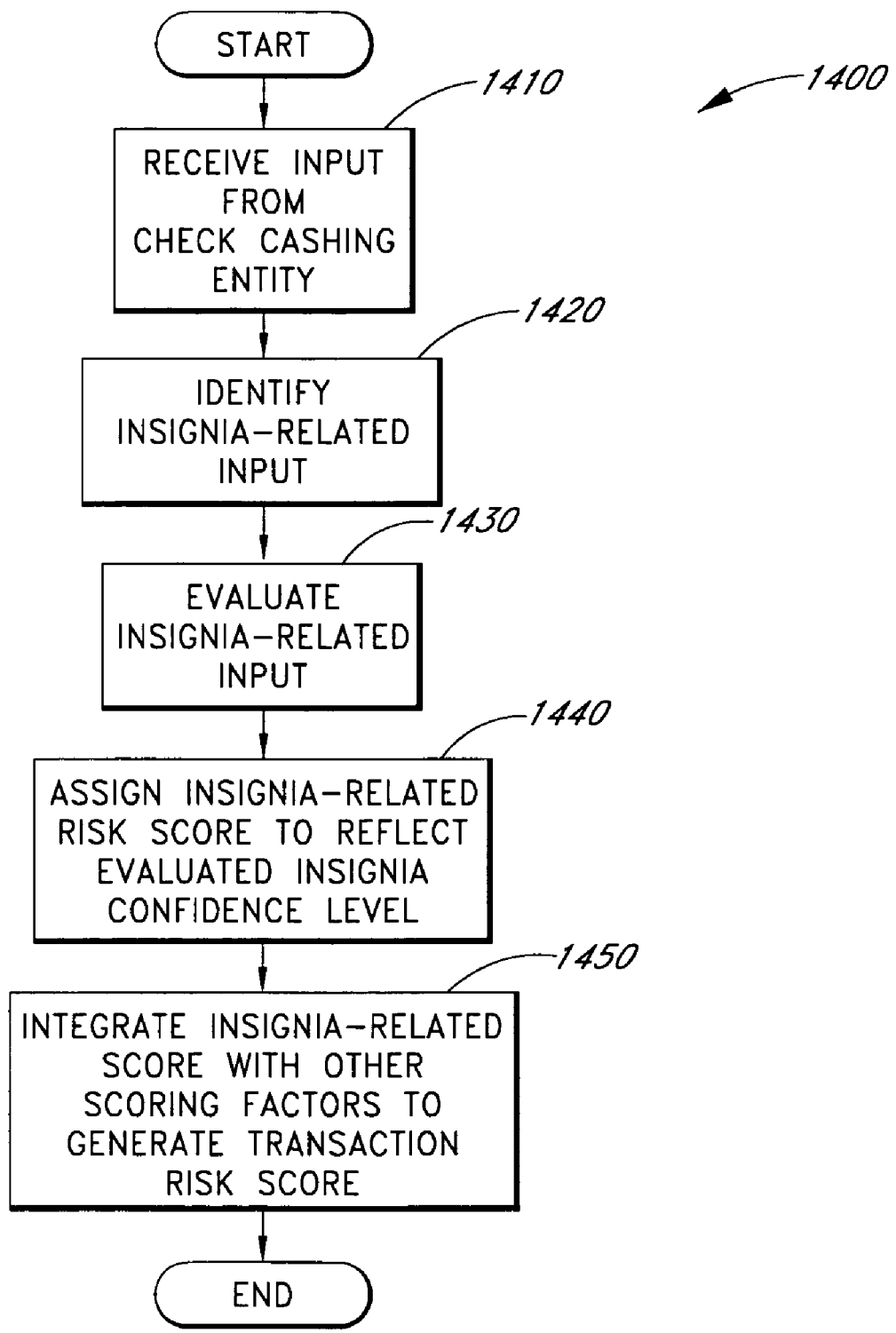
FIG. 14 is a flowchart that depicts one embodiment of a process to use insignia-related information to generate a risk score for second-party check acceptance.

FIG. 14 is a flowchart that depicts one embodiment of a process 1400 to use insignia-related information to generate a risk score for second-party check acceptance. In various embodiments, insignia-related information about a check that is presented for cashing may comprise one or more watermarks, bar codes, insignia, background patterns, microprinting, colorshifting ink, holographic strips, security validation numbers, ultraviolet light sensitive fibers, or other authenticating marks or devices from the check that may be used to enhance the ability to distinguish checks that are legitimate from checks that are not legitimate.

Insignia-related input obtained by the check-cashing entity 110 from the check being presented by the check presenter 101 may be compared to stored and/or expected insignia-related information, as will be described in greater detail below. Insignia-related information may thus be used to enhance confidence in the accurate identification of the check item and may enhance confidence that the check item is legitimate. By incorporating insignia-related input in a risk scoring system for check cashing, an assessment of the check item's legitimacy may be considered along with other factors indicative of a level of security associated with accepting a proposed check-cashing transaction. For example, in one embodiment an insignia-related risk score may express a confidence level in the legitimacy of the presented check and a biometric risk score may express a confidence level in the accurate identification of the check presenter, and a combined use of the two risk scores may provide an enhanced risk assessment for the transaction. By allowing for a gradated expression of the assessed degree of confidence based on the insignia-related input, allowances may be made for checks whose authenticating marks compare less than perfectly with an expected configuration for the authenticating mark.

The process 1400, as depicted in FIG. 14, begins at a start state and moves to state 1410 where insignia-related information for a proposed transaction is obtained from the check item by the check-cashing entity 110 using one or more of a wide array of possible input devices 115, such as, but not limited to, scanners, cameras, lights, readers, and other specialized devices. In some embodiments, a point-of-sale device at the check-cashing entity 110 displays a prompt to an operator of the point-of-sale device to input insignia-related information about an authenticating mark from the presented check. In some embodiments, insignia-related information is machine-read input electronically. In other embodiments, the operator of the point-of-sale device inputs the insignia-related information. In other embodiments, a combination of the two methods or another method is used to obtain the insignia-related information about the authenticating mark.

Moving on to state 1420, the insignia-related input is identified and transmitted to an insignia-related evaluator. In the embodiments depicted in FIGS. 13A and 13C, the insignia-related input is identified for transmission to an insignia-related evaluator by the check-cashing entity 110. In FIG. 13A, the check-cashing entity 110 identifies the insignia-related input and transmits it to an internal insignia-related input generator 1300 for evaluation. In FIG. 13A, the check-cashing entity 110 identifies the insignia-related input and transmits it to a third-party insignia-related evaluation service 1350 for evaluation. In FIG. 13B, the check-cashing entity 110 transmits data associated with the proposed check-cashing transaction to the data input component 125 of the check authorization system. In FIG. 13B, the data input component 125 identifies the insignia-related input and transmits it to an insignia-related input evaluator 1330 internal to the check authorization system 100 for evaluation.

Moving on to state 1430, the insignia-related input is evaluated. In various embodiments, the insignia-related input is evaluated as compared with known or expected insignia configurations. In some embodiments, the evaluation may yield a numeric assessment of the similarity between the insignia-related input and one or more known or expected configurations. For example, the insignia-related evaluation may yield a percentage that describes the extent to which the insignia-related input matches the expected configuration. In other embodiments, the evaluation may yield a category-based assessment of the similarity between the insignia-related input and one or more known or expected configurations. In still other embodiments, the evaluation may yield another type of assessment of the similarity between the insignia-related input and one or more known or expected configurations.

In various embodiments, the insignia-related evaluation of state 1430 may be carried out by the insignia-related input generator 1300, as described with reference to FIG. 13A, by the insignia-related input evaluator 1330, as described with reference to FIG. 13B, by a third-party insignia-related evaluation service 1350, as described with reference to FIG. 13C, or in another manner, as will be familiar to one of ordinary skill in the art.

Moving on to state 1440, the evaluated insignia-related input is assigned an insignia-related risk score that expresses a level of confidence that the presented check is legitimate, based on the evaluated authenticating mark from the check. In some embodiments, the insignia-related risk score is indicative of lower risk when the insignia-related input is evaluated as being more similar to an expected configuration for the authenticating mark, and indicative of higher risk when the insignia-related input is evaluated as being less similar to an expected configuration for the authenticating mark. In various embodiments, assignment of an insignia-related risk score may be carried out by the item validation routines 140 or by the risk scoring and decisioning component 175 of the check authorization system 100.

As was described with respect to the factor risk scores 430 referenced in FIG. 4, factor risk scores 430, of which the insignia-related risk score is an example, may be assigned based on a variety of criteria, business priorities, statistical models, historical observations, and the like. In some embodiments, insignia-related risk scores are assigned to raw insignia-related variable values 420 based on an automated learning or decision-making algorithm that identifies risk patterns associated with various variable values 420. In some embodiments, insignia-related risk scores are assigned to insignia-related variable values 420 based on a human evaluation of the level of risk associated with various variable values 420. In some embodiments, insignia-related risk scores are assigned to insignia-related variable values 420 based on a combination of one or more automated algorithms and human evaluation. In some embodiments, insignia-related risk scores are assigned to insignia-related variable values 420 arbitrarily. In some embodiments, methods used to assign insignia-related risk scores to insignia-related variable values 420 may vary, based at least in part on trends specific to a given industry or type of check-cashing entity 110. In some embodiments, methods used to assign insignia-related risk scores to insignia-related variable values 420 may vary, based at least in part on preferences of the check-cashing entity 110.

In various embodiments, the insignia-related evaluation of state 1430 may be carried out by the insignia-related input generator 1300, as described with reference to FIG. 13A, by the insignia-related input evaluator 1330, as described with reference to FIG. 13B, by a third-party insignia-related evaluation service 1350, as described with reference to FIG. 13C, or in another manner, as will be familiar to one of ordinary skill in the art.

Moving on to state 1450, the item validation routines 140 transmit the assigned insignia-related risk score along with other risk scores assigned by the person validation routines and the location validation routines 160 to the risk scoring and decisioning component 175 of the check authorization system 100. As was described in greater detail with reference to FIG. 4, the assigned factor risk scores 430, of which the insignia-related risk score is, in some embodiments, an example, reflect a perceived level of risk associated with approving a transaction, in this case with the assigned insignia-related evaluation.

In state 1460, the risk scoring and decisioning component 175 integrates the assigned insignia-related score with other scoring variables that reflect risk associated with other aspects of the proposed check-cashing transaction, such as, for example, the check amount, a biometric information obtained from the check presenter 101, location-based information for the check issuer, and/or positive pay information associated with the check, as was exemplified with reference to the score calculations of FIG. 4. Based at least in part on the insignia-related risk score, the risk scoring and decisioning component 175 calculates a risk score 440 for the proposed transaction, and the process 1400 to use insignia-related information as a factor in a risk scoring calculation for a check-cashing transaction is complete.

In one embodiment, the process 1400 is used as part of a larger risk assessment process for check-cashing transactions, in which the risk scoring and decisioning component 175 transmits a recommendation to approve or to decline the proposed check-cashing transaction to the check-cashing entity 110, based at least in part on the transaction risk score 440 calculated by the process 1400.

The flowchart of FIG. 14 describes one embodiment of the process 1400 for using insignia-related information to generate a risk score for second-party check acceptance as comprising various states in which various functions are carried out. As will be familiar to one of ordinary skill in the art, in other embodiments, the process 1400 may be executed using a different order, configuration, or set of states, and the states of the process 1400 may perform the functions differently from the embodiment of FIG. 14, without departing from the spirit of process 1400.

Although the foregoing invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A method of compiling a computer-accessible repository of check issuer location information for use in check transaction risk assessment and conducting a check transaction assessment, the method comprising:
    a check authorization system identifying two or more check issuers in a desired geographical location;
    the check authorization system obtaining, from two or more check issuers, identifiers for checking accounts associated with the two or more check issuers;
    the check authorization system compiling on a computer-accessible storage medium a repository of records, wherein a record comprises information to identify a check issuer name, an associated check issuer's location, and the associated check issuer's checking account identifier; and
    in response to receiving a request to authorize a check, calculating a risk score, the risk score at least partially based on the associated check issuer's location stored in the repository of records and the check-cashing entity's location.

2. The method of claim 1, wherein identifying check issuers in a desired geographical location further comprises identifying check issuers within a desired proximity of a check-cashing entity.

3. The method of claim 1, wherein identifying check issuers in a desired geographical location further comprises identifying check issuers within a desired region defined by at least one of the set consisting of: zip code, city, county, state, telephone area code, and Metropolitan Statistical Area (MSA).

4. The method of claim 1, wherein identifying check issuers in a desired geographical location comprises identifying check issuers from any geographical location.

5. The method of claim 1, further comprising the acts of:
    in response to receiving a request to cash a check for which the repository of records does not hold associated check issuer information, requesting from a check-cashing entity that is processing the request, information about at least one of: a check issuer name, a check issuer bank account identification, and check issuer location information; and
    adding check issuer information received from the check-cashing entity to the repository.

6. The method of claim 5, wherein requesting information from a check-cashing entity comprises displaying a prompt to an operator of a point-of-sale device at the check-cashing entity to input the requested information.

7. A method of compiling a computer-accessible repository of location information about issuers of negotiable instruments and conducting a check transaction assessment, the method comprising:
    a check authorization system identifying issuers of negotiable instruments in a desired geographical location;
    the check authorization system obtaining, from two or more issuers of negotiable instruments, identifiers associated with the negotiable instruments;
    the check authorization system compiling on a computer-accessible storage medium a repository of records, wherein a record comprises information to identify a name associated with an issuer of negotiable instruments, an associated issuer location, and the associated identifiers associated with the negotiable instruments; and
    in response to receiving a request to authorize a check, calculating a risk score, the risk score at least partially based on the associated check issuer's location stored in the repository of records and the check-cashing entity's location.

8. The method of claim 7, wherein identifying issuers of negotiable instruments in a desired geographical location further comprises identifying issuers within a desired proximity of a check-cashing entity.

9. The method of claim 7, wherein identifying issuers of negotiable instruments in a desired geographical location further comprises identifying issuers of negotiable instruments within a desired region defined by at least one of the set consisting of: zip code, city, county, state, telephone area code, and Metropolitan Statistical Area (MSA).

10. The method of claim 7, wherein identifying issuers of negotiable instruments in a desired geographical location comprises identifying issuers of negotiable instruments from any geographical location.

11. A system for compiling a computer-accessible repository of check issuer location information for use in check transaction risk assessment and conducting check transaction risk assessments, the system comprising:
    means for identifying two or more check issuers in a desired geographical location;
    means for compiling on a computer-accessible storage medium a repository of records, wherein a record comprises information to identify a check issuer name, an associated check issuer location, and an associated check issuer checking account, and wherein the checking account is an account drawn on by the check issuer for issuing checks: and
    means for calculating a risk score in response to receiving a request to authorize a check, wherein the risk score is at least partially based on the associated check issuer's location stored in the repository of records and the check-cashing entity's location.

* * * * *